United States Patent
Huang et al.

(10) Patent No.: US 11,568,238 B2
(45) Date of Patent: Jan. 31, 2023

(54) DYNAMIC PROCESSING ELEMENT ARRAY EXPANSION

(71) Applicant: Amazon Technologies, Inc., Seattle, WA (US)

(72) Inventors: Randy Renfu Huang, Morgan Hill, CA (US); Ron Diamant, Santa Clara, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 859 days.

(21) Appl. No.: 16/456,414

(22) Filed: Jun. 28, 2019

(65) Prior Publication Data

US 2020/0410337 A1 Dec. 31, 2020

(51) Int. Cl.
| | |
|---|---|
| *G06E 1/00* | (2006.01) |
| *G06E 3/00* | (2006.01) |
| *G06G 7/00* | (2006.01) |
| *G06N 3/08* | (2006.01) |
| *G06N 3/04* | (2006.01) |

(52) U.S. Cl.
CPC ............... *G06N 3/08* (2013.01); *G06N 3/04* (2013.01)

(58) Field of Classification Search
CPC .................................... G06N 3/04; G06N 3/08
See application file for complete search history.

(56) References Cited

U.S. PATENT DOCUMENTS

| | | | |
|---|---|---|---|
| 8,924,455 B1 | 12/2014 | Barman et al. | |
| 2016/0163035 A1* | 6/2016 | Chang | G06N 3/084 |
| | | | 382/149 |
| 2018/0096226 A1 | 4/2018 | Aliabadi et al. | |
| 2019/0164037 A1 | 5/2019 | Kim et al. | |

(Continued)

FOREIGN PATENT DOCUMENTS

WO WO-2016090044 A1 * 6/2016 ........... G06K 9/4628

OTHER PUBLICATIONS

PCT International Search Report and Written Opinion, dated Oct. 19, 2020 in PCT/US20/39804.

(Continued)

*Primary Examiner* — Samir W Rizk
(74) *Attorney, Agent, or Firm* — Weaver Austin Villeneuve & Sampson LLP

(57) ABSTRACT

A computer-implemented method includes receiving a neural network model that includes a tensor operation, and dividing the tensor operation into sub-operations. The sub-operations includes at least two sub-operations that have no data dependency between the two sub-operations. The computer-implemented method further includes assigning a first sub-operation in the two sub-operations to a first computing engine, assigning a second sub-operation in the two sub-operations to a second computing engine, and generating instructions for performing, in parallel, the first sub-operation by the first computing engine and the second sub-operation by the second computing engine. An inference is then made based on a result of the first sub-operation, a result of the second sub-operation, or both. The first computing engine and the second computing engine are in a same integrated circuit device or in two different integrated circuit devices.

20 Claims, 26 Drawing Sheets

(56) References Cited

U.S. PATENT DOCUMENTS

2020/0082258 A1\* 3/2020 Gold .................... G06V 10/82
2020/0111003 A1\* 4/2020 Ross .................... G06N 5/04

OTHER PUBLICATIONS

Cadambi, Srihari et al., "A Programmable Parallel Accelerator for Learning and Classification", Proceedings of the $19^{th}$ International Conference on Parallel Architectures and Compilation Techniques, PACT '10, ACM Press, New York, NY, Sep. 11, 2010, pp. 273-283.
Devlin et al., "BERT: Pre-Training of Deep Bidirectional Transformers for Language Understanding", Available online at: https://arxiv.org/pdf/1810.04805.pdf, May 24, 2019, 16 pages.
Vaswani et al., "Attention is all You Need", 31st Conference on Neural Information Processing Systems, 2017, pp. 1-11.

\* cited by examiner

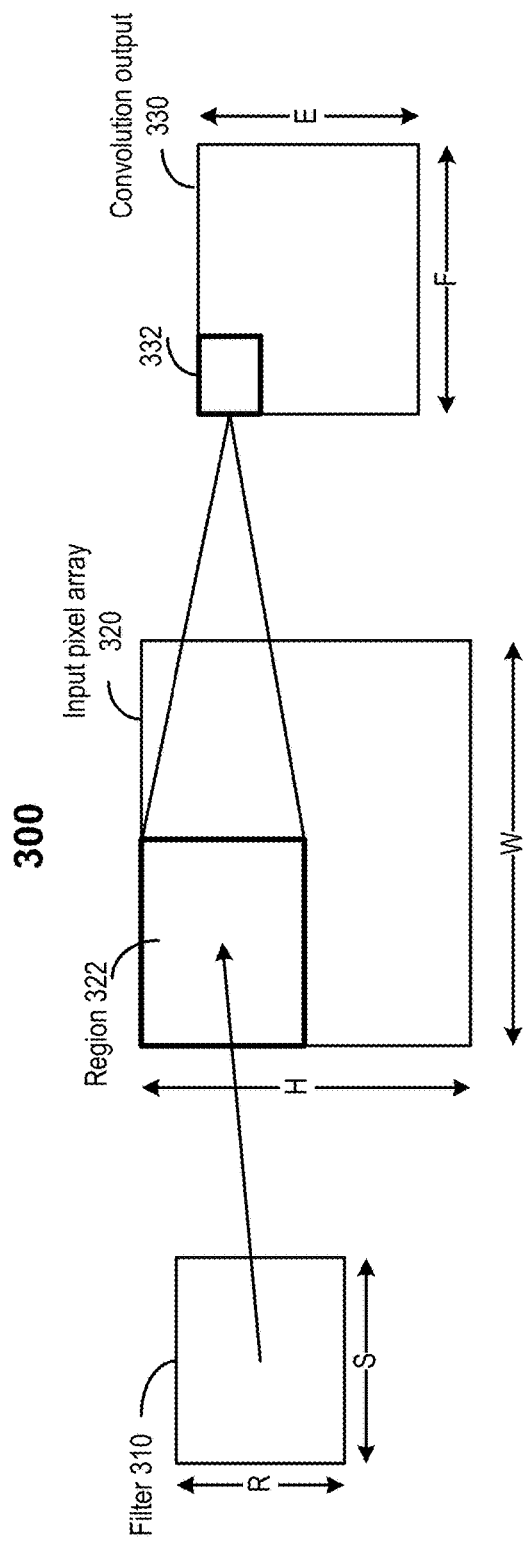
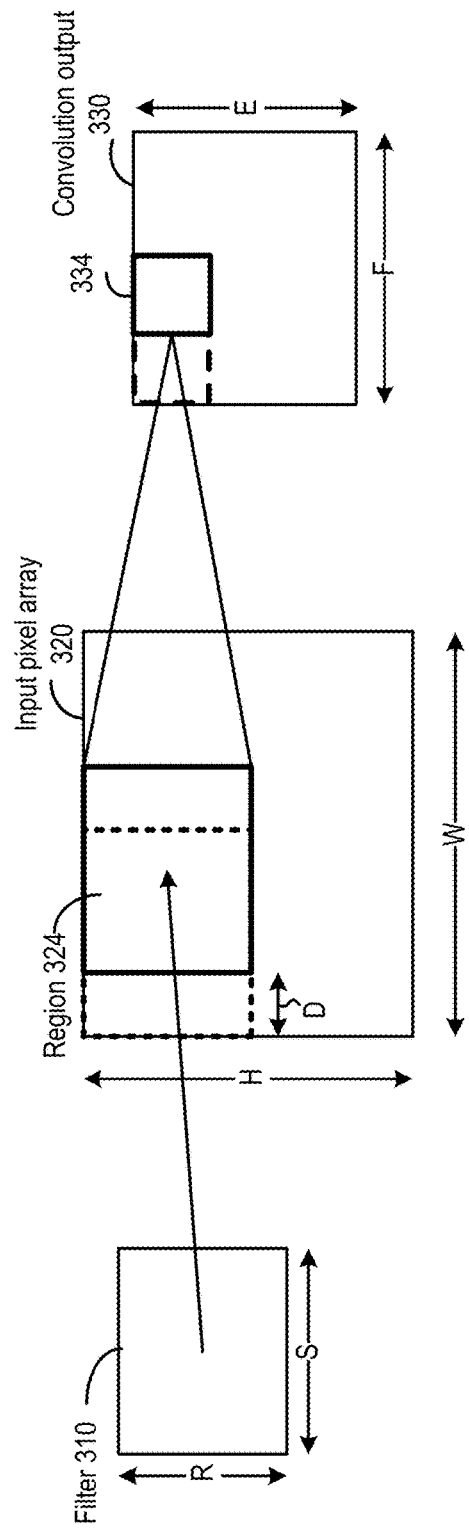
FIG. 3A
FIG. 3B

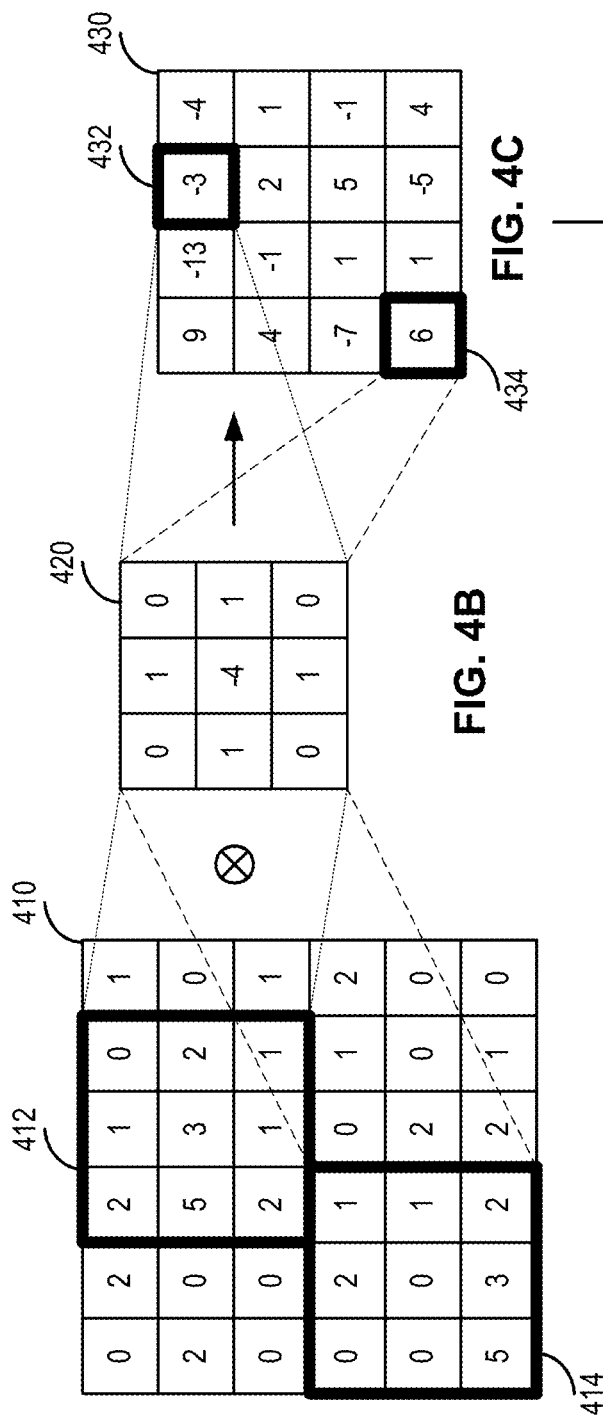

DYNAMIC PROCESSING ELEMENT ARRAY EXPANSION

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform post-processing operations on the intermediate output.

A complex artificial neural network, such as a deep neural network, may include thousands or more of processing nodes and millions or more of parameters, and thus each inference may include massive computation. For example, in a ResNet-50 neural network, each inference may include about 8-billion arithmetic operations. Thus, the latency for making an inference may be long because the integrated circuits for implementing the neural network may include limited resources such that many operations (e.g., convolution or other tensor operations) may need to be performed in a serial fashion.

BRIEF DESCRIPTION OF THE DRAWINGS

Various embodiments in accordance with the present disclosure will be described with reference to the drawings, in which:

FIGS. 3A and 3B illustrate convolution operations performed on an input pixel array by an example of a convolution layer in a convolutional neural network;

FIGS. 4A-4E illustrate examples of convolution, non-linear activation, and pooling operations performed on an example of input pixel data;

DETAILED DESCRIPTION

Figure 1:
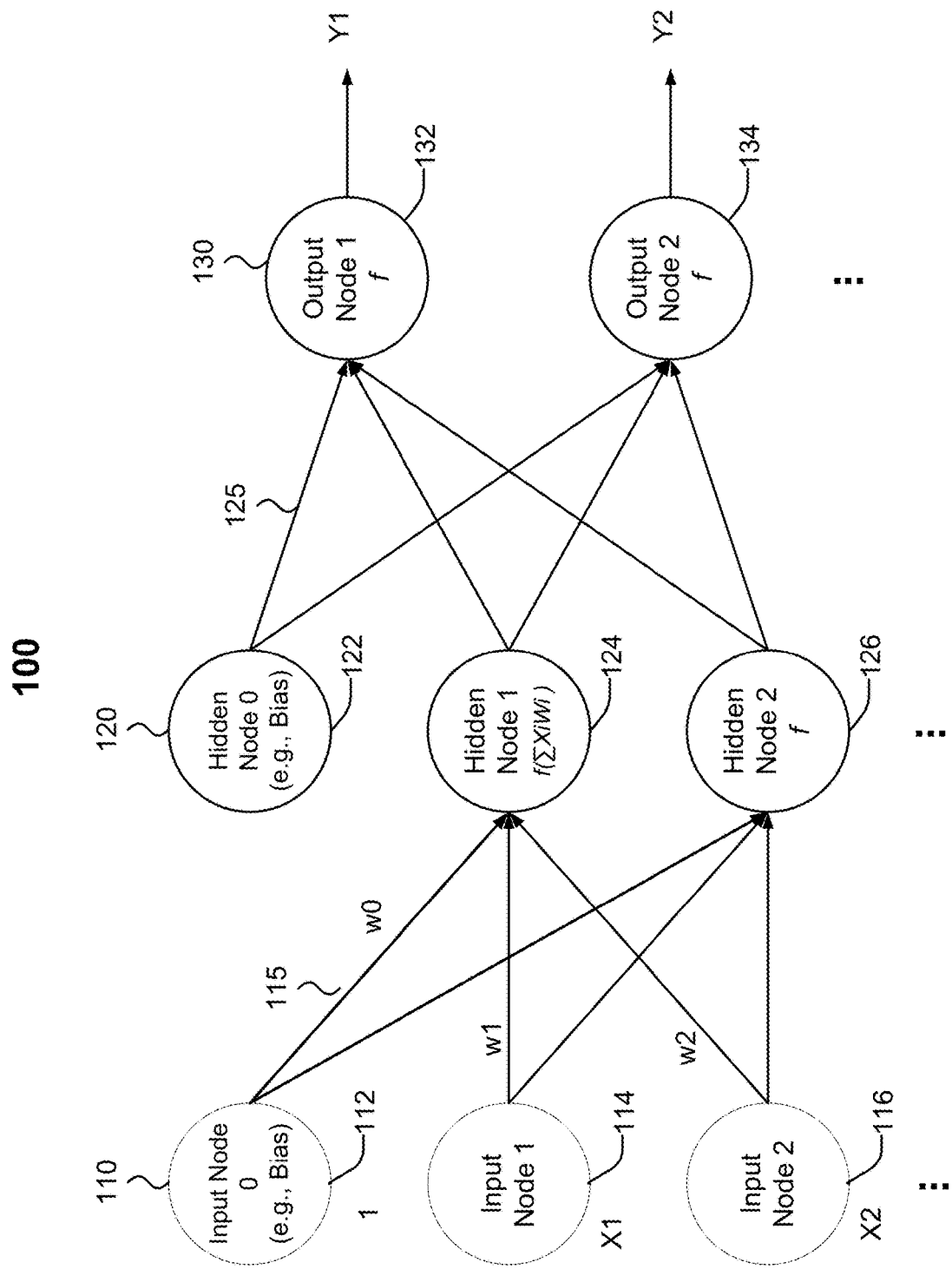
FIG. 1 illustrates an example of a multi-layer artificial neural network.

Techniques disclosed herein relate generally to artificial neural networks, and more specifically, to accelerating inferences based on a neural network model using multiple computing engines that perform sub-operations of a neural network operation in parallel.

An artificial neural network may include multiple processing nodes arranged on two or more layers, where processing nodes on one layer may connect to processing nodes on another layer. Each processing node on a layer may receive a stream of input data elements, multiply each input data element with a weight, compute a weighted sum of the input data elements, and forward the weighted sum to the next layer. An artificial neural network may include thousands or more of processing nodes and millions or more of weights and input data elements. In some neural networks, such as a convolutional neural network, a Transformer including multi-head attention models, a multi-layer perceptron, or other neural network models based on tensor operations, large input tensors may be processed to generate new output tensors (e.g., a tensor product). As such, a large memory space and a processing unit with a high parallel processing performance may be needed. However, the underlying hardware for implementing the neural network may have limited resources, such as a limited number of processing elements and/or limited memory space or memory bandwidth. Therefore, some tensor operations for the neural network may each need to be performed in a serial fashion, which may significantly increase the time period needed to perform the operations, and thus the latency for making an inference may be longer than desired, for example, for some real-time applications.

According to certain embodiments, a tensor operation, such as a convolution operation, a multi-head attention operation, or a multi-layer perceptron operation, may be split in certain manners into sub-operations to be performed in parallel by multiple computing engines, such that each computing engine may perform a sub-operation to generate a portion of the final results (e.g., an output tensor) of the tensor operation in a shorter time period. The portions of the output tensor generated by the sub-operations may be used to make an early inference and may be concatenated to form the output tensor without additional arithmetic operations. In one example, each computing engine may perform a convolution operation on a portion of the input feature maps in a shorter time period to generate a portion of each of the output feature maps in the tensor output. In another example, each computing engine may perform a convolution operation on the input feature maps using a portion of the filters for a portion of the output channels in a shorter time period to generate a fraction of the number of output feature maps. The portions of the output feature maps may be used individually or in combination to make an earlier prediction or decision. In this way, the latency for making an inference may be significantly reduced, for example, by a factor of the number of computing engines used for the parallel performance of the sub-operations. This may also effectively create a computing engine with higher computing power.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Artificial neural networks (also referred to as "neural networks") have been used in machine learning research and industrial applications and have achieved many breakthrough results in, for example, image recognition, speech recognition, computer vision, text processing, and the like. The basic unit of computation in a neural network is the neuron (also referred to as a node). A neuron may receive input from some other neurons or an external source and compute an output. Each input may have an associated weight (w), which may be assigned based on the importance of the input relative to other inputs. The neuron may also apply a function (e.g., a nonlinear function) to the weighted sum of its inputs.

An artificial neural network may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. An artificial neural network, such as a convolutional neural network, may include thousands or more of processing nodes and millions or more of weights and input data elements.

A feedforward neural network is a type of artificial neural network. It may include multiple nodes arranged in layers. Nodes from adjacent layers may have connections or edges between them. These connections may have corresponding weights associated with them. Information may flow from the input nodes, through the hidden nodes (if any) and to the output nodes. There are no circles or loops in the network. In contrast, recurrent Neural Networks (e.g., a long short-term memory (LSTM) network) may include connections between the nodes to form a circle or loop.

FIG. 1 illustrates an example of a multi-layer neural network 100. Multi-layer neural network 100 may include an input layer 110, a hidden (or intermediate) layer 120, and an output layer 130. In many implementations, multi-layer neural network 100 may include two or more hidden layers and may be referred to as a deep neural network. A neural network with a single hidden layer may generally be sufficient to model any continuous function. However, such a network may need an exponentially larger number of nodes when compared to a neural network with multiple hidden layers. It has been shown that a deeper neural network can be trained to perform much better than a comparatively shallow network.

Input layer 110 may include a plurality of input nodes (e.g., nodes 112, 114, and 116) that may provide information (e.g., input data) from the outside world to the network. The input nodes may pass on the information to the next layer, and no computation may be performed by the input nodes. Hidden layer 120 may include a plurality of nodes, such as nodes 122, 124, and 126. The nodes in the hidden layer may have no direct connection with the outside world (hence the name "hidden"). They may perform computations and transfer information from the input nodes to the next layers (e.g., another hidden layer or output layer 130). While a feedforward neural network may have a single input layer and a single output layer, it may have zero or multiple hidden layers. Output layer 130 may include a plurality of output nodes that are responsible for computing and transferring information from the network to the outside world, such as recognizing certain objects or activities, or determining a condition or an action.

As shown in FIG. 1, in a feedforward neural network, a node (except the bias node if any) may have connections to all nodes (except the bias node if any) in the immediately preceding layer and the immediate next layer. Thus, the layers may be referred to as fully-connected layers. All connections between nodes may have weights associated with them, even though only some of these weights are shown in FIG. 1. For a complex network, there may be hundreds or thousands of nodes and thousands or millions of connections between the nodes.

As described above, a feedforward neural network may include zero (referred to as a single layer perceptron), or one or more hidden layers (referred to as a multi-layer perceptron (MLP)). Even though FIG. 1 only shows a single hidden layer in the multi-layer perceptron, a multi-layer perceptron may include one or more hidden layers (in addition to one input layer and one output layer). A feedforward neural network with many hidden layers may be referred to as a deep neural network. While a single layer perceptron may only learn linear functions, a multi-layer perceptron can learn non-linear functions.

In the example shown in FIG. 1, node 112 may be a bias node having a value of 1 or may be a regular input node. Nodes 114 and 116 may take external inputs X1 and X2, which may be numerical values depending upon the input dataset. As discussed above, no computation is performed on input layer 110, and thus the outputs from nodes 112, 114, and 116 on input layer 110 are 1, X1, and X2, respectively, which are fed into hidden layer 120.

In the example shown in FIG. 1, node 122 may be a bias node having a value of 1 or may be a regular network node. The outputs of nodes 124 and 126 in hidden layer 120 may depend on the outputs from input layer 110 (e.g., 1, X1, X2, etc.) and weights associated with connections 115. For example, node 124 may take numerical inputs X1 and X2 and may have weights w1 and w2 associated with those inputs. Additionally, node 124 may have another input (referred to as a bias), such as 1, with a weight w0 associated with it. The main function of the bias is to provide every node with a trainable constant value (in addition to the normal inputs that the node receives). The bias value may allow one to shift the activation function to the left or right. It is noted that even though only three inputs to node 124 are shown in FIG. 1, in various implementations, a node may include tens, hundreds, thousands, or more inputs and associated weights.

The output Y from node 124 may be computed by:

$$Y=f(w1 \times X1+w2 \times X2+w0 \times \text{bias}), \quad (1)$$

where function $f$ may be a non-linear function that is often referred to as an activation function. When a node has K inputs, the output from the node may be computed by:

$$Y = f\left(\sum_{i=0}^{K} w_i X_i\right). \quad (2)$$

Thus, the computation on each neural network layer may be described as a multiplication of an input matrix and a weight matrix and an activation function applied on the products of the matrix multiplication. The outputs from the nodes on an intermediate layer may then be fed to nodes on the next layer, such as output layer 130.

The purpose of the activation function is to introduce non-linearity into the output of a neural network node because most real world functions are non-linear and it is desirable that the neurons can learn these non-linear representations. The activation function may take a single number and perform a certain fixed mathematical operation on it. Several activation functions may be used in an artificial neural network. One example activation function is the sigmoid function $\sigma(x)$, which takes a real-valued input and transforms it into a value between 0 and 1. Another example activation function is the tan h function, which takes a real-valued input and transforms it into a value within the range of [−1, 1]. A third example activation function is the rectified linear unit (ReLU) function. The ReLU function takes a real-valued input and thresholds it above zero (e.g., replacing negative values with zero). Another example activation function is the leaky ReLU function.

Output layer 130 in the example shown in FIG. 1 may include nodes 132 and 134, which may take inputs from hidden layer 120 and perform similar computations as the hidden nodes using weights associated with connections 125. The calculation results (Y1 and Y2) are the outputs of the multi-layer perceptron. In some implementations, in an MLP for classification, a Softmax function may be used as the activation function in the output layer. The Softmax function takes a vector of real-valued scores and maps it to a vector of values between zero and one that sum to one.

For a given set of input features X=(x1, x2, . . . ) and a target Y, a multi-layer perceptron can learn the relationship between the features and the target for either classification or regression. A multi-layer perceptron may learn using a backpropagation algorithm. Backward propagation of errors (often referred to as BackProp) is one of several ways in which an artificial neural network can be trained. BackProp may be a supervised training scheme that learns from labeled training data and errors at the nodes by changing parameters of the neural network to reduce the errors.

As described above, the connections between nodes of adjacent layers in an artificial neural network have weights associated with them, where the weights may determine what the output vector is for a given input vector. A learning or training process may assign appropriate weights for these connections. In some implementations, the initial values of the weights may be randomly assigned. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In many situations, using the feedforward neural network as described above for real-world application, such as image classification, may not be practical. For example, for a two-dimensional (2-D) image with 200×200 pixels, 40,000 input nodes may be used in the neural network. If a hidden layer has 20,000 nodes, the size of the matrix for the weights would be 40,000×20,000 (or 800 million elements). If each weight is a 32-bit (i.e., 4-byte) floating point value, the total memory used for the weights would be 3.2 GB. This is just for the first layer. As the number of layers increases, the size of the weights may increase as well. In addition, vectorizing an image using individual pixels may ignore the complex multi-dimensional spatial structure of the image.

One way to overcome these issues is to use convolutional neural networks that perform convolutions using smaller convolutional filters rather than the large matrix multiplications as described above. Learning a set of convolutional filters (e.g., 11×11 matrices) may be much easier and faster than learning a large matrix (e.g., 40,000×20,000). Multi-dimensional convolutions or other tensor operations can also naturally take the multi-dimensional structure of images into account. Convolutional neural networks can be considered as feedforward neural networks with local connectivity and weight sharing. The local connectivity refers to the fact that a convolutional filter may have much smaller dimensions than the image it operates on. The weight sharing is due to the fact that a same filter may be used across the image when performing the convolution, which means that a same local filter is used on many locations in the image. In other words, the weights between all filtering for different locations in the image are shared.

A Convolutional neural network (ConvNet or CNN) may perform operations including, for example, (1) convolution; (2) non-linearity (or activation) function (e.g., ReLU); (3) pooling or sub-sampling; and (4) classification. Different CNNs may have different combinations of these four main operations, as well as other additional operations. For example, a ResNet-50 network may include network layers that include mostly convolution layers and a few pooling layers, and may also perform residue-add operations for residue learning.

Figure 2:
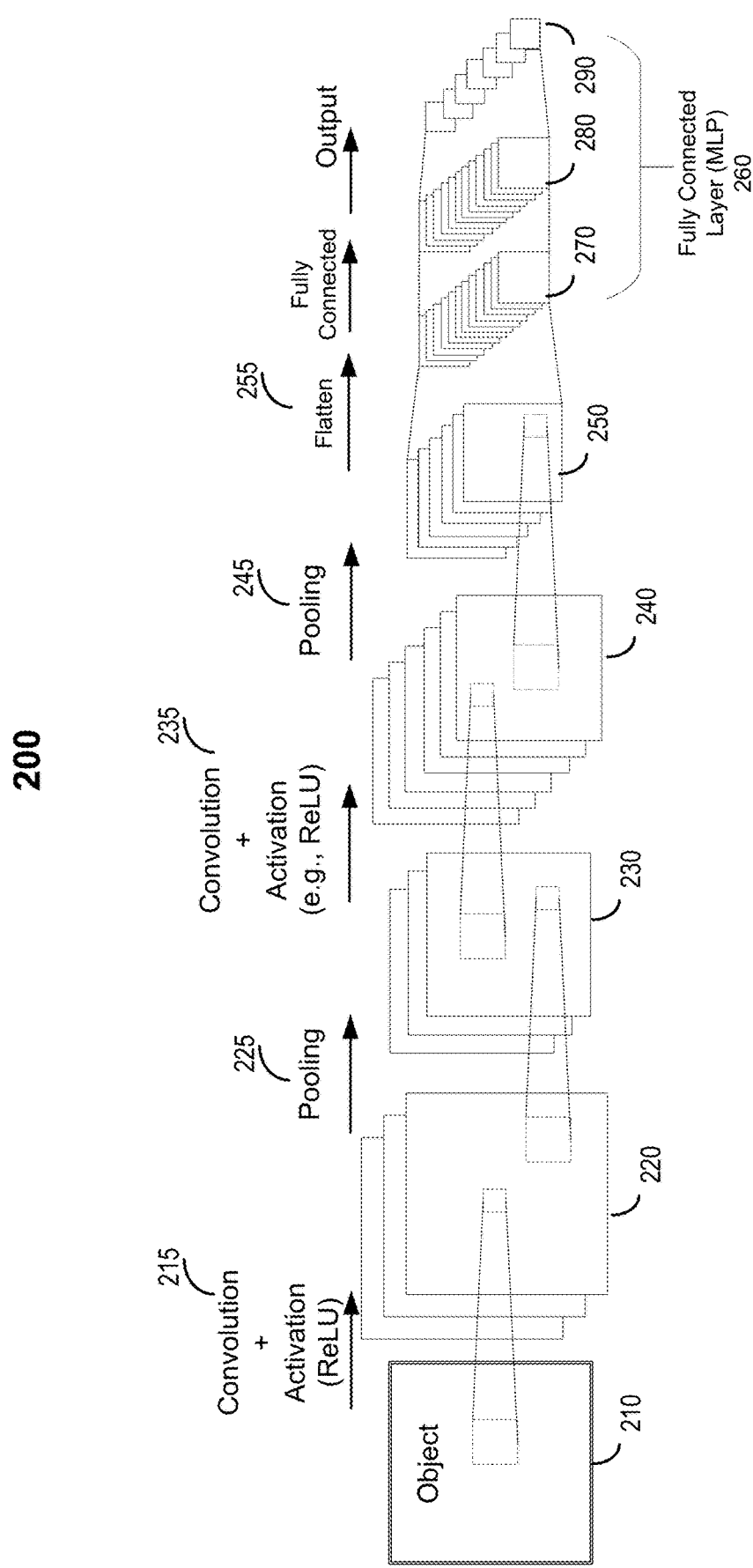
FIG. 2 illustrates an example of a convolutional neural network (CNN)

FIG. 2 illustrates an example of a convolutional neural network (CNN) 200 for image or other object classification. As described above, CNN 200 may perform four types of operations including convolution, non-linearity (or activation) function (e.g., ReLU), pooling or sub-sampling, and classification (fully-connected layer). An object 210 to be classified, such as one or more input images or other input datasets (referred to as input feature maps), may be represented by a matrix of pixel values. For example, object 210 may include multiple channels (e.g., multiple input feature maps), each channel representing a certain component of object 210. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using CNN 200 is described. Other channels may be processed similarly.

As shown in FIG. 2, object 210 (e.g., input images) may first be processed by a first convolution layer 215 using a first set of filters, where first convolution layer 215 may perform a convolution between a matrix representing the input image and a matrix representing each filter in the first set of filters. The convolution may include multiple matrix multiplication. First convolution layer 215 may also perform a non-linear activation function (e.g., ReLU). An output matrix 220 from first convolution layer 215 may have smaller dimensions than the input image, and may be referred to as a convolved feature, activation map, or feature map. First convolution layer 215 may perform convolutions on the input image using the first set of filters to generate multiple output matrices 220, which may be referred to as output feature maps of first convolution layer 215. The number of filters used may be referred to as the depth of the convolution layer. In the example shown in FIG. 2, first convolution layer 215 may have a depth of three. Each output matrix 220 (e.g., an output feature map) may be passed to a pooling layer 225, where each output matrix 220 may be subsampled or down-sampled to generate a matrix 230.

Each matrix 230 may be processed by a second convolution layer 235 using a second set of filters. A non-linear activation function (e.g., ReLU) may also be performed by the second convolution layer 235 as described above. An output matrix 240 (e.g., an output feature map) from second convolution layer 235 may have smaller dimensions than matrix 230. Second convolution layer 235 may perform convolutions on matrix 230 using the second set of filters to generate multiple output matrices 240. In the example shown in FIG. 2, second convolution layer 235 may have a depth of six. Each output matrix 240 may be passed to a pooling layer 245, where each output matrix 240 may be subsampled or down-sampled to generate an output matrix 250.

The output matrices 250 from pooling layer 245 may be flattened to vectors by a flatten layer 255, and passed through a fully-connected layer 260 (e.g., a multi-layer perceptron (MLP)). Fully-connected layer 260 may include an input layer 270 that takes the 2-D output vector from flatten layer 255. Fully-connected layer 260 may also include a hidden layer and an output layer 290. Fully-connected layer 260 may classify the object in the input image into one of several categories using feature maps or output matrix 250 and, for example, a Softmax function. The operation of the fully-connected layer may be represented by matrix multiplications. For example, if there are M nodes on input layer 270 and N nodes on hidden layer 280, and the weights of the connections between the M nodes on input layer 270 and the N nodes on hidden layer 280 can be represented by a matrix W, the output Y of hidden layer 280 may be determined by $Y = X \times W$.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to get a final value that represents a single element of an output matrix (e.g., a feature map). A filter may act to detect certain features from the original input image.

The convolution using one filter over an input pixel array may be used to produce one feature map, and the convolution using another filter over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters used for the convolution operation. For example, in CNN 200 shown in FIG. 2, three distinct filters are used in first convolution layer 215 to perform convolution operations on the input image, thus producing three different output matrices (or feature maps) 220. Stride is the number of pixels by which the filter matrix is slid over the input pixel array. For example, when the stride is one, the filter matrix is moved by one pixel at a time. When the stride is two, the filter matrix is moved by two pixels at a time.

Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 2, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions, such as tan h or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Pooling may also make the network invariant to small transformations, distortions, and translations in the input image such that a small distortion in the input image may not change the output of pooling because the maximum or average value in a local neighborhood is used. Thus, pooling may help to achieve an equivariant representation of the input image such that objects in an image may be detected no matter where they are located. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 2, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 200, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

FIGS. 3A and 3B illustrate convolution operations performed on an input pixel array 320 using a filter 310 by a convolution layer in a convolutional neural network. Input pixel array 320 may include an input image, a channel of an input image, or a feature map generated by another convolution layer or pooling layer. FIG. 3A illustrates the convolution operation performed on a first region 322 of input pixel array 320 at a first step. FIG. 3B illustrates the convolution operation performed on a second region 324 of input pixel array 320 at a second step after sliding filter 310 by a stride.

Filter 310 may include a two-dimensional matrix, each element of the 2-D matrix representing a weight. The weights in filter 310 may be designed or trained to detect or extract certain features from the spatial distribution of pixel values in the image. The extracted features may or may not be meaningful to a human eye. Different filters may be used to detect or extract different features from the input pixel array. For example, some filters may be used to detect edges in an image, or to sharpen or blur an image. Filter 310 may have R rows (height) and S columns (width), and may typically be smaller than input pixel array 320, which may have a height of H pixels and a width of W pixels. Each weight in filter 310 may be mapped to a pixel in a region having R rows and S columns in input pixel array 320. For example, as shown in FIG. 3A, a convolution layer (e.g., first convolution layer 215 or second convolution layer 235) or a processing node of the convolution layer may receive pixel values for a region 322 (including R×S pixels) of input pixel array 320, perform element-wise multiplications between corresponding elements in filter 310 and region 322, and sum the products of the element-wise multiplications to generate a convolution output value 332. In other words, convolution output value 332 may be the sum of multiplication results between weights in filter 310 and corresponding pixels in region 322 according to $\Sigma_{i=1}^{R \times S} x_i w_i$, that is, a dot-product between a matrix W representing filter 310 and a matrix X representing pixel values of region 322.

Similarly, as shown in FIG. 3B, the convolution layer (e.g., another processing node of the convolution layer) may receive pixel values for a region 324 (including R×S pixels) of input pixel array 320, perform element-wise multiplications between corresponding elements in filter 310 and region 324, and sum the products of the element-wise multiplications to generate a convolution output value 334. As shown in FIG. 3B, the convolution operations can be performed in a sliding-window fashion in a pre-determined stride D. Stride is the number of pixels by which the filter matrix is slid over the input pixel array. For example, in the example shown in FIG. 3B, region 324 may be at a distance D (in terms of pixels) from region 322, and the next region for the next convolution operation may be situated at the same distance D from region 324. The stride D can be smaller or greater than the width S of filter 310.

The outputs of the convolution operations may form a convolution output matrix 330 with a height of E rows and a width of F columns. As described above, matrix 330 may be referred to as a feature map. The dimensions of matrix 330 may be smaller than input pixel array 320 and may be determined based on the dimensions of input pixel array 320, dimensions of filter 310, and the stride D. As described above, in some implementations, input pixel array 320 may be padded with zeros around the border so that filter 310 may be applied to bordering elements of input pixel array

320. Zero-padding may allow the control of the size of the feature map (e.g., matrix 330). When the padding size is P on each side of a 2-D input pixel array 320, the height E of matrix 330 is $$E = \frac{H - R + 2P}{D} + 1,$$

and the width F of matrix 330 is $$F = \frac{W - S + 2P}{D} + 1.$$

For example, if stride D is equal to one pixel in both horizontal and vertical directions, E may be equal to H−R+2P+1, and F may be equal to W−S+2P+1. Having a larger stride D may produce smaller feature maps.

FIGS. 4A-4E illustrate examples of convolution, non-linear activation, and pooling operations performed on an example of input pixel data. The input pixel data may represent, for example, a digital image, a channel of a digital image, or a feature map generated by a previous layer in a convolutional neural network. FIG. 4A illustrates an example input matrix 410 that includes the example input pixel data. Input matrix 410 may include a 6×6 pixel array, where each element of the pixel array may include a real number, such as an integer number or a floating point number. FIG. 4B illustrates an example filter 420. Filter 420 may include a 3×3 matrix, where each element of the matrix represents a weight of the filter. Filter 420 may be used to extract certain features from input matrix 410. For example, the example filter 420 shown in FIG. 4B may be a filter for detecting edges in an image.

Input matrix 410 and filter 420 may be convoluted to generate an output matrix 430 as shown in FIG. 4C. Each element in output matrix 430 may be the sum of element-wise multiplications (e.g., dot-product) between corresponding elements in filter 420 and an overlapping region 412 of input matrix 410 and may be determined in each step a window having the same dimensions as filter 420 (e.g., 3×3) slides over input matrix 410 with a certain stride (e.g., 1 element horizontally and/or vertically). For example, the value of element 432 in row 1 and column 3 of output matrix 430 may be the dot-product between the matrix representing filter 420 and a matrix representing region 412 of input matrix 410, where 2×0+1×1+0×0+5×1+3×(−4)+2×1+2×0+1×1+1×0=1+5−12+2+1=−3. Similarly, the value of element 434 in row 4 and column 1 of output matrix 430 may be the dot-product between the matrix representing filter 420 and a matrix representing region 414 of input matrix 410, where 0×0+2×1+1×0+0×1+0×(−4)+1×1+5×0+3×1+2×0=2+1+3=6. For input matrix 410 with a 6×6 pixel array and filter 420 represented by a 3×3 matrix, output matrix 430 may be a 4×4 matrix when the stride used is one element or pixel.

A non-linear activation function (e.g., ReLU, sigmoid, tan h, etc.) may then be applied to output matrix 430 to generate a matrix 440 as shown in FIG. 4D. In the example shown in FIG. 4D, the ReLU function is used, and thus all negative values in output matrix 430 are replaced by 0s in matrix 440. A pooling operation (e.g., a max, average, or sum pooling operation) may be applied to matrix 440 to sub-sample or down-sample data in matrix 440. In the example shown in FIGS. 4D and 4E, a max pooling operation may be applied to matrix 440, where the 4×4 matrix 440 may be divided into four 2×2 regions 442, 444, 446, and 448. The maximum value of each region may be selected as a sub-sample representing each region. For example, a maximum value of 9 is selected from region 442, a maximum value of 2 is selected from region 444, a maximum value of 5 is selected from region 446, and a maximum value of 6 is selected from region 448. Thus, a feature map 450 with four elements 9, 2, 6, and 5 may be generated from the 6×6 input matrix 410 after the convolution, non-linear activation, and pooling operations.

Figure 5:
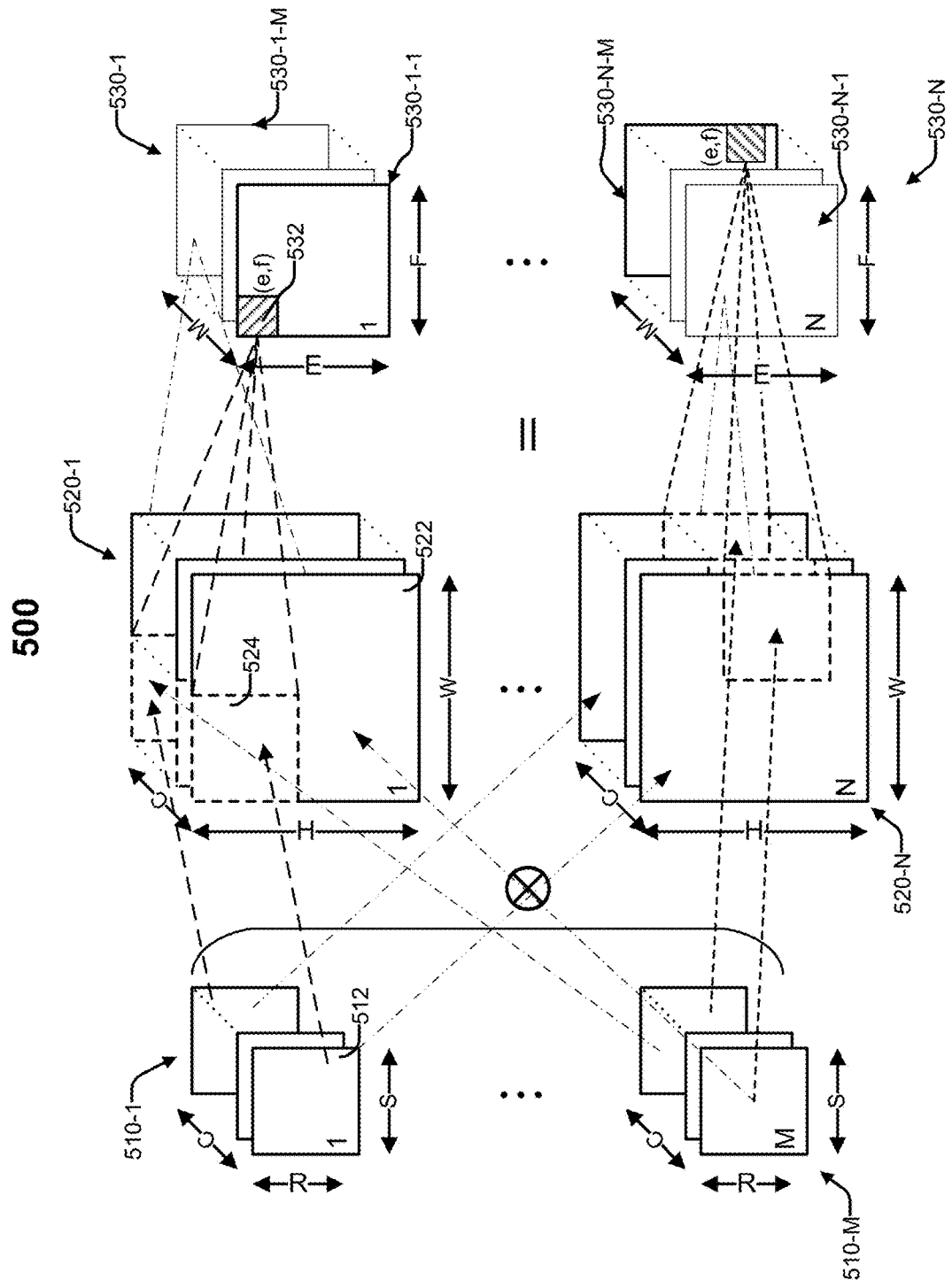
FIG. 5 illustrates an example of a model for a convolution layer of a convolutional neural network.

FIG. 5 illustrates an example of a model 500 for a convolution layer of a convolutional neural network used in, for example, image processing. As illustrated in the example, there may be multiple (e.g., N) 3-D inputs 520-1, . . . , and 520-N to the convolution layer. Each 3-D input may include C channels of 2-D input feature maps (with dimensions H×W). For the first convolution layer in a CNN, a 3-D input may include, for example, three channels of 2-D images, such as the red, green, and blue color channels. Multiple (e.g., M) 3-D filters 510-1, . . . and 510-M each having C 2-D filters of dimensions R×S may be convolved with the N 3-D inputs 520-1, . . . , and 520-N (e.g., N batches of C input feature maps of dimensions H×W) to generate multiple (e.g., N) 3-D outputs 530-1, . . . , and 530-N, where each of the 3-D outputs 530-1, . . . , and 530-N may include M output feature maps (also referred to as output channels). Each 3-D filter 510-1, . . . , or 510-M (with dimensions C×R×S) may be applied to a 3-D input 520-1, . . . , or 520-N (with dimensions C×H×W) to generate an output feature map (with dimensions E×F as described above with respect to FIGS. 3A and 3B) in a 3-D output 530-1, . . . , or 530-N that includes M output feature maps, and thus M 3-D filters may be used to generate the M output feature maps in a 3-D output for a 3-D input. For example, 3-D filter 510-1 may be applied to 3-D input 520-1 to generate an output feature map 530-1-1, . . . and 3-D filter 510-M may be applied to 3-D input 520-1 to generate an output feature map 530-1-M. The same M 3-D filters 510-1, . . . , and 510-M can be applied to each 3-D input 520-1, . . . , or 520-N to generate each respective 3-D output 530-1, . . . , or 530-N that includes M output feature maps. For example, 3-D filter 510-1 may be applied to 3-D input 520-N to generate an output feature map 530-N-1, and 3-D filter 510-M may be applied to 3-D input 520-N to generate an output feature map 530-N-M. Thus, there are N 3-D inputs and N 3-D outputs, where each 3-D output includes M output feature maps.

More specifically, as shown in FIG. 5, for a 3-D input 520-1, . . . , or 520-N and a 3-D filter 510-1, . . . , or 510-M, the C 2-D filters (each with dimensions R×S) in 3-D filter 510-*m* may correspond to the C channels of 2-D input feature maps (each with dimensions H×W) in the 3-D input, and the convolution operation between each 2-D filter of the C 2-D filters and the corresponding channel of the C channels of 2-D input feature maps may be performed. The convolution results for C pairs of 2-D filter and corresponding 2-D input feature map can be summed to generate a convolution output (e.g., a pixel) $O_{e,f}^m$ on an output feature map of index m in the M output feature maps in a 3-D output 530-1, . . . , or 530-N as follows:

$$O_{e,f}^m = \sum_{r=0}^{R-1} \sum_{s=0}^{S-1} \sum_{c=0}^{C-1} X_{eD+r, fD+s}^c \times W_{r,s}^{c,m}, \quad (3)$$

where m corresponds to the index of the output feature map and the index of the 3-D filter in the M 3-D filters. $X^c_{eD+r,fD+s}$ is the value of a pixel with a horizontal pixel coordinate of eD+r and a vertical pixel coordinate of fD+s in an input feature map of index C in the C channels of 2-D input feature maps in a 3-D input. D is the sliding-window stride distance. e and f are the coordinates of the output pixel in the corresponding output feature map of the M output feature maps and may correspond to a particular sliding window. r and s correspond to a particular location (e.g., pixel or element) within a sliding window or a 2-D filter. $W^{c,m}_{r,s}$ is a weight corresponding to a pixel at a location (r, s) of a 2-D filter of index C in the 3-D filter of index m. Equation (3) indicates that, to compute each convolution output (e.g., pixel) $O_{e,f}^m$ at a location (e, f) on an output feature map m, each pixel $X^c_{eD+r,fD+s}$ within a sliding window in an input feature map of index C may be multiplied with a corresponding weight $W^{c,m}_{r,s}$ to generate a product, the partial sum of the products for the pixels within each sliding window in the input feature map of index C can be computed, and then a sum of the partial sums for all C input feature maps can be computed to determine the value of the pixel $O_{e,f}^m$ at a location (e,f) in the corresponding output feature map of index m in the M output feature maps.

In one example, for 3-D filter 510-1 and 3-D input 520-1, each 2-D filter 512 in the C 2-D filters in 3-D filter 510-1 may correspond to a respective input feature map 522 in 3-D input 520-1 and may be used to convolve with (e.g., filter) the corresponding input feature map 522, where each pixel in a sliding window 524 in input feature map 522 may be multiplied with a corresponding pixel in 2-D filter 512 to generate a product, and the products for all pixels in sliding window 524 may be summed to generate a partial sum. The partial sums for the C 2-D filters 512 (and corresponding input feature map 522) may be added together to generate an output pixel 532 at a location (e, f) on output feature map 530-1-1 in 3-D output 530-1. Sliding window 524 may be shifted on all C input feature maps 522 in 3-D input 520-1 based on the strides D in the two dimensions to generate another output pixel 532 at a different location on output feature map 530-1-1 in 3-D output 530-1. Sliding window 524 may be repeatedly shifted together on all C input feature maps 522 until all output pixels 532 on output feature map 530-1-1 in 3-D output 530-1 are generated.

Each 3-D filter 510-2, . . . , or 510-M may be used to convolve with 3-D input 520-1 as described above with respect to 3-D filter 510-1 to generate each respective output feature map 530-1-2, . . . , or 530-1-M in 3-D output 530-1. Similarly, each 3-D filter 510-1, . . . , or 510-M may be used to convolve with 3-D input 520-N as described above with respect to 3-D filter 510-1 and 3-D input 520-1 to generate each respective output feature map 530-N-1, . . . , or 530-N-M in 3-D output 530-N.

Figure 6:
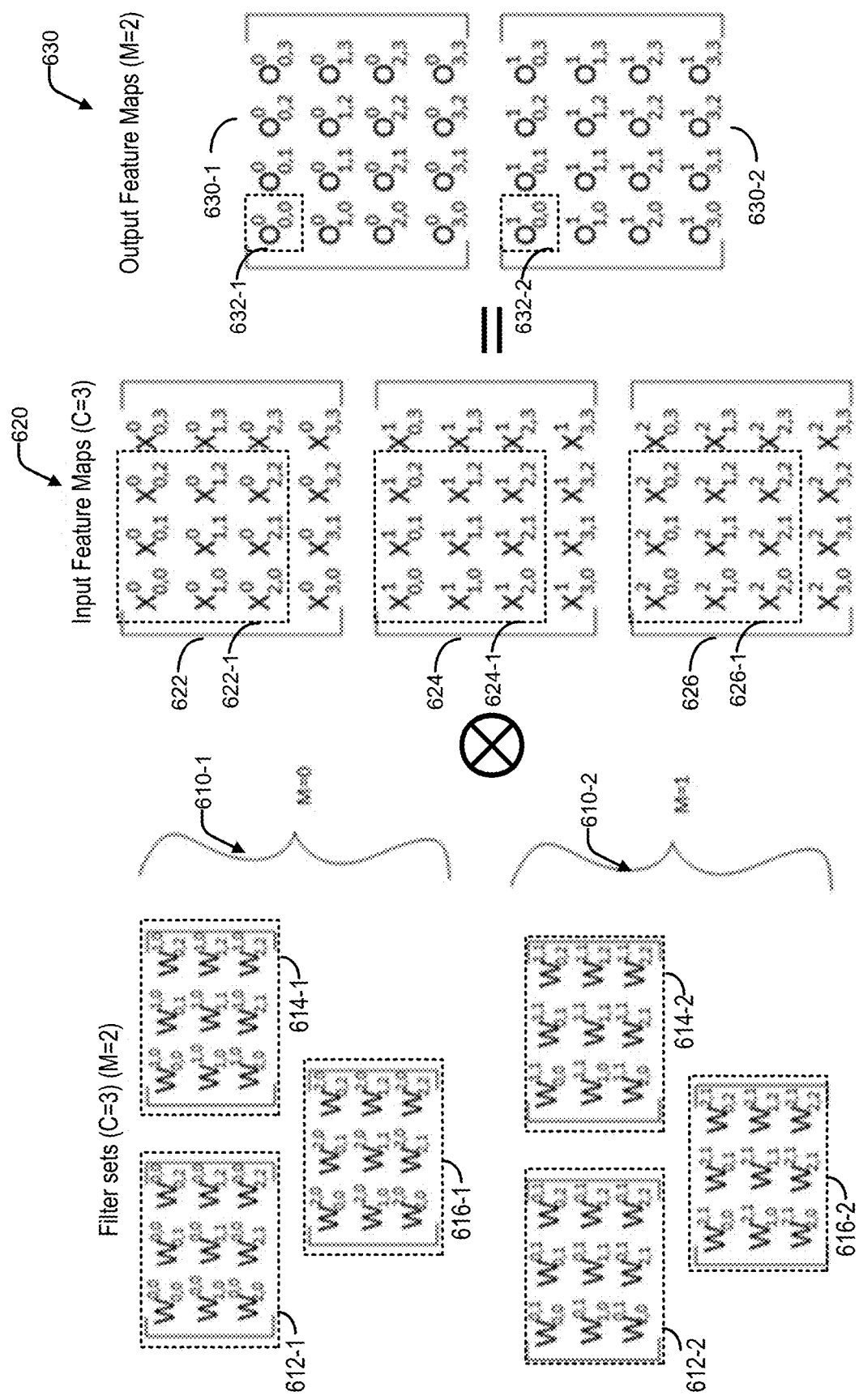
FIG. 6 illustrates an example of a convolution operation involving one batch (N=1) of C channels of input data and M sets of C filters.

FIG. 6 illustrates an example of a convolution operation involving one batch (N=1) of C channels (C=3) of input data 620 and M sets (M=2) of C filters (C=3). The example shown in FIG. 6 may be a specific example of model 500 described with respect to FIG. 5, where the number of batches N is one. As illustrated, input data 620 includes 3 input feature maps 622, 622, and 624 (e.g., input channels), each corresponding to an input channel. The filters include a first set of filters 610-1 and second set of filters 610-2, where first set of filters 610-1 may include three 2-D filters 612-1, 614-1, and 616-1 and second set of filters 610-2 may include three 2-D filters 612-2, 614-2, and 616-2.

Each 2-D filter 612-1, 614-1, or 616-1 in first set of filters 610-1 may convolve with the corresponding input feature map 622, 622, or 624, and the results of the convolutions for the three input feature maps may be added to generate an output feature map 630-1 in output feature maps 630. For example, pixels in filter 612-1 may be multiplied with corresponding pixels in window 622-1 on input feature map 622 and the products may be added to generate a first partial sum. Pixels in filter 614-1 may be multiplied with corresponding pixels in window 624-1 on input feature map 624 and the products may be added to generate a second partial sum. Pixels in filter 616-1 may be multiplied with corresponding pixels in window 626-1 on input feature map 626 and the products may be added to generate a third partial sum. The first, second, and third partial sums may be added together to generate an output pixel 632-1 on output feature map 630-1. Other output pixels on output feature map 630-1 may be generated in a same manner by shifting the windows or filters together on the input feature maps.

Similarly, each 2-D filter 612-2, 614-2, or 616-2 in second set of filters 610-2 may convolve with the corresponding input feature map 622, 622, or 624, and the results of the convolutions for the three input feature maps may be summed to generate an output feature map 630-2 in output feature maps 630. For example, pixels in filter 612-2 may be multiplied with corresponding pixels in window 622-1 on input feature map 622 and the products may be added to generate a first partial sum. Pixels in filter 614-2 may be multiplied with corresponding pixels in window 624-1 on input feature map 624 and the products may be added to generate a second partial sum. Pixels in filter 616-2 may be multiplied with corresponding pixels in window 626-1 on input feature map 626 and the products may be added to generate a third partial sum. The first, second, and third partial sums may be added together to generate an output pixel 632-2 on output feature map 630-2. Other output pixels on output feature map 630-2 may be generated in a same manner by shifting the windows or filters together on the input feature maps.

Operation of a neural network (e.g., conducting inference), as illustrated by the models discussed above, generally involves fetching input data or input activations, executing multiply-and-accumulate operations in parallel for each node in a layer, and providing output activations. Optimum performance of a neural network, measured by response time, can be achieved when a hardware architecture is capable of highly parallelized computations. Central Processing Units (CPUs), which can also be referred to as general purposed processing units, can have multiple cores, (e.g., 2 to 64 or more cores) and can increase parallelism through use of multiple execution threads. CPU cores, however, tend to be optimized for sequential processing. For this and other reasons, CPUs thus tend to have slow response times when performing inference for a neural network. Graphics Processing Units (GPUs) can achieve parallelism by having thousands of small and efficient cores, configured specifically for conducting parallel computations. GPUs thus can achieve far better performance than a CPU when executing a neural network. Individual GPU computation engines, however, can still be primarily sequential in nature, such that memory operations are required for the outputs of one computation engine to be provided to the inputs of another. The speed of a neural network may also be limited by memory latency or data transfer bandwidth.

Special-purpose or domain-specific neural network processors can achieve better performance than both CPUs and GPUs when executing a neural network. Neural network processors can employ a spatial architecture including a processing element (PE) array, in which the processing elements may form processing chains and can pass data directly from one processing element to another. This can significantly reduce the number of memory transactions. In some examples, the weights or inputs can be pre-loaded into the processing element array. In some examples, neural network processors can also include an on-chip buffer that can store values read from processor memory, and that can distribute values to multiple computation engines in the processor. The computation engines can further include a small, local register file (e.g., a small memory) for storing intermediate results. Having an on-chip memory hierarchy can improve the efficiency of the operation of a neural network by reducing memory latencies.

Figure 7:
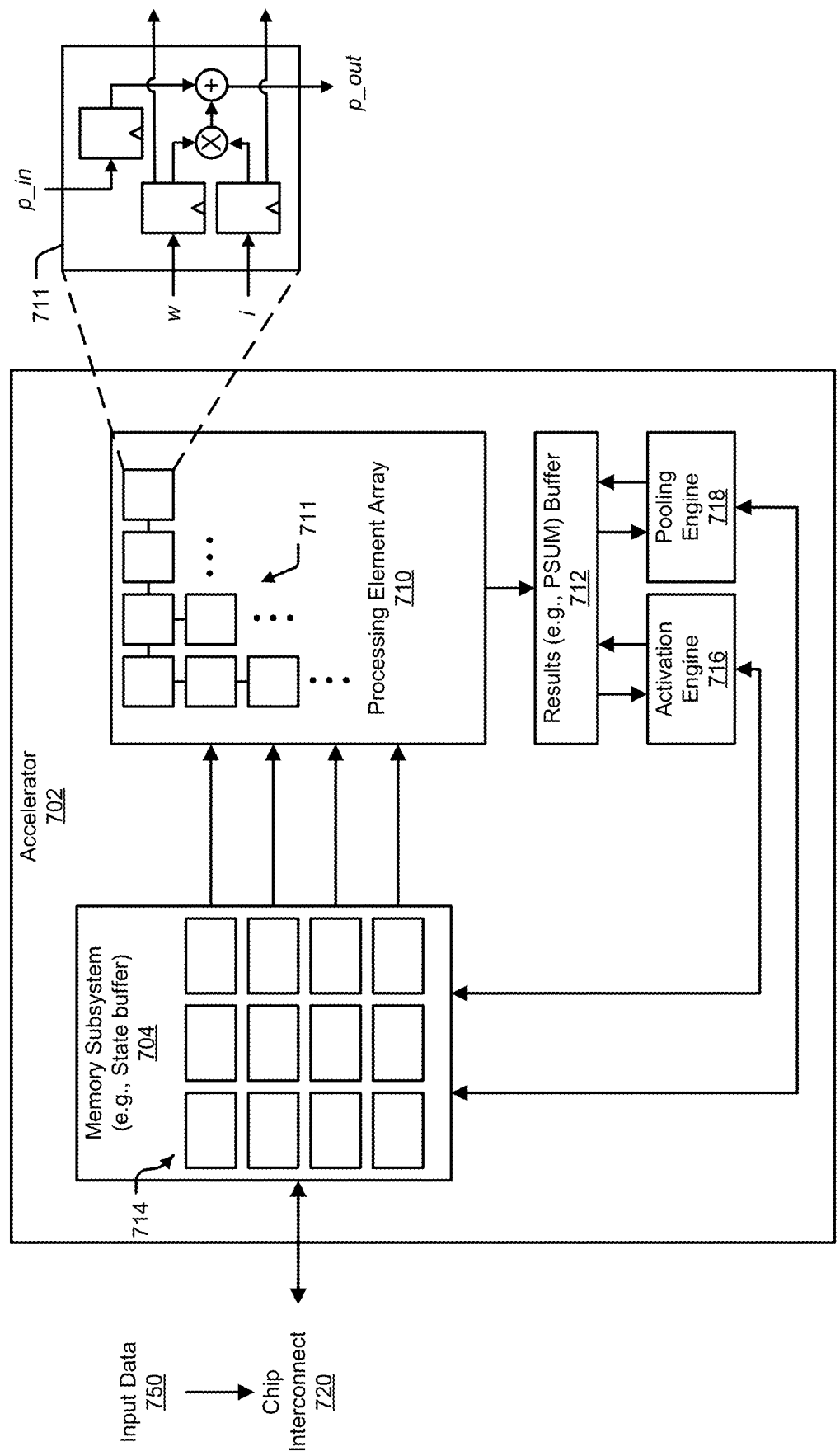
FIG. 7 is a simplified block diagram illustrating an example of an integrated circuit device for performing neural network operations according to certain embodiments.

FIG. 7 is a block diagram illustrating an example of an integrated circuit device for performing neural network operations, such as tensor operations, according to certain embodiments. The example shown in FIG. 7 includes an accelerator 702. In various examples, accelerator 702 can execute computations for a set of input data (e.g., input data 750) using a processing element array 710, an activation engine 716, and/or a pooling engine 718. In some examples, accelerator 702 may be an integrated circuit component of a processor, such as a neural network processor. The processor may have other integrated circuit components, including additional accelerator engines.

In some embodiments, accelerator 702 may include a memory subsystem 704 (e.g., state buffer) that includes multiple memory banks 714. Each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 independently accessible can increase the efficiency of accelerator 702. For example, values can be simultaneously read and provided to each row of processing element array 710, so that the entire processing element array 710 can be in use in one clock cycle. As another example, memory banks 714 can be read at the same time that results computed by processing element array 710 are written to memory subsystem 704. In contrast, a single memory may be able to service only one read or write at a time. With a single memory, multiple clock cycles can be required, for example, to read input data for each row of processing element array 710 before processing element array 710 can be started.

In various implementations, memory subsystem 704 can be configured to simultaneously service multiple clients, including processing element array 710, activation engine 716, pooling engine 718, and any external clients that access memory subsystem 704 over a communication fabric 720. In some implementations, being able to service multiple clients can mean that memory subsystem 704 has at least as many memory banks as there are clients. In some cases, each row of processing element array 710 can count as a separate client. In some cases, each column of processing element array 710 can output a result, such that each column can count as a separate write client. In some cases, output from processing element array 710 can be written into memory banks 714 that can then subsequently provide input data for processing element array 710. As another example, activation engine 716 and pooling engine 718 can include multiple execution channels, each of which can be separate memory clients. Memory banks 714 can be implemented, for example, using static random access memory (SRAM).

In various implementations, memory subsystem 704 can include control logic. The control logic can, for example, keep track of the address spaces of each of memory banks 714, identify memory banks 714 to read from or write to, and/or move data between memory banks 714. In some implementations, memory banks 714 can be hardwired to particular clients. For example, a set of memory banks 714 can be hardwired to provide values to the rows of processing element array 710, with one memory bank servicing each row. As another example, a set of memory banks can be hard wired to receive values from columns of processing element array 710, with one memory bank receiving data for each column.

Processing element array 710 is the computation matrix of accelerator 702. Processing element array 710 can, for example, execute parallel integration, convolution, correlation, and/or matrix multiplication, among other things. Processing element array 710 includes multiple processing elements 711, arranged in rows and columns, such that results output by one processing element 711 can be input directly into another processing element 711. Processing elements 711 that are not on the outside edges of processing element array 710 thus can receive data to operate on from other processing elements 711, rather than from memory subsystem 704.

In various examples, processing element array 710 uses systolic execution, in which data arrives at each processing element 711 from different directions at regular intervals. In some examples, input data can flow into processing element array 710 from the left and weight values can be loaded at the top. In some examples weights and input data can flow from the left and partial sums can flow from top to bottom. In these and other examples, a multiply-and-accumulate operation moves through processing element array 710 as a diagonal wave front, with data moving to the right and down across the array. Control signals can be input at the left at the same time as weights, and can flow across and down along with the computation.

In various implementations, the number of columns in processing element array 710 determines the computational capacity of processing element array 710, and the number of rows determines the required memory bandwidth for achieving maximum utilization of processing element array 710. Processing element array 710 can have, for example, 64 columns and 128 rows, or some other number of columns and rows.

An example of a processing element 711 is illustrated in FIG. 7 in an inset diagram. As illustrated by this example, processing element 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 711.

In the illustrated example, an input from above can include a partial sum, p_in, provided either from another processing element 711 or from a previous round of computation by processing element array 710. When starting a computation for a new set of input data, the top row of processing element array 710 can receive a fixed value for p_in, such as zero. As illustrated by this example, i and w are multiplied together and the result is summed with pin to produce a new partial sum, p_out, which can be input into another processing element 711. Various other implementations of processing element 711 are possible.

Outputs from the last row in processing element array 710 can be temporarily stored in a results buffer 712 (e.g., partial sum (PSUM) buffer). The results can be intermediate results, which can be written to memory banks 714 to be provided to processing element array 710 for additional computation. Alternatively, the results can be final results, which, once written to memory banks 714 can be read from memory subsystem 704 over communication fabric 720, to be output by the system.

In some implementations, accelerator 702 includes an activation engine 716. In these implementations, activation engine 716 can combine the results from processing element array 710 into one or more output activations. For example, for a convolutional neural network, convolutions from multiple channels can be summed to produce an output activation for a single channel. In other examples, accumulating results from one or more columns in processing element array 710 may be needed to produce an output activation for a single node in the neural network. In some examples, activation engine 716 can be bypassed.

In various examples, activation engine 716 can include multiple separate execution channels. In these examples, the execution channels can correspond to the columns of processing element array 710, and can perform an operation on the outputs of a column, the result of which can be stored in memory subsystem 704. In these examples, activation engine 716 may be able to perform between 1 and N parallel computations, where N is equal to the number of columns in processing element array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 702 can include a pooling engine 718. Pooling is the combining of outputs of the columns of processing element array 710. Combining can include for example, computing a maximum value, a minimum value, an average value, a median value, a summation, a multiplication, or another logical or mathematical combination. In various examples, pooling engine 718 can include multiple execution channels that can operating on values from corresponding columns of processing element array 710. In these examples, pooling engine 718 may be able to perform between 1 and N parallel computations, where N is equal to the number of columns in processing element array 710. In various examples, execution channels of pooling engine 718 can operate in parallel and/or simultaneously. In some examples, pooling engine 718 can be bypassed.

Herein, activation engine 716 and pooling engine 718 may be referred to collectively as execution engines. Processing element array 710 is another example of an execution engine. Another example of an execution engine is a Direct Memory Access (DMA) engine, which may be located outside accelerator 702.

Input data 750 can arrive over communication fabric 720. Communication fabric 720 can connect accelerator 702 to other components of a processor, such as a DMA engine that can obtain input data 750 from an Input/Output (I/O) device, a storage drive, or a network interface. Input data 750 can be, for example one-dimensional data, such as a character string or numerical sequence, or two-dimensional data, such as an array of pixel values for an image or frequency and amplitude values over time for an audio signal. In some examples, input data 750 can be three-dimensional, as may be the case with, for example, the situational information used by a self-driving car or virtual reality data. In some implementations, memory subsystem 704 can include a separate buffer for input data 750. In some implementations, input data 750 can be stored in memory banks 714 when accelerator 702 receives input data 750.

In some examples, accelerator 702 can implement a neural network processing engine. In these examples, accelerator 702, for a set of input data 750, can execute a neural network to perform a task for which the neural network was trained. Executing a neural network on a set of input data can be referred to as inference or performing inference.

The weights for the neural network can be stored in memory subsystem 704, along with input data 750 on which the neural network will operate. The neural network can also include instructions, which can program processing element array 710 to perform various computations on the weights and the input data. The instructions can also be stored in memory subsystem 704, in memory banks 714 or in a separate instruction buffer. Processing element array 710 can output intermediate results, which represent the outputs of individual layers of the neural network. In some cases, activation engine 716 and/or pooling engine 718 may be enabled for computations called for by certain layers of the neural network. Accelerator 702 can store the intermediate results in memory subsystem 704 for inputting into processing element array 710 to compute results for the next layer of the neural network. Processing element array 710 can further output final results from a last layer of the neural network. The final results can be stored in memory subsystem 704 and then be copied out to host processor memory or to another location.

Figure 8:
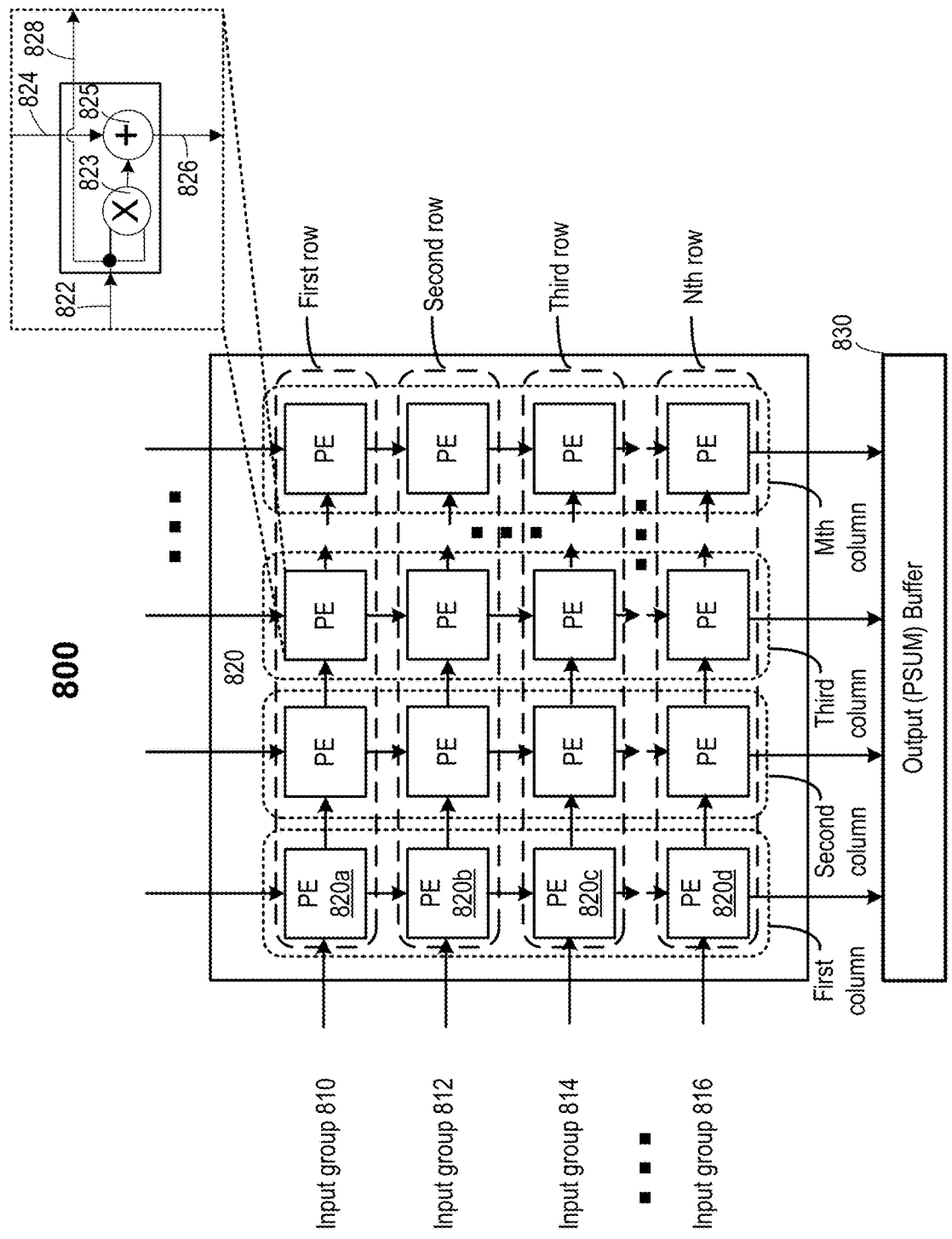
FIG. 8 illustrates a simplified example of a computing engine including a processing element array according to certain embodiments.

FIG. 8 illustrates a simplified example of a computing engine 800 including a processing element (PE) array 820 according to certain embodiments. Computing engine 800 may be a simplified example of accelerator 702 or PE array 710. In the example shown in FIG. 8, processing element array 820 may include an N×M array of PEs with NPEs in each of M columns and MPEs in each of N rows. In one example, N may be 128 and M may be 64, such that PE array 820 may include 8192 PEs.

Each PE may include a row input bus 822, a column input bus 824, a column output bus 826, and a row output bus 828. A PE may receive inputs from a preceding PE (on the left) in the same row (or from external circuitry) via row input bus 822. A PE may also receive inputs from a preceding PE (on top) in the same column (or from external circuitry) via column input bus 824. A PE may perform floating point or integer arithmetic operations (e.g., multiply and accumulate (MAC)) based on the inputs, and transmit the result of the arithmetic operations to a subsequent (lower) PE in the same column (or to external circuitry) via column output bus 826. A PE may also forward the inputs to a subsequent PE (to the right) in the same row, via row output bus 828.

Each row of PE array 820 may process one input data set comprising multiple input data elements, such as a one-dimensional vector representing a flattened multi-dimensional matrix. Each column of PE array 820 may generate a weighted sum of input data elements from different input data sets. For example, when computing engine 800 is to process N input pixel groups 810, 812, 814, . . . , and 816, a first row may receive input data elements of pixel group 810, a second row may receive input data elements of input pixel group 812, a third row may receive input data elements of input pixel group 814, . . . , and an Mth row may receive input data elements of input group 816. Each PE may include a multiplier 823 that would handle one input data element at a time. For example, the PE may receive an input data element and a weight (e.g., from row input bus 822) and generate, using multiplier 823, a multiplication product to represent a weighted input data element. The weight may be an element of a convolution kernel (e.g., filter) or a weight of a connection between nodes on two layers of a fully-connected layer. In addition, the PE may also receive a partial weighted sum from the preceding PE in the same column (e.g., from column input bus 824). The partial weighted sum represents the weighted sum of input data elements of input data sets received by PEs on rows above the PE. The PE may include an added 825 that may add the weighted input data element to the partial weighted sum, and pass the updated partial weighted sum to the PE below in the same column (e.g., through column output bus 826). The PE at the bottom row of each column may generate a weighted sum of input data elements received by all PEs in the column.

In some embodiments, the operations of each PE of PE array 820 may be synchronized to a clock signal to improve the interoperability between PE array 820 and other components of the neural network processor (e.g., accelerator 702). Each PE may also include sequential logic circuitries (e.g., registers, latches, flip-flops, state machines, etc.) to store input data, weights, and output data for the adder and multiplier circuitry, and to synchronize the flow of the data into and out of the circuitry. The sequential logic circuitry of each PE can be clocked by either the same clock signal or a replica of the clock signal, such that data may be synchronously shifted into and/or out of the PE sequentially during the clock cycles. For example, in some embodiments, in a first clock cycle, a PE 820b of the second row may receive a first input data element of pixel group 812 as well as a partial sum comprising weighted first input data element of pixel group 810 from PE 820a of the first row. Within the first clock cycle, PE 820b may multiply the input data element with a weight, add the multiplication product to the partial sum to generate an updated partial sum, and store the updated partial sum in an internal register. In the second clock cycle, PE 820b may forward the updated partial sum to a PE 820c on the third row below, which may perform the multiplication and accumulation to generate an updated partial sum. In the third clock cycle, PE 820c may forward the updated partial sum to a next PE on the fourth row below, which may perform the multiplication and accumulation to generate an updated partial sum. The updated partial sum may be propagated down along each column until it is output by PE 820d on the Mth row at the Mth clock cycle to an output buffer 830 (also referred to as a PSUM buffer).

In some implementations, each column of computing engine 800 may correspond to a processing node of a neural network layer, and may apply a different set of weights $\{w_i\}$ to generate a different weighted sum $y=\Sigma_{i=0}^{n} x_i w_i$ for each input dataset $\{x_i\}$.

In some embodiments, mapping the tensor operation described above with respect to FIGS. 5 and 6 and Equation (3) to a PE array (e.g., PE array 820) for execution may include mapping each of the M 3-D filters to a respective column of the PE array, and mapping each of the C input feature maps (e.g., C channels) in a 3-D input to a respective row of the PE array. For example, the H×W pixels in each 2-D input feature map may be flattened to form a one-dimensional vector and mapped to a row of the PE array. The C×R×S weights or pixels in each 3-D filter may be flattened to form a one-dimensional vector and mapped to a column of the PE array. Partial sums may be accumulated vertically in each column. In cases where a batch of N 3-D inputs each including C channels are processed, each row of the PE array may be mapped to N 2-D input feature maps.

As described above, movement of data, such as input pixels, filter weights, and partial sums to be accumulated, between PEs can reduce the access to the state buffers or off-chip memory. In some embodiments, the input feature map can be stationary and the weights of the filters can be shifted, which may be referred to as an "image-stationary" model. In some embodiments, a "weight-stationary" model may be used, where the weights of the filters are stationary (preloaded from a state buffer into the registers in the PE array) and the image is moving (loaded from the state buffer during computation), in order to minimize the cost of the movement of the weights. In some embodiments, the output of a PE may be stored in the register at the PE and remains stationary to minimize the cost of the movement of the partial sums, where the input feature maps and weights may move through the PE array and the state buffer.

Figure 9:
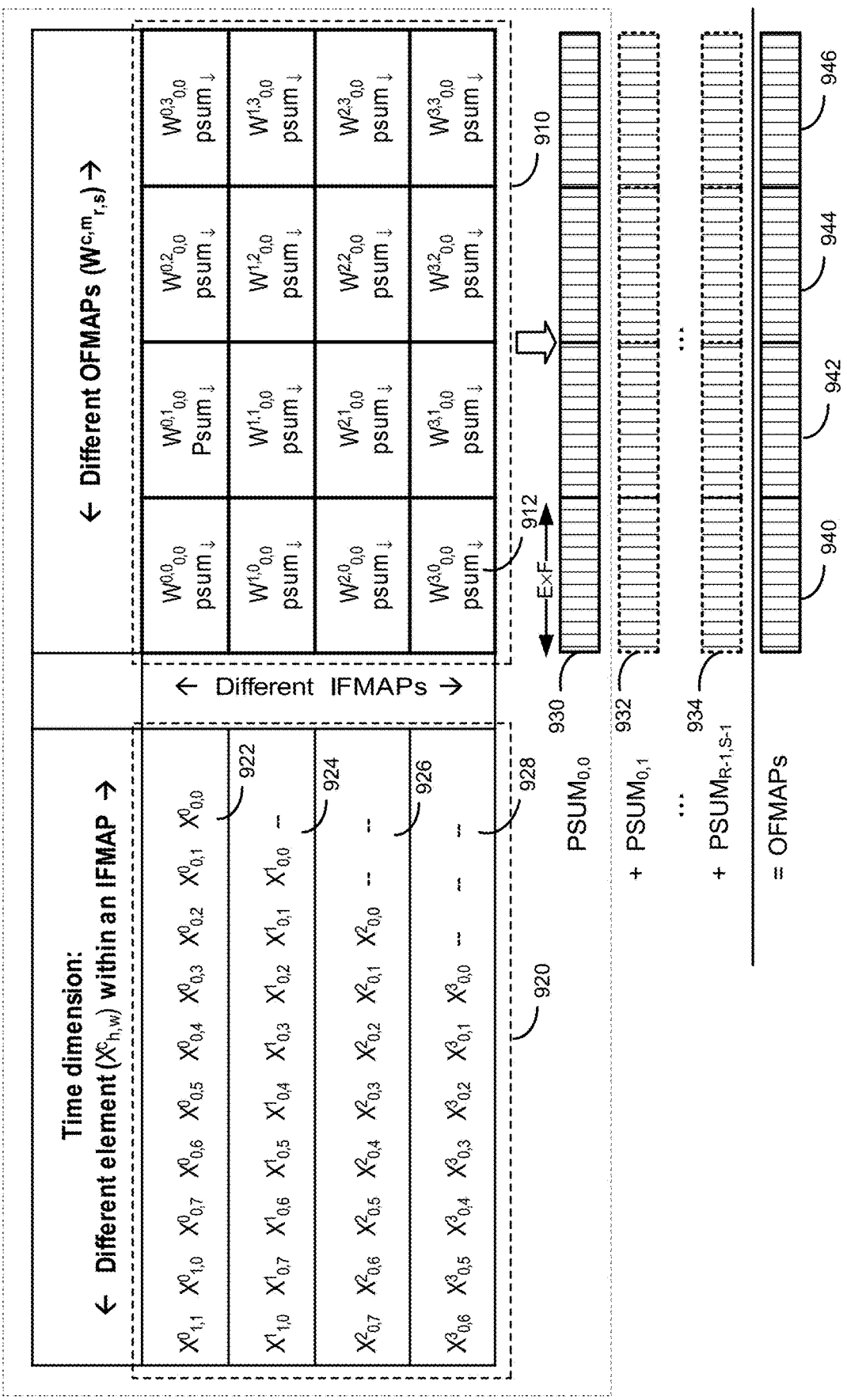
FIG. 9 illustrates a simplified example of weight-stationary convolution using an example of a computing engine having an array of processing elements according to certain embodiments.

FIG. 9 illustrates a simplified example of a weight-stationary convolution operation using an example of a computing engine including a processing element array 910 according to certain embodiments. In the example illustrated in FIG. 9, processing element array 910 includes four rows and four columns of processing elements 912. Inputs 920 to processing element array 910 may include four (corresponding to C) input channels 922, 924, 926, and 928. Each input channel may correspond to one input feature map or one input feature map in each of N (N=1 in the example) of inputs as described above. Each input feature map in the example may include an 8×8 matrix and may be flattened into a one-dimensional vector with 64 elements. PE array 910 may generate four (corresponding to M) output feature maps, one from each column of PE array 910.

During the convolution operation, a weight in each 2-D filter (with dimensions R×S) of the four 2-D filters in each of the four 3-D filters (with dimensions C×R×S) may be pre-loaded into PE array 910. For example, as shown in FIG. 9, the first element (r=0, s=0) in each of the four 2-D filters for the first output feature map (correspond to the first 3-D filter or m=0) may be loaded into a respective PE 912 of the four PEs in a first column of PE array 910, the first element (e.g., r=0, s=0) in each of the four 2-D filters for the second output feature map (correspond to the second 3-D filter or m=1) may be loaded into a respective PE 912 of the four PEs in a second column of PE array 910, the first element (r=0, s=0) in each of the four 2-D filters for the third output feature map (correspond to the third 3-D filter or m=2) may be loaded into a respective PE 912 of the four PEs in a third column of PE array 910, and the first element (r=0, s=0) in each of the four 2-D filters for the fourth output feature map (correspond to the fourth 3-D filter or m=3) may be loaded into a respective PE 912 of the four PEs in a fourth column of PE array 910. Thus, 16 values representing the first elements of 16 2-D filters in four 3-D filters are loaded into PE array 910. The elements in the one-dimensional vector for each input feature map may then be shifted into PE array 910 from, for example, a state buffer, and may be multiplied with the pre-loaded weights in PE array 910. The products in each column for the four channels 922, 924, 926, and 928 may be accumulated to generate four partial sum values. As the elements in the one-dimensional vector for each input feature map are shifted into PE array 910, a first partial sum vector $PSUM_{0,0}$ (930) that may include four partial sum sub-vectors for four output feature maps may be generated. In some embodiments, the shifting of the elements in the input feature maps may be based on the desired strides for the convolution, such that each partial sum sub-vector for an output feature map may include the desired number of elements (e.g., E×F as described above).

Sixteen (16) values representing the second elements (e.g., r=0, s=1) of the 16 2-D filters in the four 3-D filter may then be loaded into PE array 910. The elements in the one-dimensional vector for each input feature map may be shifted into PE array 910 and may be multiplied with the pre-loaded weights in PE array 910. The products in each column may be accumulated to generate a second partial sum vector $PSUM_{0,1}$ (932) that includes four partial sum sub-vectors for the four output feature maps. Each element in the 16 2-D filters may be loaded into PE array 910 and multiplied with the elements in the one-dimensional vector to generate a partial sum vector that includes four partial sum sub-values for the four output feature maps until a partial sum vector $PSUM_{R-1,S-1}$ (934) that corresponds to the element (R−1, S−1) in each 2-D filter and includes four partial sum sub-vectors for the four output feature maps is generated. The partial sum sub-vectors in partial sum vectors $PSUM_{0,0}$ (930), $PSUM_{0,1}$ (932), . . . and $PSUM_{R-1,S-1}$ (934) and corresponding to each respective output feature map may be accumulated to generate a respective vector 940, 942, 944, or 946 that may correspond to a flattened output feature map.

As described above, a neural network model may include multiple convolution layers and thus the neural network may perform multiple convolution operations (e.g., tensor operations) to extract features and make an inference. In some embodiments, a convolution operation may need to be split into multiple convolution operations to be performed in serial due to the limited size (e.g., 128×64) of the PE array in an accelerator.

Figure 10B:
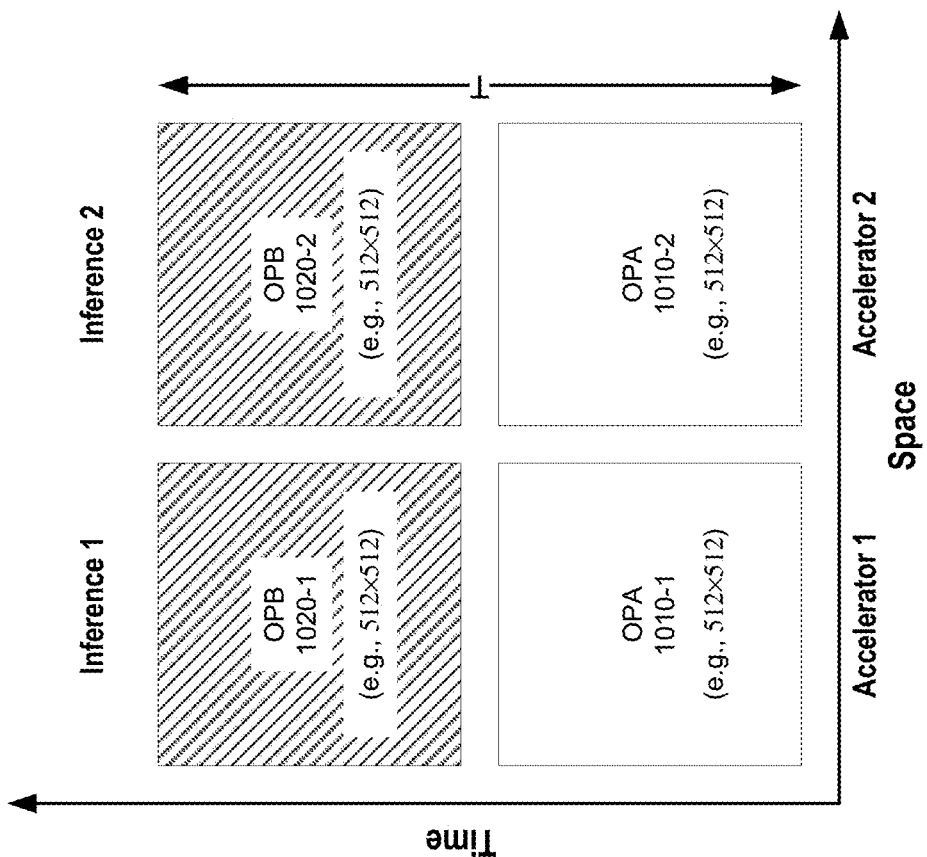
FIG. 10B illustrates an example of making parallel inferences using multiple computing engines.
Figure 10A:
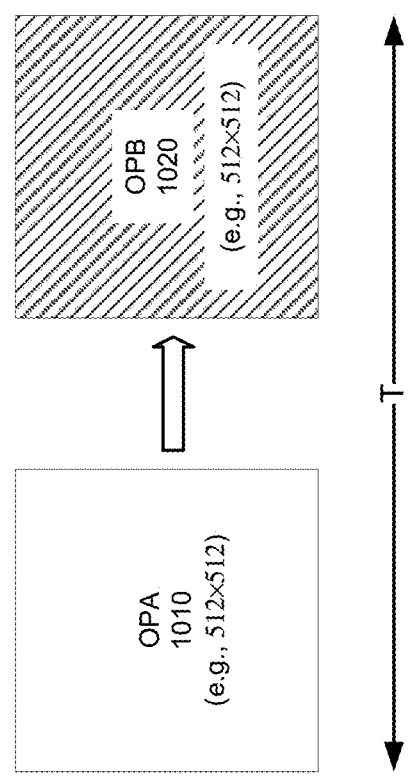
FIG. 10A illustrates a series of operations for making an inference using a neural network model.

FIG. 10A illustrates an example of a series of operations for making an inference using a neural network model. In the example shown in FIG. 10, two operations including an Operation A (1010) and an Operation B (1020) may need to be performed to make an inference. Operation A (1010) may, for example, generate 512 output feature maps from 512 input feature maps. Operation B (1020) may, for example, generate 512 output feature maps from 512 input feature maps. Operation A (1010) and Operation B (1020) can be performed sequentially on a computing engine (e.g., an accelerator) in a time period T. In some embodiments, to increase the throughput of the inferences, multiple computing engines may be used to make inferences in parallel.

FIG. 10B illustrates an example of making parallel inferences using multiple computing engines. For example, accelerator 1 may perform Operation A (1010-1) and Operation B (1020-1) sequentially during a time period T. Accelerator 2 may perform Operation A (1010-2) and Operation B (1020-2) sequentially during the same time period T. Thus, during time period T, two inferences can be made. As such, the throughput of the system and the average time for making an inference by the system may be improved by using multiple processing engines in parallel. However, the latency for making an inference remains unchanged (e.g., T).

Figure 11:
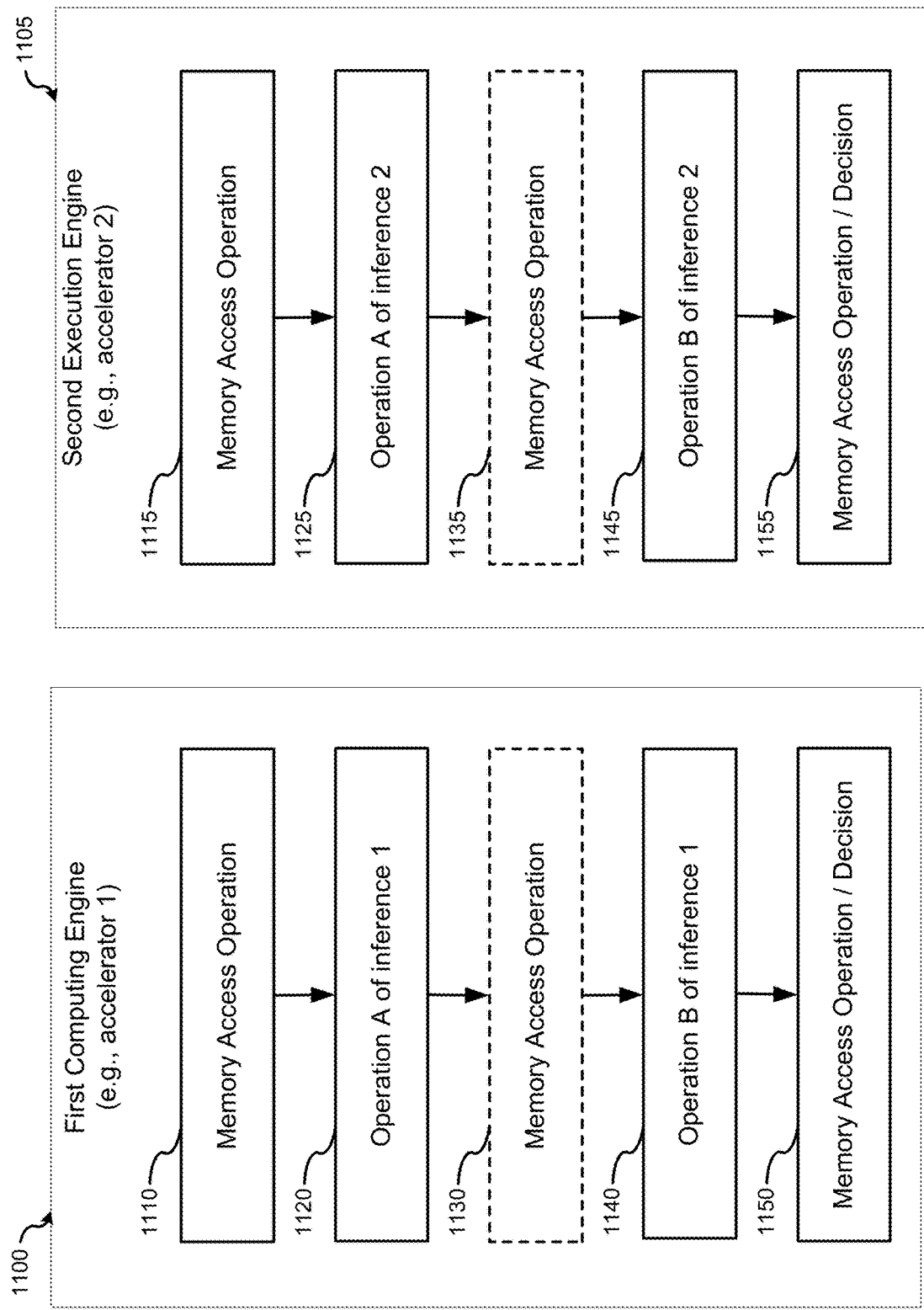
FIG. 11 illustrates examples of operations performed by multiple computing engines for making parallel inferences.

FIG. 11 illustrates examples of operations performed by multiple computing engines for making parallel inferences as shown in, for example, FIG. 10B. The operations performed by a first computing engine may be illustrated by a dataflow graph 1100, and the operations performed by a second computing engine may be illustrated by a dataflow graph 1105. Dataflow graph 1100 and dataflow graph 1105 may be generated, for example, by a compiler. The multiple computing engines may be on a same integrated circuit device or on multiple integrated circuit devices. Examples of types of computing engines may include a processing element array, an activation engine, and a pooling engine, among other examples. In various examples, each node in a dataflow graph may represent an operation to be performed by a particular computing engine of the integrated circuit device. The operations can include, for example, memory access (e.g., read/write), computation, and decision making.

In the example shown in FIG. 11, dataflow graph 1100 may include a node 1110 that may include a memory access operation (e.g., a memory read operation), a node 1120 that may include a convolution operation A (e.g., in a first convolution layer) for a first inference, a node 1130 that may include a memory access operation (e.g., including memory read and write operations), a node 1140 that may include a convolution operation B (e.g., in a second convolution layer) for the first inference, and a node 1150 that may include a memory access operation (e.g., a memory write operation) and/or a decision making operation. Similarly, dataflow graph 1105 may include a node 1115 that may include a memory access operation (e.g., a memory read operation), a node 1125 that may include a convolution operation A (e.g., in a first convolution layer) for a second inference, a node 1135 that may include a memory access operation (e.g., including memory read and write operations), a node 1145 that may include a convolution operation B (e.g., in a second convolution layer) for the second inference, and a node 1155 that may include a memory access operation (e.g., a memory write operation) and/or a decision making operation.

The connections between nodes in dataflow graph 1100 and dataflow graph 1105 may be referred to as edges and, in some cases, may represent data and/or resource dependencies between the nodes. A data dependency can occur, for example, when a computing engine uses the output of another computing engine as in input for a computation. Two operations have no data dependency when neither operation needs to use the output data generated by the other operation as input data. A resource dependency can occur, for example, when a first computing engine needs to use a memory location that a second computing engine also needs to use. For example, the second computing engine may need to write a value to the memory location, while the first computing engine may need to read the value and use the value in a computation at the same time. As another example, the first execution engine may (due to, for example, limited memory available) need to write a value to a memory location, while the second computing engine is reading or writing a value to the same memory location. Due to the data and/or resource dependencies between the nodes, some operations may need to be performed sequentially, where one operation may be started only after an event has occurred, and the event may occur when another operation has been completed.

In some embodiments, there may not be data and/or resource dependencies between some operations, or the operations may be arranged such that there may not be data and/or resource dependencies between some operations. Therefore, these operations may not need to be performed sequentially. As such, these operations may be performed in parallel by multiple computing engines to reduce the latency for performing these operations.

Figure 12:
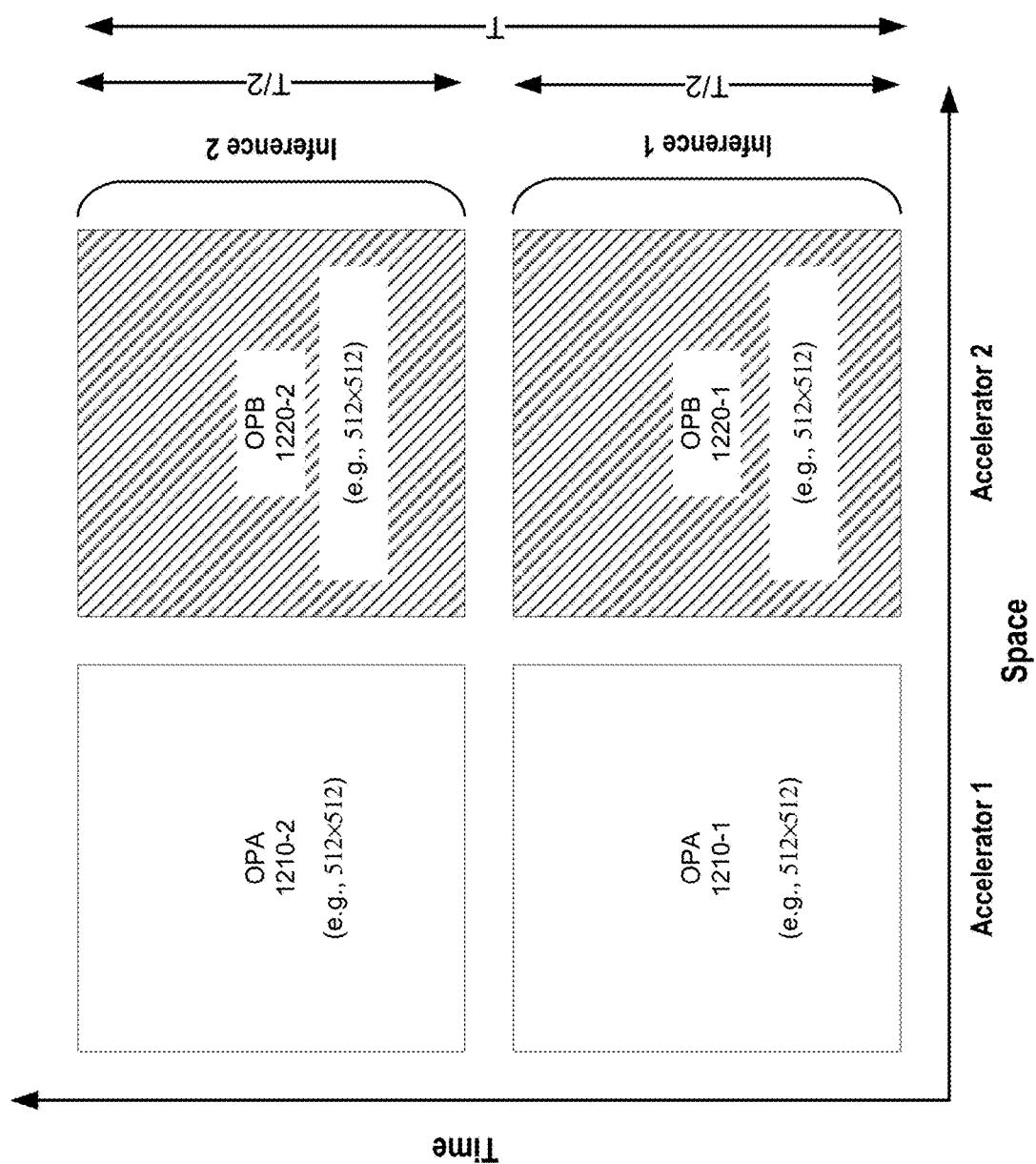
FIG. 12 illustrates an example of making an inference using multiple computing engines by assigning operations of a neural network to the multiple computing engines according to certain embodiments.

FIG. 12 illustrates an example of making an inference using multiple computing engines according to certain embodiments. In the example shown in FIG. 12, two operations including an Operation A and an Operation B may need to be performed to make an inference. Operation A may, for example, generate 512 output feature maps from 512 input feature maps. Operation B may, for example, generate 512 output feature maps from 512 input feature maps. Operation A and Operation B may be designed such that there are no data and/or resource dependencies between them. To make a first inference, accelerator 1 may perform Operation A (1210-1) and accelerator 2 may perform Operation B (1220-1) at the same time. Thus, the first inference may be made in a time period T/2. After the first inference, accelerator 1 may perform Operation A (1210-2) and accelerator 2 may perform Operation B (1220-2) at the same time during a time period T/2 to make a second inference. As such, the throughput of the system and the average time for making an inference may be improved by using multiple processing engines in parallel, and the latency for making an inference may also be reduced (e.g., to about T/2). It is noted that the inference time period or latency is T/2 when only the computing time using the PE array is considered, where other operations, such as memory access operations, are not included.

Figure 13:
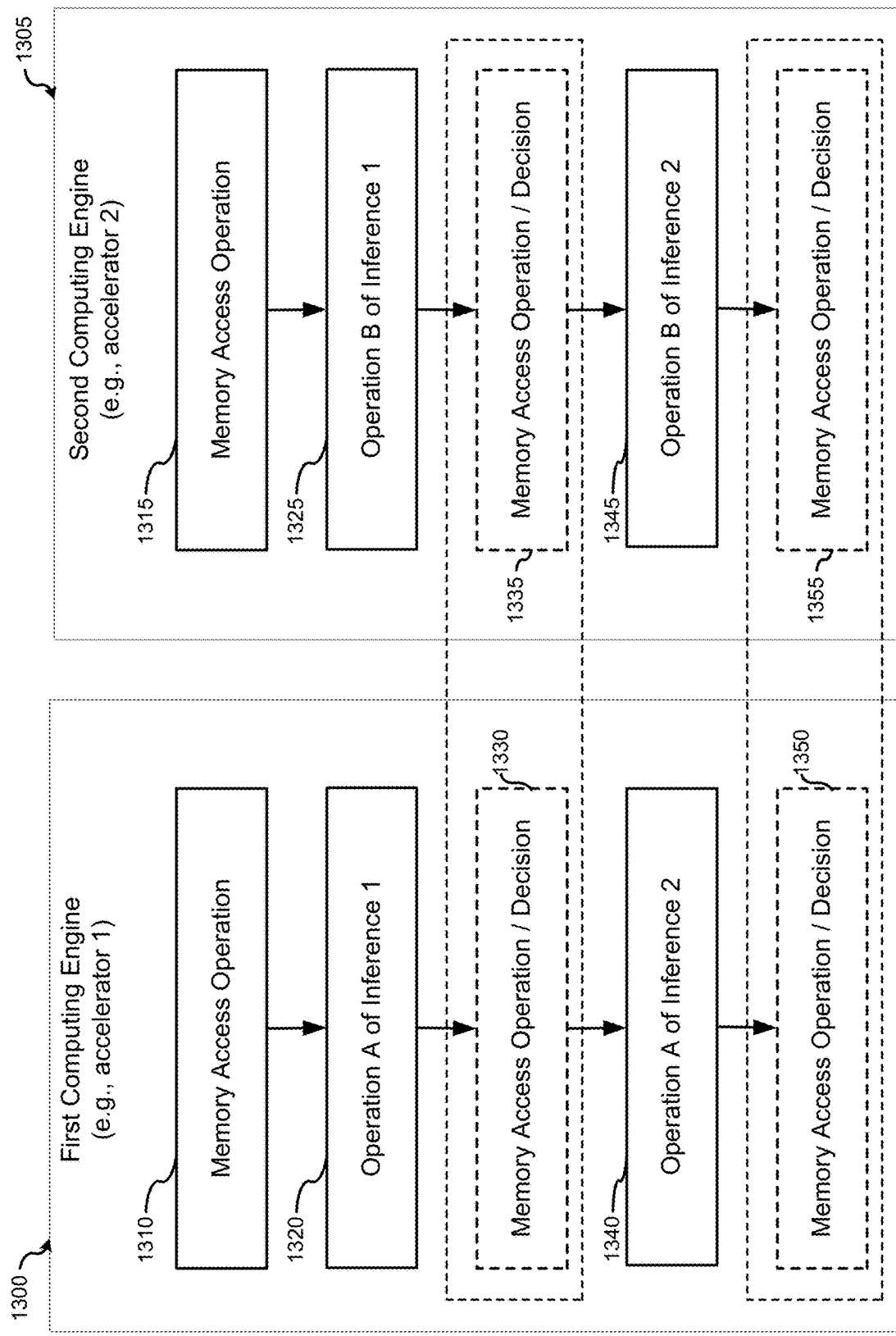
FIG. 13 illustrates examples of operations performed by multiple computing engines for making an inference according to certain embodiments.

FIG. 13 illustrates examples of operations performed by multiple computing engines for making an inference according to certain embodiments as shown in, for example, FIG. 12. As described above with respect to FIG. 12, each inference may include an Operation A (e.g., a tensor operation, such as a convolution operation) and an Operation B (e.g., a tensor operation, such as a convolution operation). The operations performed by a first computing engine may be illustrated by a dataflow graph 1300, and the operations performed by a second computing engine may be illustrated by a dataflow graph 1305. Dataflow graph 1300 and dataflow graph 1305 may be generated, for example, by a compiler. The multiple computing engines may be on a same integrated circuit device or on multiple integrated circuit devices.

Dataflow graph 1300 may include anode 1310 that may include a memory access operation (e.g., a memory read operation), a node 1320 that may include a convolution operation A for a first inference, a node 1330 that may include a memory access operation (e.g., including memory write and/or read operations) and/or a decision making operation, a node 1340 that may include a convolution operation A for the second inference, and a node 1350 that may include a memory access operation (e.g., a memory write operation) and/or a decision making operation. Similarly, dataflow graph 1305 may include a node 1315 that may include a memory access operation (e.g., a memory read operation), a node 1325 that may include a convolution operation B for the first inference, a node 1335 that may include a memory access operation (e.g., including memory write and/or read operation) and/or a decision making operation, a node 1345 that may include a convolution operation B for the second inference, and a node 1355 that may include a memory access operation (e.g., a memory write operation) and/or a decision making operation. In some embodiments, a prediction or decision may be made based on the combined operations at node 1330 and node 1335. In some embodiments, a prediction or decision may be made based on the combined operations at node 1350 and node 1355.

In some embodiments, it may be desirable to make a prediction or decision as soon as possible in some applications, such as some applications where the prediction or decision may be used for real-time control or other real-time operations. In some cases, an early prediction or decision may be made using a portion of the output feature maps, such as some but not all output feature maps, or a portion (e.g., a few rows) in each output feature map. Thus, a tensor operation, such as a convolution operation, can be divided into multiple sub-operations, where each sub-operation may be performed by a computing engine to generate a portion of the output feature maps, and the results of the sub-operations may be used individually or in combination to make an earlier prediction or decision.

Figure 14:
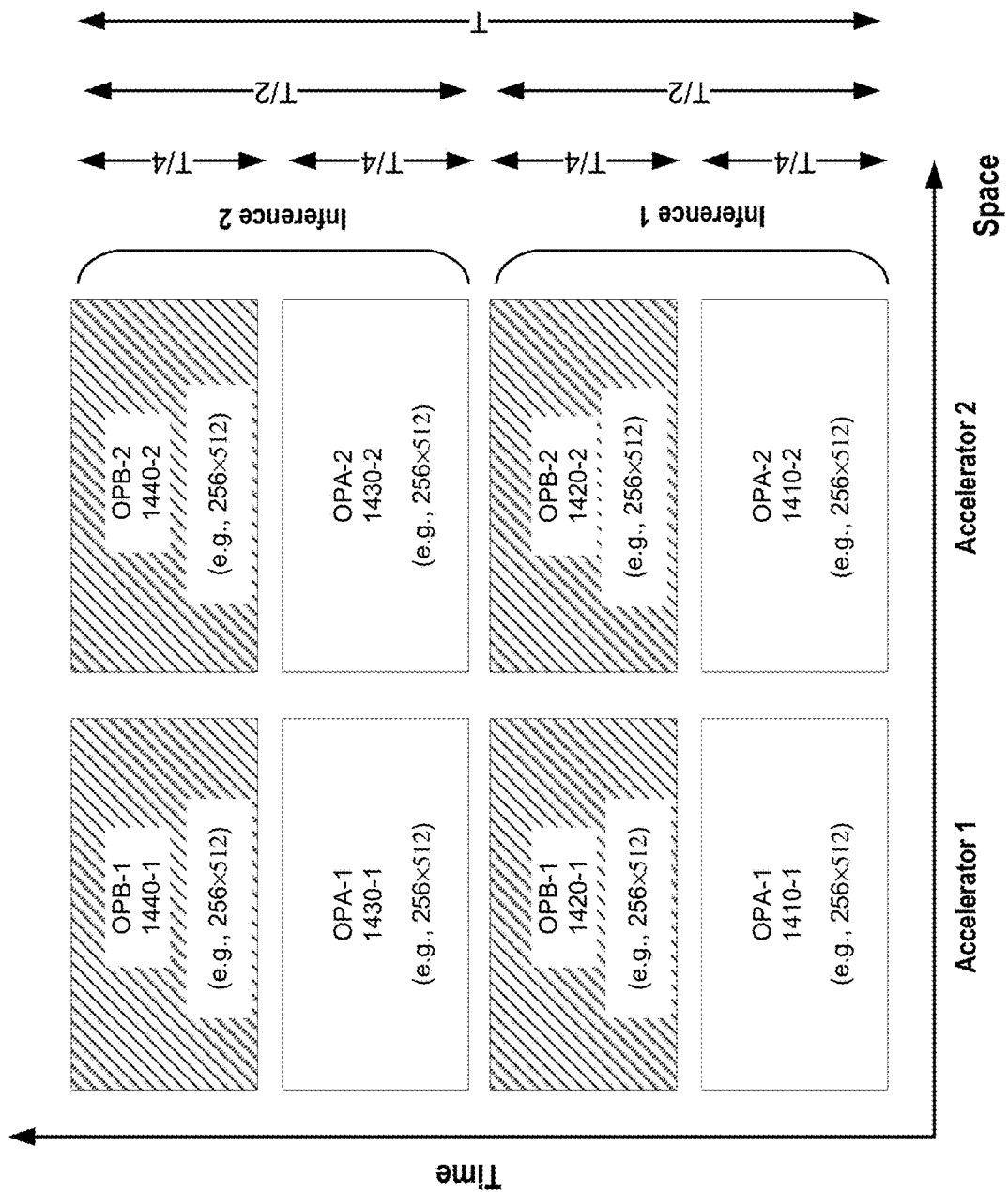
FIG. 14 illustrates an example of making an inference using multiple computing engines by splitting an operation of a neural network into sub-operations to be performed in parallel by the multiple computing engines according to certain embodiments.

FIG. 14 illustrates an example of making an inference using multiple computing engines by splitting an operation of a neural network into sub-operations that can be performed in parallel by the multiple computing engines according to certain embodiments. In the example shown in FIG. 14, two operations including an Operation A and an Operation B may need to be performed to make an inference. Operation A may, for example, generate 512 output feature maps from 512 input feature maps. Operation B may, for example, generate 512 output feature maps from 512 input feature maps. There may or may not be data and/or resource dependencies between Operation A and an Operation B.

In order to reduce the latency of the inference, Operation A may be divided into sub-operations that do not have data and/or resource dependencies between them, such that the sub-operations may be performed in parallel by different computing engines, where each sub-operation may be performed by a respective computing engine and may generate a portion of the output feature maps. For example, Operation A may be divided into two sub-operations that do not have data and/or resource dependencies between them, where neither sub-operation needs to use the output data generated by the other sub-operation as input data. Each sub-operation may be used to generate a portion of the results of Operation A, such as generating 256 output feature maps from 512 input feature maps or generating a half of the rows in each of the 512 output feature maps from 512 input feature maps. Similarly, Operation B may be divided into sub-operations that do not have data and/or resource dependencies between them, such that the sub-operations may be performed in parallel on different computing engine. Because sub-operations for Operation B may not be performed when sub-operations for Operation A are performed, Operation A and Operation B can have data and/or resource dependencies.

To make a first inference, an accelerator 1 may perform a sub-operation OPA-1 (1410-1) of Operation A, and an accelerator 2 may perform a sub-operation OPA-2 (1410-2) of Operation A at the same time. Thus, Operation A may be completed within a time period T/4 when only the computing time using the PE array is considered, while other operations, such as memory access operations, are not included. In some embodiments, the result of sub-operation OPA-1 (1410-1) and the result of sub-operation OPA-2 (1410-2) can be used individually to make a prediction or decision. For example, a prediction or decision may be made based on a half of the number of output feature maps or based on a half of each output feature map. In some embodiments, the result of sub-operation OPA-1 (1410-1) and the result of sub-operation OPA-2 (1410-2) may be concatenated to form the complete result of Operation A.

Similarly, accelerator 1 may perform a sub-operation OPB-1 (1420-1) of Operation B, and accelerator 2 may perform a sub-operation OPB-2 (1420-2) of Operation B at the same time. Thus, Operation B may be completed within a time period T/4 when only the computing time using the PE array is considered, while other operations, such as memory access operations, are not included. In some embodiments, the result of sub-operation OPB-1 (1420-1) and the result of sub-operation OPB-2 (1420-2) may be used individually to make a prediction or decision. For example, a prediction or decision may be made based on a half of the number of output feature maps or based on a half of each output feature map of Operation B. In some embodiments, the result of sub-operation OPB-1 (1420-1) and the result of sub-operation OPB-2 (1420-2) may be concatenated to form the complete result of Operation B. As such, Operation A and Operation B for the first inference can be completed in a time period about T/2, or shorter when more than two computing engines are used to perform Operation A and Operation B, if only the computing time using the PE array is considered, while other operations, such as memory access operations, are not included.

After the first inference, a second inference may be made similarly. For example, accelerator 1 may perform sub-operation OPA-1 (1430-1) of Operation A for the second inference, and accelerator 2 may perform sub-operation OPA-2 (1430-2) of Operation A for the second inference at the same time. Accelerator 1 may then perform sub-operation OPB-1 (1440-1) of Operation B for the second inference, and accelerator 2 may perform sub-operation OPB-2 (1440-2) of Operation B for the second inference at the same time. The total time for performing Operation A and Operation B for the second inference may be T/2, or shorter when more than two computing engines are used to perform Operation A and Operation B, if only the computing time using the PE array is considered, while other operations, such as memory access operations, are not included. As such, the throughput of the system and the average time for making an inference may be improved by using multiple processing engines in parallel, and the latency for making an inference may also be reduced (e.g., T/2, T/4, or shorter).

Figure 15:
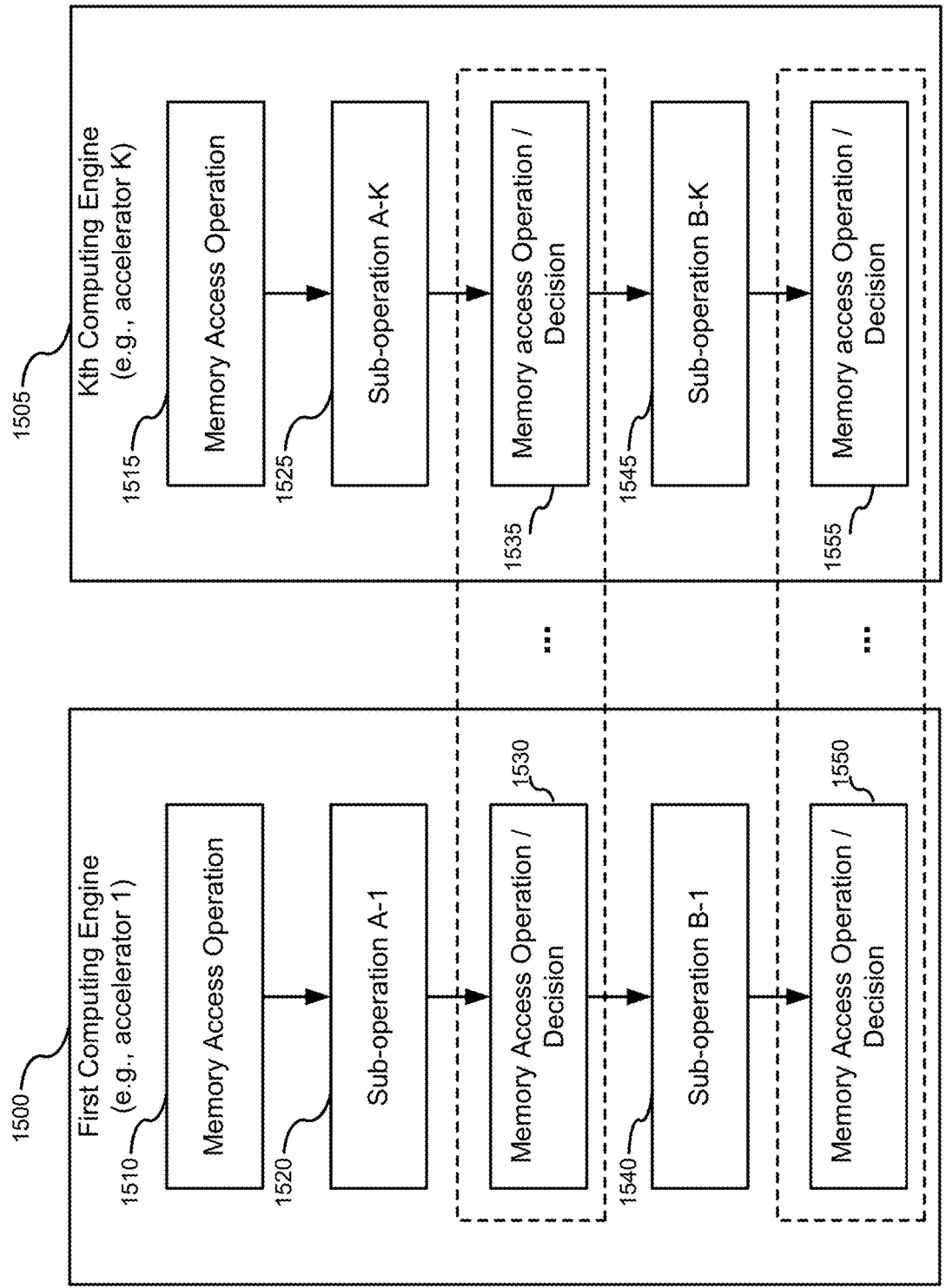
FIG. 15 illustrates examples of operations performed by multiple computing engines for making an inference according to certain embodiments.

FIG. 15 illustrates examples of operations performed by multiple computing engines for making an inference according to certain embodiments as shown in, for example, FIG. 14. As described above with respect to FIG. 14, each inference may include an Operation A (e.g., a tensor operation, such as a convolution operation) and an Operation B (e.g., a tensor operation, such as a convolution operation). Operation A and Operation B may each be divided into K sub-operations, which may be performed by multiple (e.g., K) computing engines, such as accelerators disclosed herein. The operations performed by a first computing engine may be illustrated by a dataflow graph 1500, and the operations performed by a Kth computing engine may be illustrated by a dataflow graph 1505. Dataflow graphs 1500, . . . , and 1505 may be generated, for example by a compiler. The multiple computing engines may be on a same integrated circuit device or on multiple integrated circuit devices.

Dataflow graph 1500 may include anode 1510 that may include a memory access operation (e.g., a memory read operation), a node 1520 that may include a sub-operation A-1 of Operation A for an inference, a node 1530 that may include a memory access operation (e.g., including memory write and/or read operations) and/or a (partial) decision making operation, a node 1540 that may include a sub-operation B-1 of Operation B for the inference, and a node 1550 that may include a memory access operation (e.g., a memory write operation) and/or a decision making operation. Similarly, dataflow graph 1505 may include a node 1515 that may include a memory access operation (e.g., a memory read operation), a node 1525 that may include a sub-operation A-K of Operation A for the inference, a node 1535 that may include a memory access operation (e.g., including memory write and/or read operations) and/or a (partial) decision making operation, a node 1545 that may include a sub-operation B-K of Operation B for the inference, and a node 1555 that may include a memory access operation (e.g., a memory write operation) and/or a decision making operation. As described above, in some embodiments, a partial prediction or decision may be made at node 1530, node 1535, node 1550, or node 1555 independently. In some embodiments, a partial prediction or decision may be made based on the combined operations at node 1530 and node 1535. In some embodiments, a prediction or decision may be made based on the combined operations at node 1550 and node 1555.

In the example shown in FIG. 14 and FIG. 15, when Operation A and Operation B do not have data and/or resource dependencies between them, the two or more sub-operations for Operation A and the two or more sub-operations for Operation B may be performed in parallel on four or more computing engines to further reduce the latency for making an inference to, for example, about T/4 or shorter.

Figure 16:
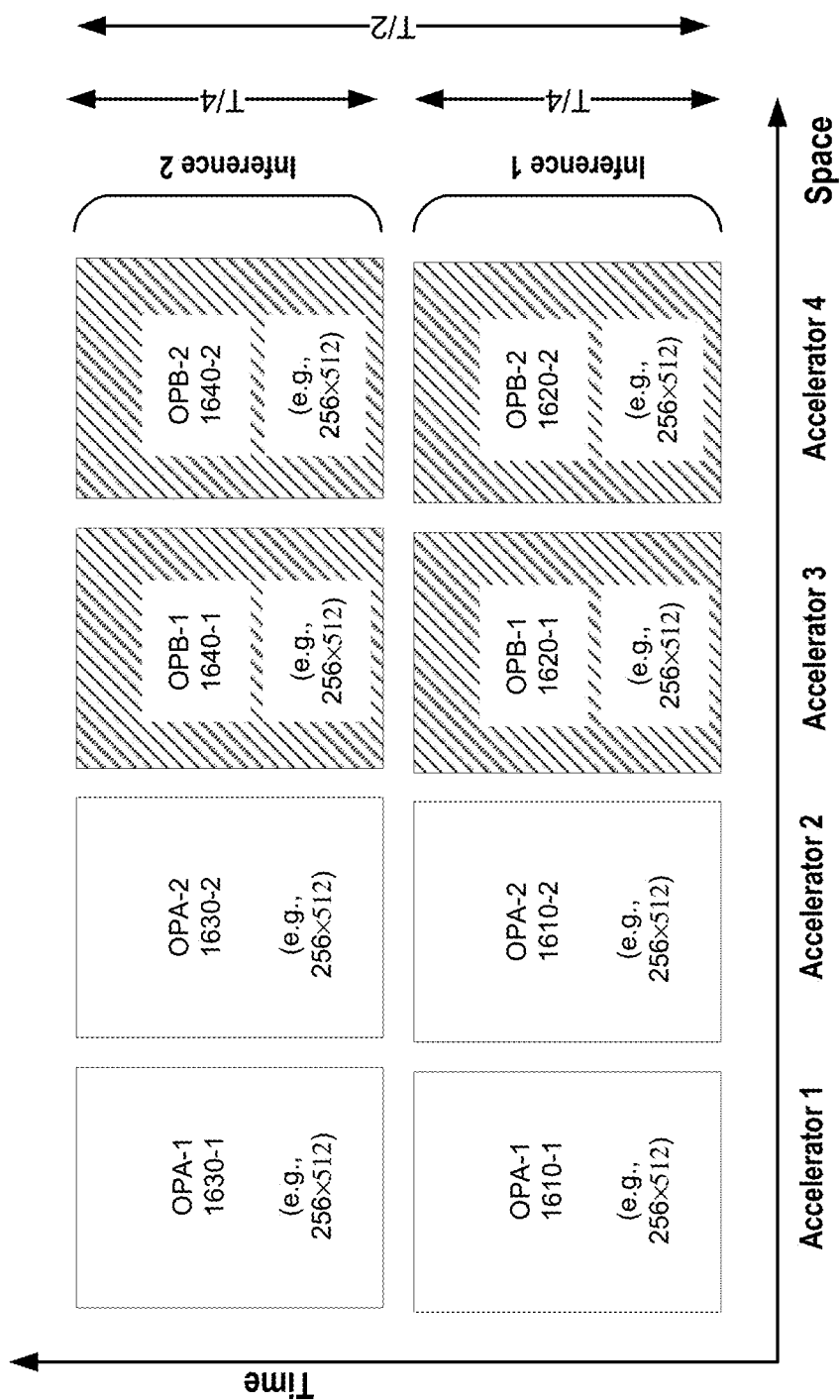
FIG. 16 illustrates an example of making an inference using multiple computing engines by splitting an operation of a neural network into sub-operations that can be performed in parallel by the multiple computing engines according to certain embodiments.

FIG. 16 illustrates an example of making an inference using multiple computing engines (e.g., accelerators) by splitting an operation of a neural network into sub-operations that can be performed in parallel by the multiple computing engines according to certain embodiments. In the example shown in FIG. 16, two operations including an Operation A and an Operation B may need to be performed to make an inference. Operation A may, for example, generate 512 output feature maps from 512 input feature maps. Operation B may, for example, generate 512 output feature maps from 512 input feature maps. There may not be data and/or resource dependencies between Operation A and Operation B.

To reduce the latency for making an inference, Operation A may be divided into two or more sub-operations, such as sub-operations OPA-1 and OPA-2. Operation B may be divided into two or more sub-operations, such as sub-operations OPB-1 and OPB-2. To make a first inference, accelerator 1 may perform sub-operation OPA-1 (1610-1), accelerator 2 may perform sub-operation OPA-2 (1610-2), accelerator 3 may perform sub-operation OPB-1 (1620-1), and accelerator 4 may perform sub-operation OPB-2 (1620-2). Thus, the first inference may be made by the four accelerators in parallel during a time period T/4 when only the computing time using the PE array is considered, while other operations, such as memory access operations, are not included. Similarly, to make a second inference, accelerator 1 may perform sub-operation OPA-1 (1630-1), accelerator 2 may perform sub-operation OPA-2 (1630-2), accelerator 3 may perform sub-operation OPB-1 (1640-1), and accelerator 4 may perform sub-operation OPB-2 (1640-2). Thus, the second inference may be made by the four accelerators in parallel during a time period T/4 when only the computing time using the PE array is considered, while other operations, such as memory access operations, are not included.

As described above with respect to FIGS. 5, 6, and 9, a tensor operation, such as a convolution operation, may use an input tensor that includes N (e.g., one or more) 3-D inputs each including C channels of input feature maps (each with dimensions H×W), and filters that include M 3-D filters each including C channels of 2-D filters (each with dimensions R×S). Thus, the input tensor may include N×C×H×W pixel values, and the filters may include a total of M×C×R×S weight values. As also described above, the C input channels (each including N×H×W pixel values) may be mapped to the rows of the PE array and the M output channels or 3-D filters (each including C×R×S weight values) may be mapped to the columns of the PE array. Therefore, there may be many different ways to divide a tensor operation, such as a convolution operation. In some embodiments, a tensor operation may be divided such that each sub-operation may generate a portion of the output tensor (e.g., output feature maps) that can be used for making a prediction or decision and/or can be saved to the memory space for the output tensor (e.g., concatenated in the memory space), where no additional arithmetic calculation (e.g., sum or accumulation) may be needed to generate the output feature maps.

Figure 17:
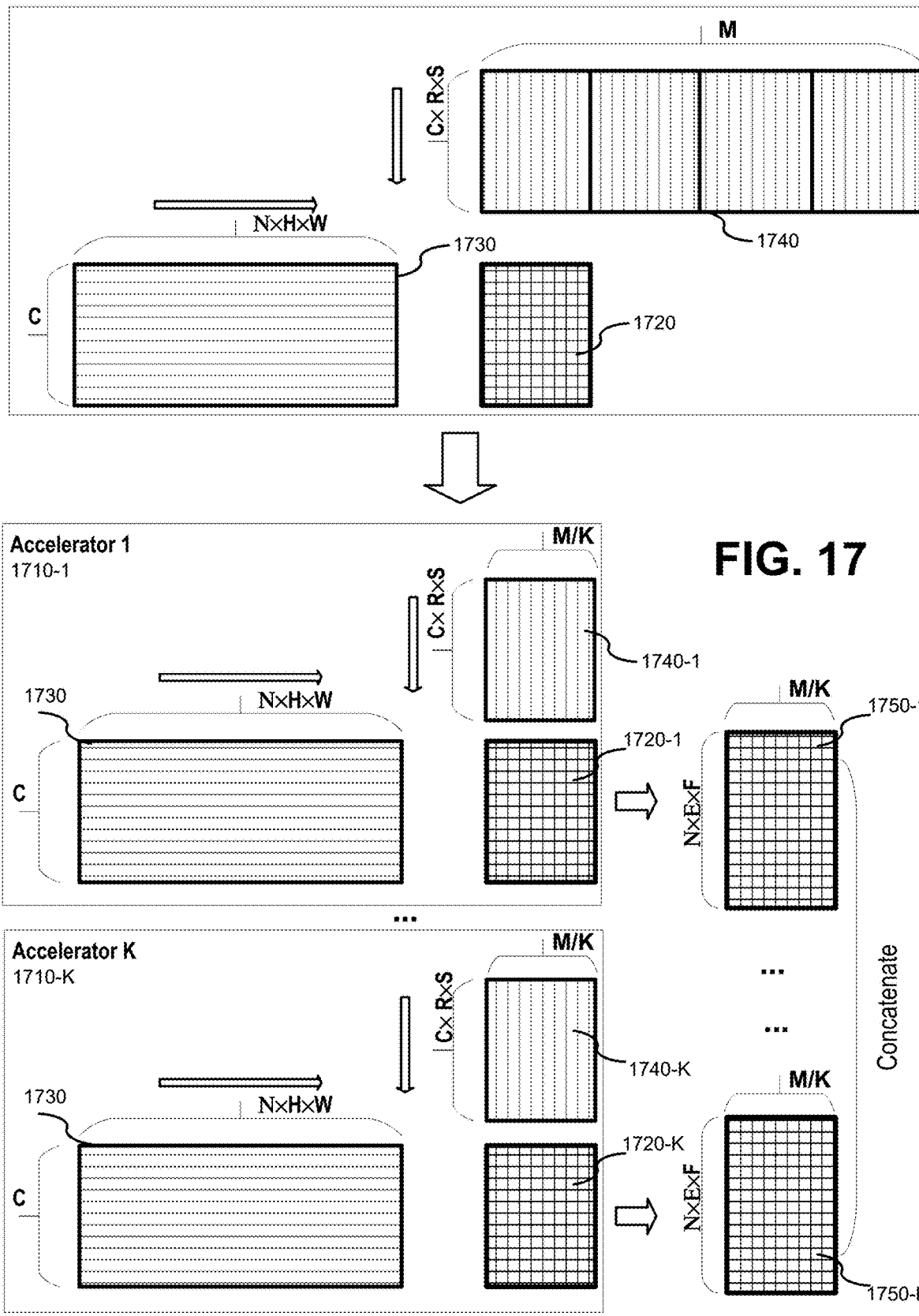
FIG. 17 illustrates an example of splitting an operation of a neural network into sub-operations to be performed in parallel by multiple computing engines according to certain embodiments.

FIG. 17 illustrates an example of splitting an operation of a neural network into sub-operations to be performed in parallel by multiple computing engines according to certain embodiments. As illustrated, a convolution operation to be performed by a PE array 1720 may use N 3-D inputs each including C channels of 2-D input feature maps (each with dimensions H×W), and filters that include M 3-D filters each including C channels of 2-D filters (each with dimensions R×S). Input feature maps 1730 may be flattened to C input channels each including N×H×W pixel values, where each input channel may need to be mapped to a row in PE array 1720. Filters 1740 may be flattened to M channels each including C×R×S weight values, where each of the M channels may need to be mapped to a column in PE array 1720. In the example shown in FIG. 17, M may be larger than the number of columns in PE array 1720. Thus, the convolution operation may not be performed by PE array 1720 in an operation as described above with respect to, for example, FIG. 9.

According to certain embodiments, the M 3-D filters (corresponding to output channels) used for the convolution operation may be divided into K groups, where each group may include M/K 3-D filters or output channels. As such, the convolution operation may be divided into K sub-operations, where each sub-operation may use M/K 3-D filters and input feature maps 1730 that include C channels each including N×H×W pixel values to generate output feature maps on M/K output channels, where each output channel may include N output feature maps each including E×F pixels. The K sub-operations can be performed in parallel by multiple (e.g., K) computing engines described above, where each sub-operation may be performed by a computing engine in a shorter time period because there are fewer weights to load and fewer columns for the input pixel values in each channel of the input feature maps to propagate through all columns of PE array 1720.

For example, a first sub-operation may be performed by a first accelerator 1710-1 using a PE array 1720-1. First accelerator 1710-1 may use input feature maps 1730 and a first group of 3-D filters 1740-1 that includes M/K 3-D filters to generate a first group of output feature maps 1750-1 in M/K output channels. A Kth sub-operation may be performed by accelerator K (1710-K) using a PE array 1720-K. Accelerator K (1710-K) may use input feature maps 1730 and the Kth group of 3-D filters 1740-K that includes M/K 3-D filters to generate the Kth group of output feature maps 1750-K in M/K output channels. The output feature maps generated by the K accelerators are the final output feature maps of the convolution operation, and thus no additional accumulation is needed. The output feature maps generated by each of the K accelerators can be saved to a part of the memory space for the output feature maps of the convolution operation and can be used to make a prediction or decision.

Figure 18:
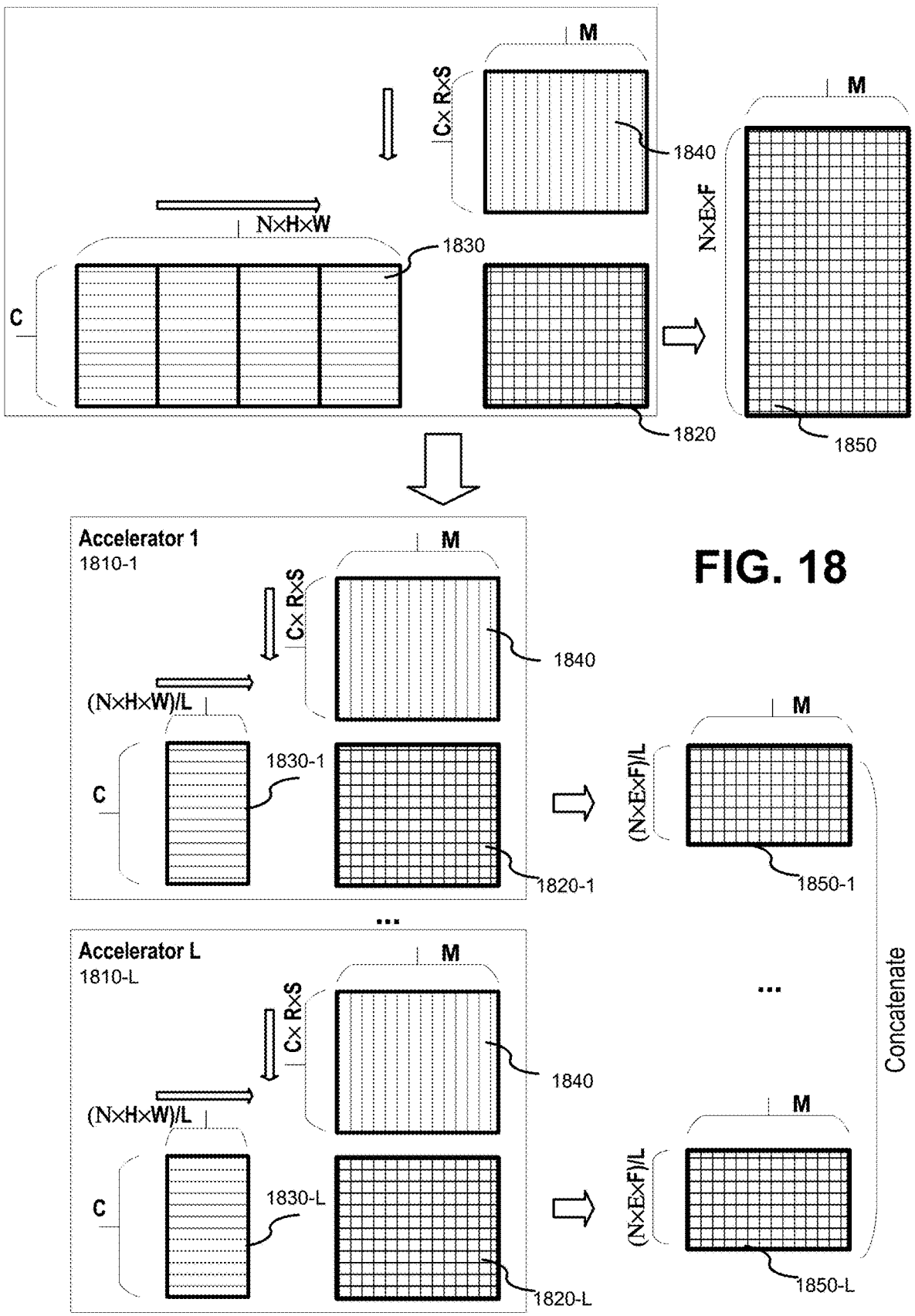
FIG. 18 illustrates an example of splitting an operation of a neural network into sub-operations to be performed in parallel by multiple computing engines according to certain embodiments.

FIG. 18 illustrates an example of splitting an operation of a neural network into sub-operations to be performed in parallel by multiple computing engines according to certain embodiments. As illustrated, a convolution operation to be performed by a PE array 1820 may use N 3-D inputs each including C channels of 2-D input feature maps (each with dimensions H×W) and 3-D filters 1840 that include M 3-D filters each including C channels of 2-D filters (each with dimensions R×S) to generate output feature maps 1850 that include M output channels of output feature maps. Each output channel may include N output feature maps that include E×F pixels. Input feature maps 1830 may be flattened to C input channels each including N×H×W pixel values, where each input channel may need to be mapped to a row in PE array 1820. 3-D filters 1840 may be flattened to M channels each including C×R×S weight values, where each of the M channels may need to be mapped to a column in PE array 1820.

According to certain embodiments, the C channels of input feature maps 1830 used for the convolution operation may be divided into L groups, where each group may include N×H×W/L pixels. As such, the convolution operation may be divided into L sub-operations, where each sub-operation may use M 3-D filters and a portion of input feature maps 1830 that includes C channels each including N×H×W/L pixel values to generate a portion (e.g., a few rows) of each output feature map on M output channels, where each output channel may include N/L output feature maps each including E×F pixels or N output feature maps each including E×F/L pixels. The L sub-operations can be performed in parallel by multiple (e.g., L) computing engines described above, where each sub-operation may be performed by a computing engine in a shorter time period because there are fewer input pixel values in each channel of input feature map to propagate through the PEs in a row of PE array 1820.

For example, a first sub-operation may be performed by a first accelerator 1810-1 using a PE array 1820-1. First accelerator 1810-1 may use the M 3-D filters 1840 and inputs 1830-1 that include C input channels each including N×H×W/L pixel values to generate a first group of output feature maps 1850-1 including M output channels, where each output channel may include N/L output feature maps or N×E×F/L pixels. For example, when N=1, each output channel may include 1/L (e.g., E/L lines) of an output feature map or E×F/L pixels. An Lth sub-operation may be performed by accelerator L (1810-L) using a PE array 1820-L. Accelerator L (1810-L) may use the M 3-D filters 1840 and inputs 1830-L that include C input channels each including N×H×W/L pixel values to generate an Lth group of output feature maps 1850-L including M output channels, where each output channel may include N/L output feature maps. For example, when N=1, each output channel may include 1/L (e.g., E/L lines) of an output feature map or E×F/L pixels. The output feature maps generated by the L accelerators are the final output feature maps of the convolution operation, and thus no additional accumulation is needed. The output feature maps generated by each of the L accelerators can be saved to the memory space for the output feature maps of the convolution operation and can be used to make a prediction or decision.

Figure 19:
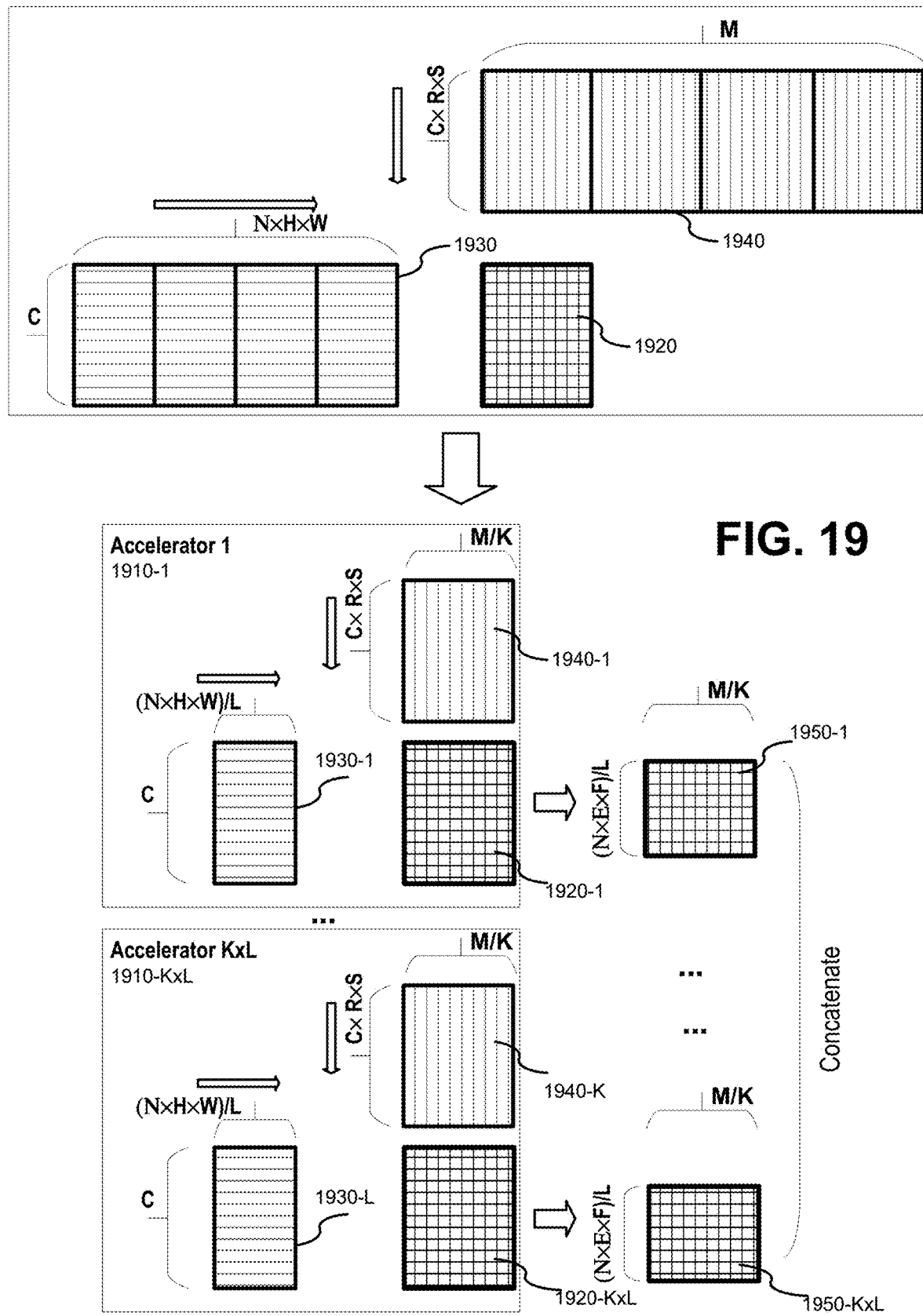
FIG. 19 illustrates an example of splitting an operation of a neural network into sub-operations to be performed in parallel by multiple computing engines according to certain embodiments.

FIG. 19 illustrates an example of splitting an operation of a neural network into sub-operations to be performed in parallel by multiple computing engines according to certain embodiments. As illustrated, a convolution operation to be performed by a PE array 1920 may use N 3-D inputs each including C channels of input feature maps (each with dimensions H×W), and 3-D filters 1940 that include M 3-D filters each including C channels of 2-D filters (each with dimensions R×S) to generate output feature maps that include M output channels of output feature maps. Each output channel may include N output feature maps that each include E×F pixels. Input feature maps 1930 may be flattened to C input channels each including N×H×W pixel values, where each input channel may need to be mapped to a row in PE array 1920. 3-D filters 1940 may be flattened to M channels each including C×R×S weight values, where each of the M channels may need to be mapped to a column in PE array 1920. In the example shown in FIG. 19, M may be larger than the number of columns in PE array 1920. Thus, the convolution operation may not be performed by PE array 1920 in an operation as described above with respect to, for example, FIG. 9.

According to certain embodiments, the C channels of input feature maps 1930 used for the convolution operation may be divided into L groups, where each group may include N×H×W/L pixels. In addition, the M 3-D filters 1940 (corresponding to output channels) used for the convolution operation may be divided into K groups, where each group may include M/K 3-D filters or output channels. As such, the convolution operation may be divided into L×K sub-operations, where each sub-operation may use M/K 3-D filters and a portion of input feature maps 1930 that include C channels each including N×H×W/L pixel values to generate a portion (e.g., a few rows) of each output feature map on M/K output channels, where each output channel may include N|L output feature maps each including E×F pixels. The L×K sub-operations can be performed in parallel by multiple (e.g., L×K) computing engines described above, where each sub-operation may be performed by a computing engine in a shorter time period because there are fewer (e.g., one-Lth) input pixel values in each channel of input feature maps to propagate through fewer (e.g., one-Kth) PEs in each row of PE array 1920.

For example, a first sub-operation may be performed by a first accelerator 1910-1 using a PE array 1920-1. First accelerator 1910-1 may use M/K 3-D filters (1940-1) and inputs 1930-1 that include C channels each including N×H×W/L pixel values to generate a first group of output feature maps 1950-1 in M/K output channels, where each output channel may include N/L output feature maps or N×E×F/L pixels. For example, when N=1, each output channel may include 1/L (e.g., E/L lines) of an output feature map or E×F/L pixels. A (K×L)th sub-operation may be performed by accelerator K×L (1910-K×L) using a PE array 1920-K×L. Accelerator K×L (1910-K×L) may use the M/K 3-D filters (1940-K) and inputs 1930-L that include C channels each including N/L input feature maps or N×H×W/L pixel values to generate a (K×L)th group of output feature maps 1950-K×L in M/K output channels, where each output channel may include N/L output feature maps. For example, when N=1, each output channel may include 1/L (e.g., E/L lines) of an output feature map or E×F/L pixels. The output feature maps generated by the K×L accelerators are the final output feature maps of the convolution operation, and thus no additional accumulation is needed. The output feature maps generated by each of the K×L accelerators may be 1/(K×L) of the output feature maps of the convolution operation, and can be saved to a memory space for the output feature maps of the convolution operation or can be used to make a prediction or decision.

In the examples of splitting a tensor operation for a neural network described above with respect to FIGS. 17-19, each sub-operation may generate a portion of the final output feature maps that can be used for making predictions or decisions and/or can be saved to the memory space for the output feature maps (e.g., concatenated in the memory space), where no additional arithmetic calculation (e.g., sum or accumulation) may be needed to generate the final output feature maps. In some embodiments, a tensor operation may be divided such that each sub-operation may generate a partial sum of the final output feature maps, and the partial sums from the sub-operations may be summed in additional arithmetic calculations to generate the final output feature maps or make the inference.

Figure 20:
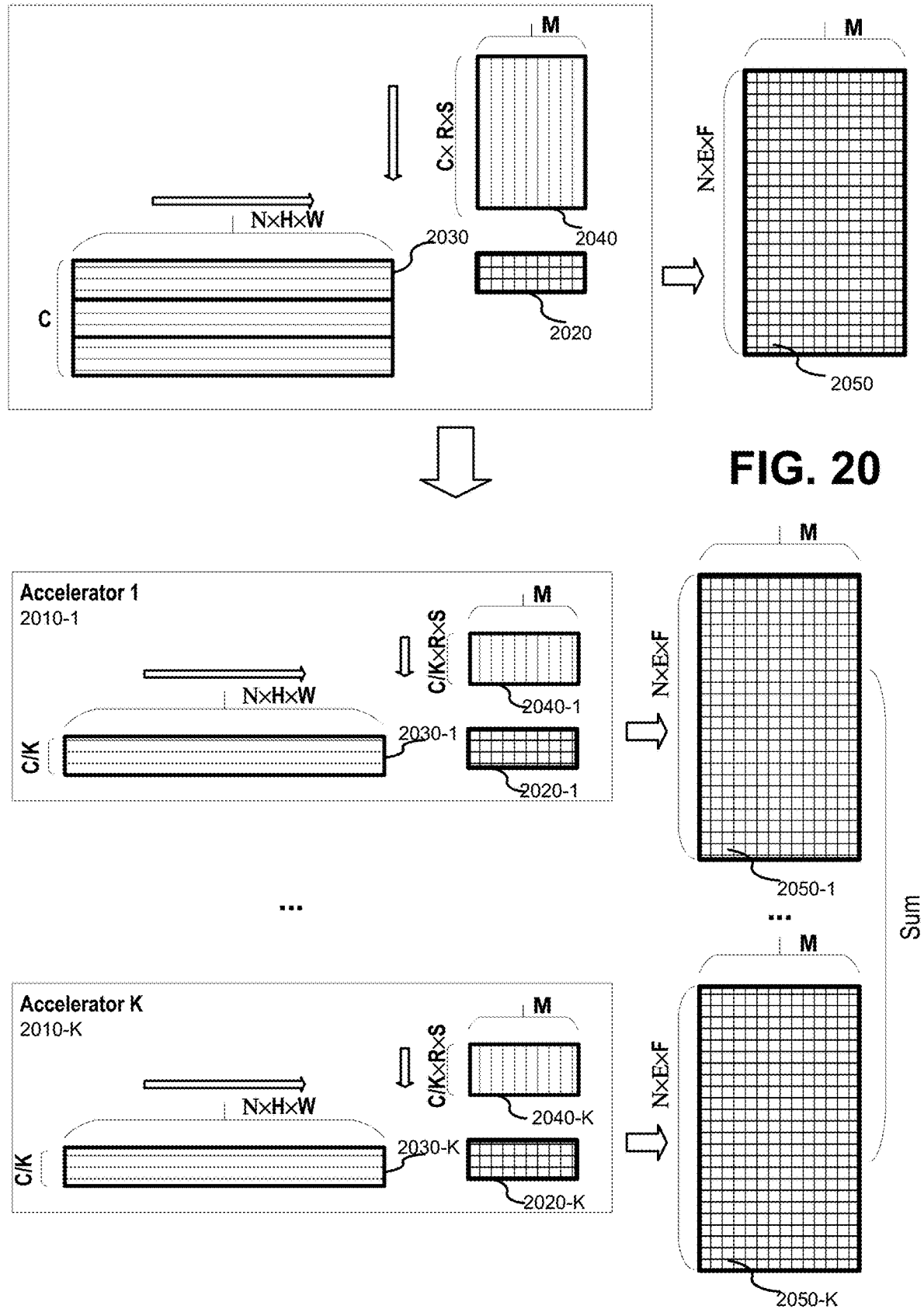
FIG. 20 illustrates an example of splitting an operation of a neural network into sub-operations to be performed in parallel by multiple computing engines according to certain embodiments.

FIG. 20 illustrates an example of splitting an operation of a neural network into sub-operations to be performed in parallel by multiple computing engines according to certain embodiments. As illustrated, a convolution operation to be performed by a PE array 2020 may use N 3-D inputs each including C channels of input feature maps (each with dimensions H×W), and 3-D filters 2040 that include M 3-D filters each including C channels of 2-D filters (each with dimensions R×S) to generate output feature maps that include M output channels of output feature maps. Each output channel may include N output feature maps that each include E×F pixels. Input feature maps 2030 may be flattened to C input channels each including N×H×W pixel values, where each input channel may need to be mapped to a row in PE array 2020. 3-D filters 2040 may be flattened to M channels each including C×R×S weight values, where each of the M channels may need to be mapped to a column in PE array 2020. In the example shown in FIG. 20, C may be larger than the number of rows in PE array 2020. Thus, the convolution operation may not be performed by PE array 2020 in an operation as described above with respect to, for example, FIG. 9.

According to certain embodiments, the C channels of input feature maps 2030 used for the convolution operation may be divided into K groups, where each group may include C/K channels of input feature maps. In addition, the M 3-D filters 2040 (corresponding to output channels) used for the convolution operation may be divided into K groups, where each group may include M 3-D filters each including C/K 2-D filters. As such, the convolution operation may be divided into K sub-operations, where each sub-operation may use the C/K 2-D filters in each of the M 3-D filters and a portion of input feature maps 2030 that includes C/K channels of input feature maps each including N×H×W pixel values to generate partial sum feature maps for the output feature maps on M output channels, where each output channel may include N partial sum feature maps each including E×F pixels. The K sub-operations can be performed in parallel by multiple (e.g., K) computing engines described above, where each sub-operation may be performed by a computing engine in a shorter time period because there are fewer weights to load to the PE array and fewer (e.g., one-Kth) rows for the partial sum to propagate through all rows of PE array 2020.

For example, a first sub-operation may be performed by a first accelerator 2010-1 using a PE array 2020-1. First accelerator 2010-1 may use the C/K 2-D filters in each of the M 3-D filters 2040 and a portion of input feature maps 2030 that includes C/K channels of input feature maps to generate partial sum feature maps 2050-1 for the output feature maps on the M output channels, where each output channel may include N partial sum feature maps each including E×F pixels. A Kth sub-operation may be performed by accelerator K (2010-K) using a PE array 2020-K to generate. Accelerator K (2010-K) may use the C/K 2-D filters in each of the M 3-D filters 2040 and a portion of input feature maps 2030 that includes C/K channels of input feature maps to generate partial sum feature maps 2050-K for the output feature maps on the M output channels, where each output channel may include N partial sum feature maps each including E×F pixels. The partial sum feature maps for the output feature maps generated by the K accelerators are not the final output feature maps of the convolution operation, and additional accumulation may be needed to generate the final output feature maps.

Figure 21:
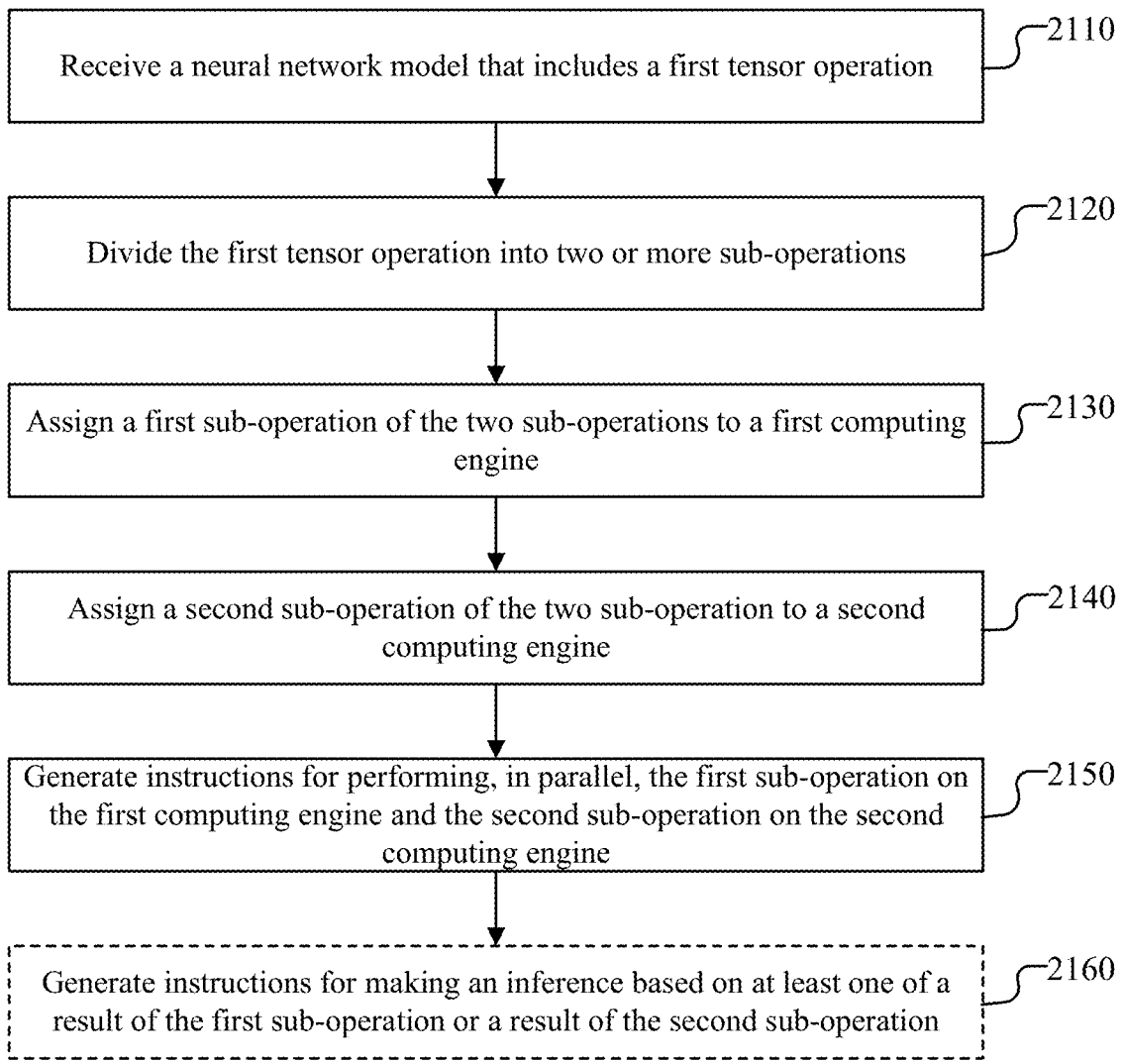
FIG. 21 is a flow chart illustrating an example of a method for accelerating a tensor operation by performing sub-operations of the tensor operation in parallel on multiple computing engines according to certain embodiments.

FIG. 21 is a flow chart 2100 illustrating an example of a method for accelerating a tensor operation by performing sub-operations of the tensor operation in parallel on multiple computing engines according to certain embodiments. Operations described in flow chart 2100 may be performed by, for example, a compiler running on a host system, such as the compiler and host system described below with respect to FIG. 22. Although flow chart 2100 may describe the operations as a sequential process, in various embodiments, many of the operations may be performed in parallel or concurrently. In addition, the order of the operations may be rearranged. A process may have additional steps not shown in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

At block 2110, a host system may receive a neural network model that includes a first tensor operation, such as a convolution operation. The tensor operation may be used to generate an output tensor that includes a set of output feature maps using a set of input feature maps and a set of filters. As described above (e.g., in FIGS. 5, 6, 9, and 17-20), in some embodiments, the set of input feature maps may include C input feature maps for each of N input datasets, the set of filters may include M filters each including C filter matrices, and the set of output feature maps may include M output feature maps for each of the N input datasets, where each of the M output feature maps for an input dataset may be a result of a convolution between the C input feature maps of the input dataset and the corresponding C filter matrices in a filter of the M filters. In some embodiments, M may be greater than the total number of columns of a two-dimensional processing element array in a computing engine. In some embodiments, C may be greater than the total number of rows in a two-dimensional processing element array in a computing engine.

At block 2120, a compiler executing on the host system may divide the first tensor operation into sub-operations. The sub-operations may include two or more sub-operations that have no data dependency between the two or more sub-operations. Each of the two or more sub-operations may generate a portion of the set of output feature maps. In some embodiments, the portion of the set of output feature maps may include a fraction of a total number of output feature maps in the set of output feature maps, where a sub-operation may generate the portion of the set of output feature maps using the set of input feature maps and a fraction of a total number of filters in the set of filters. In some embodiments, the portion of the set of output feature maps may include a portion of each output feature map in at least a subset of the set of output feature maps, where a sub-operation may generate the portion of the set of output feature maps using the set of filters and a portion of each input feature map in at least a subset of the set of input feature maps. In some embodiments, the portion of the set of output feature maps may include a portion of each output feature map in a fraction of a total number of output feature maps in the set of output feature maps, where a sub-operation may generate the portion of the set of output feature maps using a fraction of a total number of filters in the set of filters and a portion of each input feature map in at least a subset of the set of input feature maps.

At block 2130, the compiler may assign a first sub-operation in the two or more sub-operations to a first computing engine (e.g., an accelerator described above) in two or more computing engines on an integrated circuit device or on two or more integrated circuit devices. At block 2140, the compiler may assign a second sub-operation in the two or more sub-operations to a second computing engine in the two or more computing engines. At block 2150, the compiler may generate instructions (e.g., machine code) for performing the first sub-operation by the first computing engine and for performing the second sub-operation by the second computing engine in parallel. Optionally, at block 2160, the compiler may generate instructions for making an inference based on a result of the first sub-operation and/or a result of the second sub-operation. For example, the inference may be made based on a portion of the set of output feature maps generated by one sub-operation or based on the whole set of output feature maps generated by two or more sub-operations.

In some embodiments, the compiler may also identify a second tensor operation in the neural network model, where the second tensor operation and the first tensor operation may have no data dependency. The compiler may divide the second tensor operation into sub-operations of the second tensor operation, where the sub-operations of the second tensor operation may have no data dependency. The compiler may assign a first sub-operation in the sub-operations of the second tensor operation to a third computing engine, assign a second sub-operation in the sub-operations of the second tensor operation to a fourth computing engine, and generate instructions for performing, in parallel with the first sub-operation for the first tensor operation and the second sub-operation for the first tensor operation, the first sub-operation in the sub-operations of the second tensor operation by the third computing engine and the second sub-operation in the sub-operations of the second tensor operation by the fourth computing engine. The first computing engine, second computing engine, third computing engine, and fourth computing engine may be on a same integrated circuit device or on two or more integrated circuit devices. For example, the four computing engines may be four accelerators in a same acceleration engine.

The above described techniques can be applied to any tensor operations or any operations that include matrix multiplications, such as operations of a multi-layer perceptron described above with respect to FIG. 1. In one example, as an alternative to convolutions, a Transformer for natural language processing (NLP) may encode each position and apply an attention mechanism to relate two distant words, which can be parallelized to accelerate the training. The attention mechanism in the Transformer is a way of computing the relevance of a set of values (e.g., information) based on some keys and queries. The attention mechanism can be used by the Transformer to focus on relevant information based on what it is currently processing. The attention weights may represent the relevance of the encoder hidden states (e.g., values) in processing the decoder state (e.g., queries) and may be calculated based on the encoder hidden states (e.g., keys) and the decoder hidden state (e.g., queries). A Transformer can reduce the number of sequential operations to relate two symbols from input/output sequences to a constant O(1) number of operations by using a multi-head attention mechanism that can model dependencies regardless of their distance in an input or output sentence.

A Transformer generally includes an encoder and a decoder. The encoder may map an input sequence of symbol representations (x1, ..., xn) to a sequence of continuous representations z=(z1, ..., zn). The decoder may generate, one symbol at a time and based on z, an output sequence (y1, ..., ym) of symbols. The encoder may use the source sentence's embeddings for its keys, values, and queries, whereas the decoder may use the encoder's outputs for its keys and values and the target sentence's embeddings for its queries. A Transformer generally uses stacked self-attention and point-wise, fully connected layers for both the encoder and decoder, where previously generated symbols are used as additional inputs when generating new symbols.

Figure 22C:
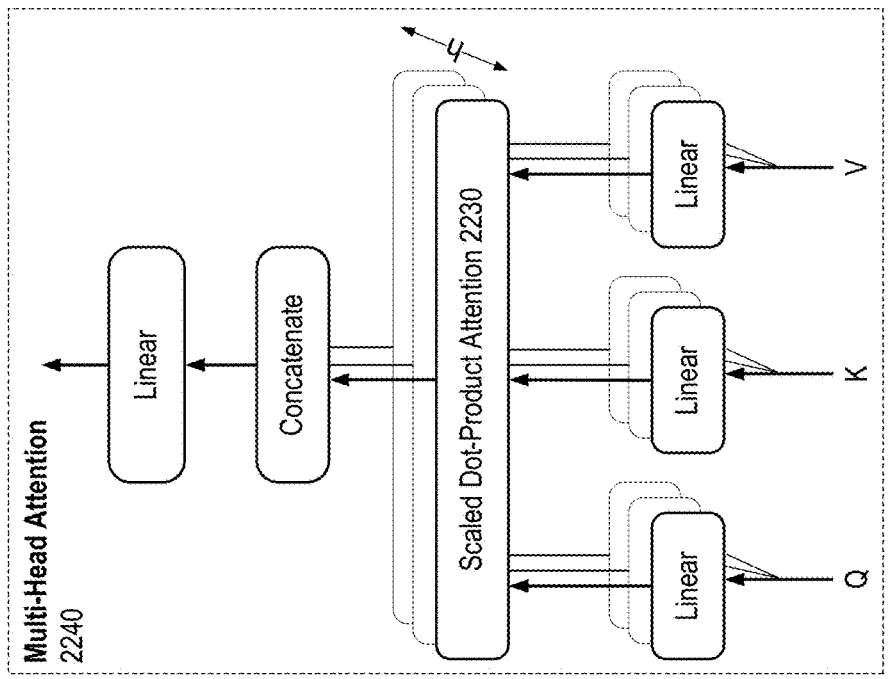
FIG. 22C illustrates an example of a multi-head attention sub-layer used in the encoder and decoder of a Transformer.
Figure 22B:
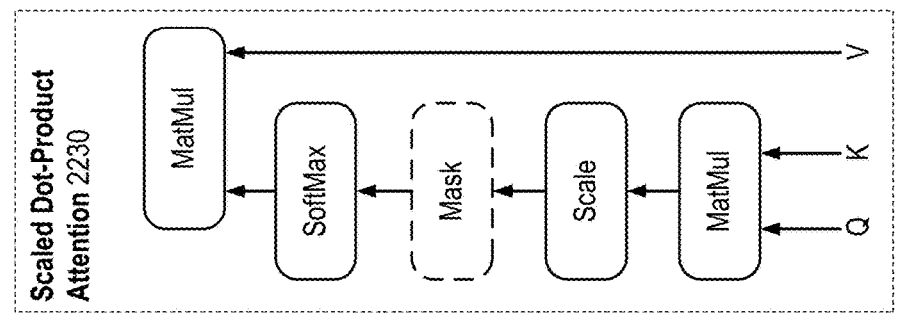
FIG. 22B illustrates an example of a scaled dot-product attention block in a Transformer.
Figure 22A:
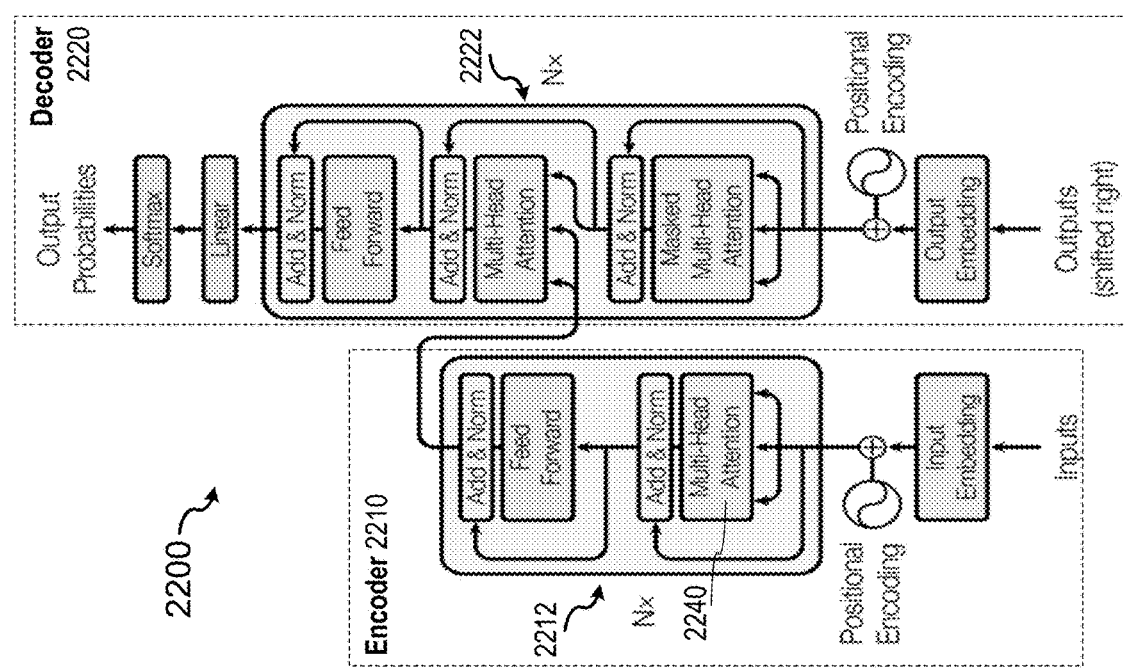
FIG. 22A illustrates an example of a Transformer that may use the techniques disclosed herein according to certain embodiments.

FIG. 22A illustrates an example of a Transformer 2200 that may use the techniques disclosed herein according to certain embodiments. Transformer 2200 may include an encoder 2210 and a decoder 2220. Encoder 2210 may include a stack of N layers 2212. Each layer 2212 may include two sub-layers that perform matrix multiplications and element-wise transformations. The first sub-layer may include a multi-head self-attention network, and the second sub-layer may include a position-wise fully connected feed-forward network. A residual connection may be used around each of the two sub-layers, followed by layer normalization. A residual connection adds the input to the output of the sub-layer, and is a way of making training deep networks easier. Layer normalization is a normalization method in deep learning that is similar to batch normalization. The output of each sub-layer may be written as LayerNorm(x+Sublayer(x)), where Sublayer(x) is the function implemented by the sub-layer. In the encoder phase, the Transformer first generates initial inputs (e.g., input embedding and position encoding) for each word in the input sentence. For each word, the self-attention aggregates information from all other words (pairwise) in the context of the sentence to create a new representation for each word that is an attended representation of all other words in the sequence. This is repeated for multiple times each word in a sentence to successively build newer representations on top of previous ones.

Decoder 2220 may also include a stack of N layers 2222. In addition to the two sub-layers in each encoder layer 2212 described above, each layer 2222 in decoder 2220 may include a third sub-layer that performs multi-head attention over the output of the encoder stack. Similar to layers 2212 in encoder 2210, residual connections around each of the sub-layers may be used in layers 2222 in decoder 2220, followed by layer normalization. The self-attention sub-layer in the decoder stack may be modified (labeled as "masked multi-head attention") to mask inputs to the decoder from future time steps and prevent positions from attending to subsequent positions. The masking, combined with offsetting the output embeddings by one position, ensures that the predictions for position i can depend only on the known outputs at positions less than i. Decoder 2220 may generate one word at a time from left to right. The first word generated at a layer may be based on the final representation of the encoder (offset by 1 position). Every word predicted subsequently may attend to the previously generated words at that layer of the decoder and the final representation of the encoder.

An attention function may map a query and a set of key-value pairs to an output, where the query, keys, values, and output are all vectors. A query vector q encodes the word/position that is paying attention. A key vector k encodes the word to which attention is being paid. The key vector k and the query vector q together determine the attention score between the respective words. The output is computed as a weighted sum of values, where the weight assigned to each value is computed by a compatibility function of the query with the corresponding key.

FIG. 22B illustrates an example of a scaled dot-product attention block 2230. In scaled dot-product attention block 2230, the input includes queries and keys both of dimension $d_k$, and values of dimension $d_v$. The scaled dot-product attention may be computed on a set of queries simultaneously, according to the following equation:

$$\text{Attention}(Q, K, V) = \text{softmax}\left(\frac{QK^T}{\sqrt{d_k}}\right)V, \quad (4)$$

where Q is the matrix of queries packed together, and K and V are the matrices of keys and values packed together. The scaled dot-product attention computes the dot-products (attention scores) of the queries with all keys ("MatMul"), divides each element of the dot-products by a scaling factor $\sqrt{d_k}$ ("scale"), applies a softmax function to obtain the weights for the values, and then uses the weights to determine a weighted sum of the values.

When only a single attention is used to calculate the weighted sum of the values, it can be difficult to capture various different aspects of the input. For instance, in the sentence "I like cats more than dogs," one may want to capture the fact that the sentence compares two entities, while retaining the actual entities being compared. A Transformer may use the multi-head self-attention sub-layer to allow the encoder and decoder to see the entire input sequence all at once. To learn diverse representations, the multi-head attention applies different linear transformations to the values, keys, and queries for each attention head, where different weight matrices may be used for the multiple attention heads and the results of the multiple attention heads may be concatenated together.

FIG. 22C illustrates an example of a multi-head attention sub-layer 2240 used in encoder 2210 and decoder 2220 of transformer 2200 described above. Instead of performing a single attention function with $d_{model}$-dimensional keys, values, and queries, multi-head self-attention sub-layer 2240 linearly projects the queries, keys, and values multiple (e.g., h) times with different, learned linear projections to $d_k$, $d_k$, and $d_v$, respectively. Attention functions are performed in parallel on the h projected versions of queries, keys, and values using multiple (e.g., h) scaled dot-product attentions, yielding h $d_v$-dimensional output values. Each attention head may have a structure as shown in FIG. 22B, and may be characterized by three different projections given by weight matrices:

$W_i^K$ with dimensions $d_{model} \times d_k$ $W_i^Q$ with dimensions $d_{model} \times d_k$ $W_i^V$ with dimensions $d_{model} \times d_v$ The outputs of the multiple scaled dot-product attentions are concatenated, resulting in a matrix of dimensions $d_i \times (h \times d_v)$, where $d_i$ is the length of the input sequence. Afterwards, a linear layer with weight matrix $W^O$ of dimensions $(h \times d_v) \times d_e$ is applied to the concatenation result, leading to a final result of dimensions $d_i \times d_e$:

MultiHead(Q,K,V)Concat(head$_1$, . . . ,head$_h$)$W^O$ where head$_i$=Attention($QW_i^Q, KW_i^K, VW_i^V$)  (5)

where $d_e$ is the dimension of the token embedding. Multi-head attention allows a network to jointly attend to information from different representation subspaces at different positions. The multi-head attention may be performed using a tensor operation, which may be split into multiple sub-operations (e.g., one for each head) and performed in parallel by multiple computing engines as described above.

Figure 23:
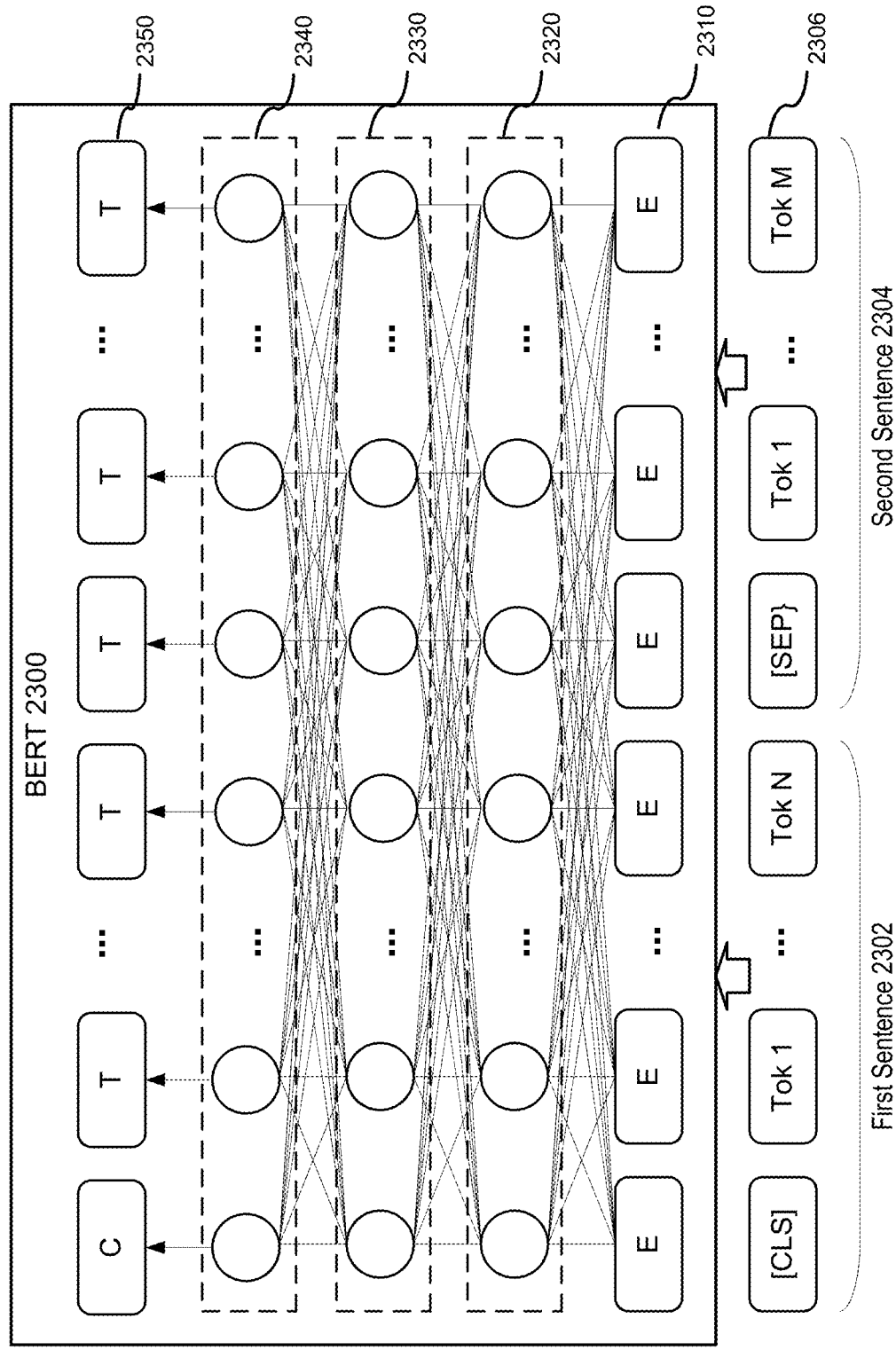
FIG. 23 illustrates an example of a bidirectional encoder representations from Transformers (BERT) model that may use some of the techniques disclosed herein according to certain embodiments.

FIG. 23 illustrates an example of a bidirectional encoder representations from Transformers (BERT) model 2300 that may use some of the techniques disclosed herein according to certain embodiments. A BERT model may include a multi-layer bidirectional Transformer encoder (rather than a left-to-right Transformer encoder), and does not include the Transformer decoder because the BERT model is used to generate a language model. The BERT model is designed to pre-train deep bidirectional representations from unlabeled text by jointly conditioning on both the left and right context in all layers. The pre-trained BERT model can be fine-tuned with an additional output layer to create state-of-the-art models for a wide range of tasks, such as question answering and language inference, without substantial task-specific architecture modifications. BERT alleviates the unidirectionality constraint by using a "masked language model" (MLM) pre-training objective. The masked language model randomly masks some of the tokens from the input, and the objective is to predict the original vocabulary identification (Id) of the masked word based only on its context. Unlike the left-to-right language model pre-training, the MLM objective enables the representation to fuse the left and the right context, which allows pre-training a deep bidirectional Transformer. In addition to the masked language model, a "next sentence prediction" task can be used to jointly pre-train text-pair representations.

In the example shown in FIG. 23, BERT model 2300 uses inputs that include a sequence of tokens 2306, which may include one or more sentences, such as first sentence 2302 and second sentence 2304. In some embodiments, some (e.g., about 15% of) tokens 2306 may be masked. Input tokens 2306 may be embedded into vectors 2310 and processed by encoder layers 2320, 2330, . . . , and 2340 to generate a sequence of tokens 2350 each represented by a vector. Encoder layers 2320, 2330, . . . , and 2340 may form a multi-layer perceptron. Each encoder layer 2320, 2330, . . . , or 2340 may be similar to encoder layers 2212 and may include the multi-head attention model and/or fully connected layer as described above with respect to FIGS. 22A-22C. The multi-head attention model may include multiple dot-product attentions. Operations of each encoder layer 2320, 2330, . . . , or 2340 may include a tensor operation that can be split into sub-operations that have no data dependency between each other and thus can be performed by multiple computing engines (e.g., accelerators) in parallel as described above.

Figure 24:
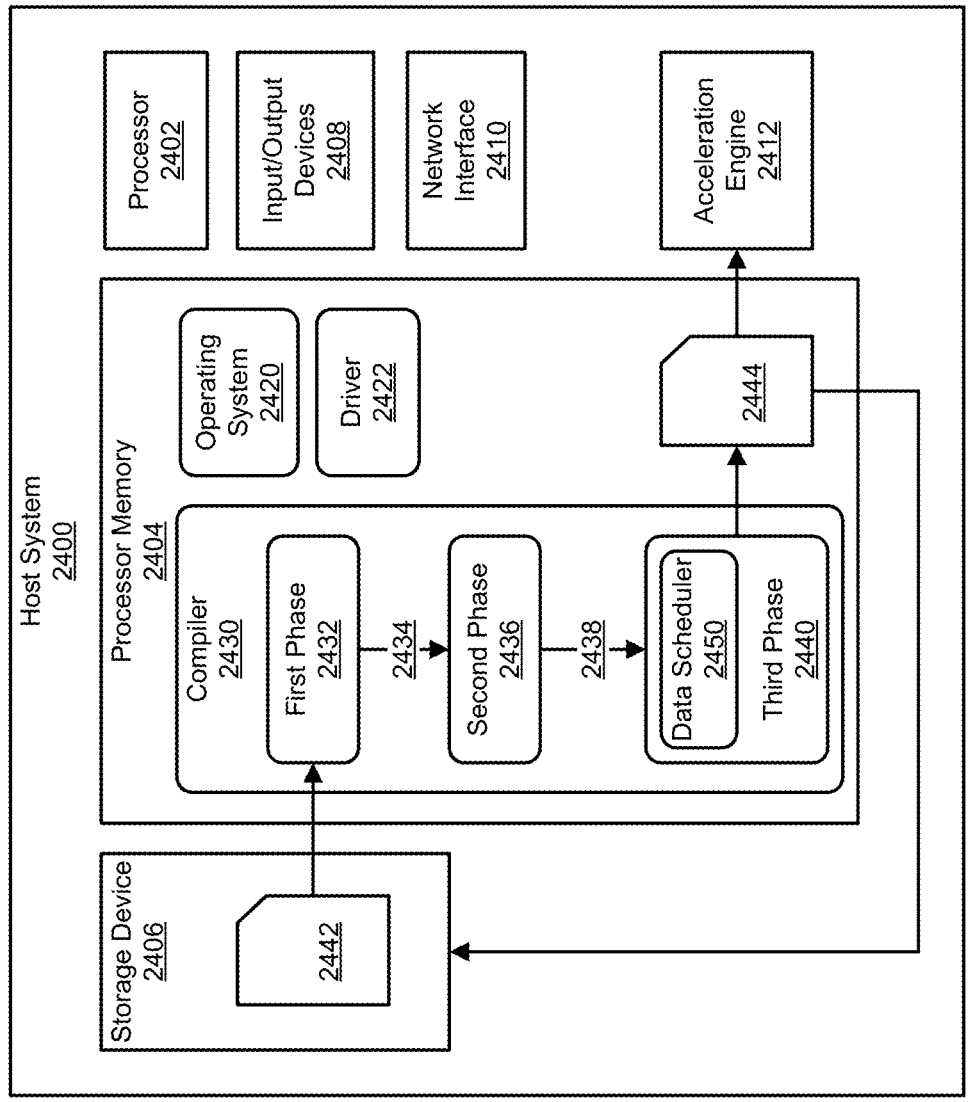
FIG. 24 includes a block diagram of an example of a host system.

FIG. 24 includes a block diagram illustrating an example of a host system 2400 on which a compiler 2430, such as is described herein, can run. The illustrated host system 2400 is an example of a computing device, and includes a processor 2402, a processor memory 2404, at least one storage device 2406, various Input/Output (I/O) devices 2408, and at least one network interface 2410. In the example of FIG. 24, the host system 2400 also includes an acceleration engine 2412, which is an integrated circuit device that can accelerate certain operations or computations performed by the host system 2400. In various examples, the host system 2400 can be implemented as a server in a data center, a desktop computer, a laptop computer, a tablet computer, or a smartphone, among other examples. In some examples, operations or components discussed below as performed or included in the host system 2400 can be performed or included in other computer devices. For example, the compiler 2430 can execute on the host system 2400 while the acceleration engine 2412 is located at a different host system.

The processor 2402 is an integrated circuit device that can execute program code, in the form of instructions. The program code can be for various software applications or tools, such as an operating system 2420 or the illustrated compiler 2430. While the processor 2402 is executing a program, the instructions for the program can be stored in the processor memory 2404. The instructions can also be stored elsewhere, such as on the storage device 2406, and can be loaded into the processor memory 2404 when needed by the processor 2402. The processor 2402 can also use the processor memory 2404 for temporary storage of other data on which the processor 2402 is operating. In various examples, the processor memory 2404 is a volatile memory type, such as a type of Random Access Memory, though non-volatile memory types can, alternatively or additionally, be used for the processor memory 2404.

The storage device 2406 is an example of a device that can include non-volatile memory. For example, the storage device 2406 can be a magnetic disk drive, a solid state drive, or an optical drive, among other examples. The storage device 2406 can further be non-transitory, such that program code and other data stored on the storage device 2406 remains present when the storage device 2406 is not powered on.

The storage device 2406 is one example of a peripheral device, which are components that can be coupled to the host system 2400 to add functionality to the host system 2400. Other examples of peripheral devices include the Input/Output devices 2408 and the network interface 2410. The Input/Output devices 2408 can include user input and output devices, such as keyboards, mice, touch screens, microphones, display screens, speakers, printers, and scanners, among other examples. The network interface 2410, which can be implemented using a network interface card, can provide access to one or more networks. The network interface 2410 can include, for example, a physical port for connecting a network cable and/or wireless antennas for communicating with Wi-Fi and/or cellular networks. The network interface 2410 can also be described as an I/O device.

The acceleration engine 2412 is also another type of peripheral device or I/O device. The acceleration engine 2412 is a device that is purpose built to perform certain operations that can be performed by the processor 2402, but can be performed faster by the acceleration engine 2412. For example, the acceleration engine 2412 can be a neural network accelerator, and, as such, may be able to perform the large scale, parallel computations of a neural network more efficiently than when the computations are performed by the processor 2402. As another example, the acceleration engine 2412 can be a graphics processing unit (GPU), and may be optimized to perform the computations needed for graphics rendering. Other examples of devices that can be implemented by the acceleration engine 2412 include cryptographic accelerators, compression and decompression accelerators, 3-D accelerators, regular expression accelerators, security accelerators, and others.

In various examples, the acceleration engine 2412 can execute program code to perform certain operations. For example, when the acceleration engine 2412 is a neural network accelerator, the acceleration engine 2412 can be programmed to execute a particular neural network, such as one that performs image recognition or one that performs machine translation. As a further example, to support the execution of a neural network, the acceleration engine 2412 can be programmed to perform operations such as copying data for the neural network from processor memory 2404 (for example) into the acceleration engine 2412, copying input data for the neural network from processor memory 2404 into the acceleration engine 2412, and/or copying results from the acceleration engine 2412 into the processor memory 2404, among other examples.

To generate program code for the acceleration engine 2412, in various examples, the host system 2400 can execute the compiler 2430. Compilers, in general, are software programs that translate program code written in a human-readable language into a format (e.g., machine instructions) that can be read and processed by an integrated circuit device. In the example of FIG. 24, the acceleration engine 2412 is a neural network accelerator and the compiler 2430 is for compiling a neural network description into instructions to be executed by the acceleration engine 2412. When the acceleration engine 2412 implements a different type of accelerator, another compiler can be used. As described above, in some embodiments, the compiler 2430 can be used to divide the tensor operations into sub-operations and can schedule the performance of the sub-operations on different acceleration engines and/or different accelerators in an acceleration engine.

The compiler 2430 can be activated, for example, when the operating system 2420 receives keyboard, mouse, touch-screen, voice commands, or other inputs from the Input/Output devices 2408. The inputs can further include parameters for the compiler 2430, such as the input code 2442 to compile and configure options for the compilation process. Once the compiler 2430 is activated, the processor 2402 can load the instructions for the compiler 2430 into the processor memory 2404, and can execute the instructions.

In the example of FIG. 24, the compiler 2430 includes a first stage 2432, a second stage 2436, and a third stage 2440, which each perform different operations to produce compiled code 2444. In other examples, the compiler 2430 can combine the operations of the first stage 2432, second stage 2436, and/or third stage 2440 into fewer stages, or can divide the operations of one of the stages into multiple stages.

The first stage 2432 can receive and process input code 2442. The input code 2442 can describe a program in a high-level programming language, such as Java, C++, or Tensorflow, among many other examples. The input code 2442 can describe, for example, steps to perform image recognition, speech recognition, machine translation, or other operations. The input code 2442 can be obtained, for example, from the storage device 2406. Alternatively, though not illustrated here, the input code 2442 may be located in the processor memory 2404 or can be obtained from a network location, using the network interface 2410. Processing of the input code 2442 can include sorting the operations described in the input code 2442 into layers, where the outputs of one layer provide the inputs to a next layer. Processing can also include identifying steps to be performed by the processor 2402, rather than by the acceleration engine 2412. For example, the processor 2402, through the execution of a driver 2422, may need to perform steps such as configuring Direct Memory Access (DMA) descriptors for moving data into or out of the acceleration engine 2412, among other examples.

The output 2434 of the first stage 2432 can be organized, for example, in the layers, nodes, and connections between nodes of a neural network. The second stage 2436 can perform intermediate processing on this output 2434. For example, the operations performed in any one layer, or at any one node in a layer, may be too many for the acceleration engine 2412 to perform at the same time. The acceleration engine 2412 may, for example, have a limited amount of locale storage space for the data needed for a computation, or the computations may be more than the acceleration engine 2412 can perform at one time. In this example, the first stage 2432 can break the operations of the layer or node down into smaller operations, which can fit into the acceleration engine's local memory and/or can fit into the computing capacity of the acceleration engine 2412. Processing of the output 2434 of the first stage 2432 can include other steps, such as scheduling, or determining the order in which the acceleration engine 2412 and/or processor 2402 will perform operations, among other examples.

In various examples, the output 2438 of the second stage 2436 includes the various steps to be performed by components of the acceleration engine 2412, in the order that the steps are to be performed. The output 2438 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 2440 can operate on the output 2438 of the second stage 2436, and perform various steps before producing the instructions that are to be executed by the acceleration engine 2412. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 2440 can include a data scheduler 2450.

The output of the third stage 2440 is compiled code 2444, which may include machine instructions in binary format. In some examples, the compiled code 2444 can be stored in the processor memory 2404. Alternatively or additionally, the compiled code 2444 can be copied to the storage device 2406 or to a network location. As noted above, the acceleration engine 2412 may be located at a different host system, in which case the compiled code 2444 can be sent over the network interface 2410 to the other host system.

In the example of FIG. 24, the host system 2400 can be executing a driver 2422, which can also be referred to as a device driver or runtime driver, that manages the acceleration engine 2412. The driver 2422 can provide an interface between applications executing on the host system 2400 (or on another host system) and the acceleration engine 2412. For example, the driver 2422 can provide an Application Program Interface (API) that defines functions for feeding input data to the acceleration engine 2412 and defining the operation to perform on the input data. In this and other examples, the driver 2422 can configure the acceleration engine 2412 to perform the operation. For example, the driver 2422 can identify a neural network that the acceleration engine 2412 is to execute, as well as the location in the processor memory 2404 or on the storage device 2406 where the compiled code 2444 for the neural network is located. The driver 2422 can further load into the acceleration engine 2412 or cause the acceleration engine 2412 to load the compiled code 2444, can load or cause the acceleration engine 2412 to load the input data on which the neural network is to operate, and/or can cause the acceleration engine 2412 to being executing on the input data. Once the acceleration engine 2412 has finished, the acceleration engine 2412 can notify the driver 2422, and the driver 2422 can deliver a result back to the application that requested the result.

Figure 25:
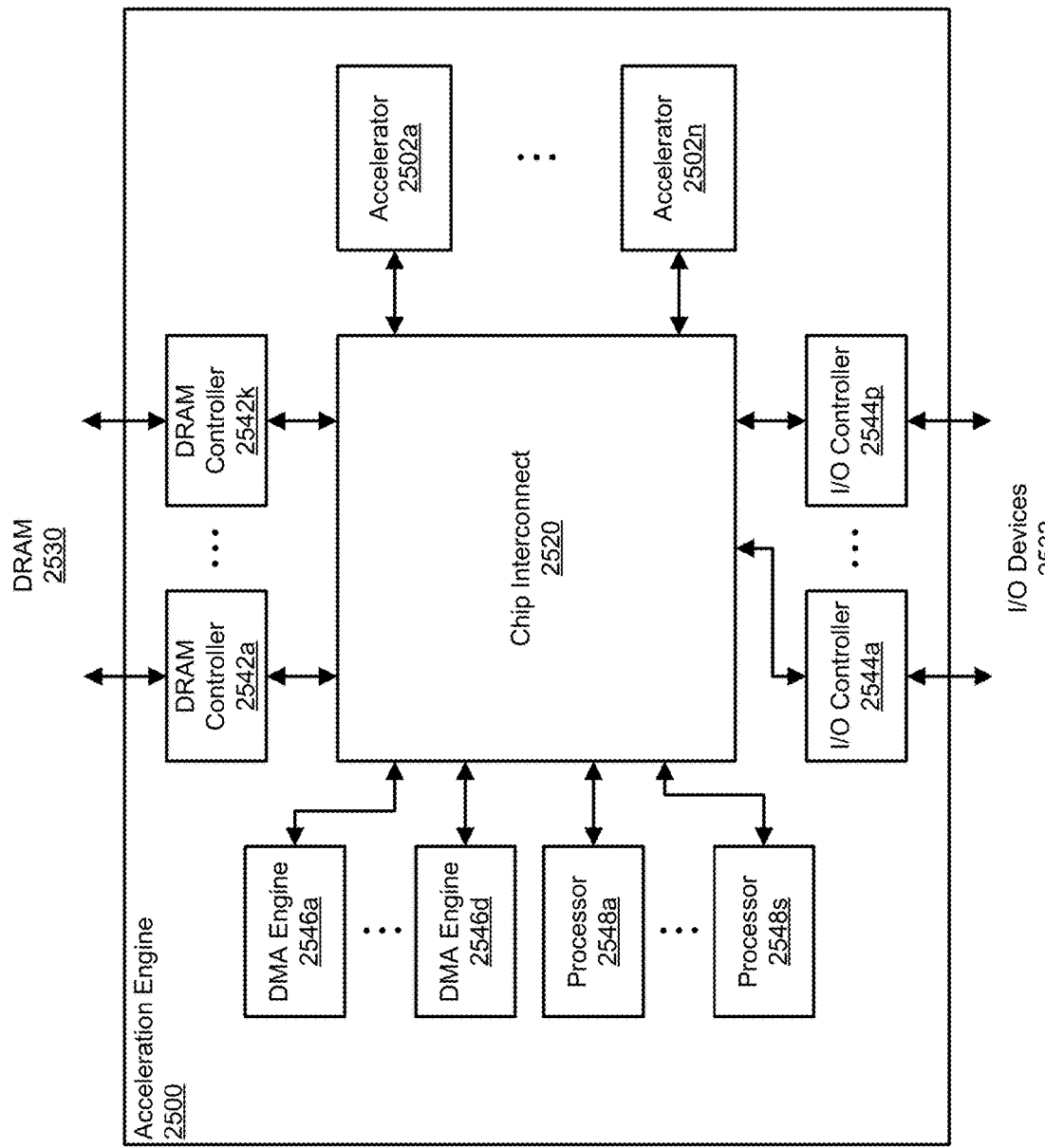
FIG. 25 includes a block diagram of an example of an acceleration engine.

FIG. 25 includes a block diagram that illustrates an example of an acceleration engine 2500. The acceleration engine 2500 is an example of an integrated circuit that can include one or more accelerators 2502a-2502n that may be similar to the accelerator described above with respect to, for example, FIG. 7. For example, in one embodiment, the acceleration engine 2500 may include four accelerators that may be used to perform four sub-operations of a convolution operation in parallel as described above.

In the example of FIG. 25, the acceleration engine 2500 includes multiple accelerators 2502a-2502n, each of which can perform a set of operations. In various examples, the accelerators 2502a-2502n are for particular types of operations, so that the accelerators 2502a-2502n can perform the operations much faster than when similar operations are performed by a general purpose processor. In various examples, to perform a set of operations, input data on which the operations are to be performed must first be moved into the accelerators 2502a-2502n. Additionally, in some cases, program code is also moved into the accelerators 2502a-2502n, which programs the operations that the accelerators 2502a-2502n will perform on the data. In the illustrated example, the acceleration engine 2500 includes N accelerators 2502a-2502n. Examples of accelerators that can be included in the acceleration engine 2500 include graphics accelerators, floating point accelerators, neural network accelerators, and others. In various examples, the accelerators 2502a-2502n can each be the same (e.g., each of the is a graphics accelerator) or can be different (e.g., the accelerators 2502a-2502n include a graphics accelerator, a floating point accelerator, and neural network accelerator).

The example acceleration engine 2500 further includes DRAM controllers 2542a-2542k for communicating with an external memory. The external memory is implemented, in this example, using DRAM 2530. In the illustrated example, the acceleration engine 2500 includes K DRAM controllers 2542a-2542k, each of which may be able to communicate with an independent set of banks of DRAM. In other examples, other types of RAM technology can be used for the external memory. The DRAM controllers 2542a-2542k can also be referred to as memory controllers.

In various examples, input data and/or program code for the accelerators 2502a-2502n can be stored in the DRAM 2530. Different programs can cause the accelerators 2502a-2502n to perform different operations. For example, when one of the accelerators is a neural network accelerator, one program can configure the neural network accelerator to perform speech recognition while another program can configure the neural network accelerator to perform image recognition. In various examples, different accelerators 2502a-2502n can be programmed with different programs, so that each performs a different set of operations. In various examples, the processors 2548a-2548s can manage moving of program code from the DRAM 2530 to the accelerators 2502a-2502n.

The example acceleration engine 2500 further includes I/O controllers 2544a-2544p for communicating with I/O devices 2532 in the system. The acceleration engine 2500 can communicate with I/O devices over, for example, a processor bus. In some examples, the processor bus can be implemented using Peripheral Component Interconnect (PCI) and/or a variation of the PCI bus protocol. The processor bus can connect the acceleration engine 2500 to I/O devices such as, for example, input and output devices, memory controllers, storage devices, and/or network interface cards, among other things. In some examples, the I/O controllers 2544a-2544p can enable the acceleration engine 2500 to act as an I/O device for a host processor. For example, the acceleration engine 2500 can be the recipient of input data from the host processor, and a command indicating an operation to be performed on the input data (e.g., a particular computation or analysis). In the illustrated example, the acceleration engine 2500 includes p I/O controllers 2544a-2544p, each of which may include a separate root complex and may communicate with a separate set of I/O devices 2532. In other examples, other standardized bus protocols, such as Ultra Path Interconnect (UPI) can be used for the host bus. In other examples, a proprietary bus protocol can be used.

Movement of data in the acceleration engine 2500 can be managed by one or more processors 2548a-2548s, which can also be referred to as data management processors. In the example of FIG. 25, the acceleration engine 2500 includes s processors 2548a-2548s incorporated into the device (e.g., on the same silicon die). In other examples, the processors 2548a-2548s can be external to the acceleration engine 2500 (e.g., on a different die and/or in a different package). In some examples, the processors 2548a-2548s can manage the movement of data from I/O devices 2532 to the accelerators 2502a-2502n or the DRAM 2530. For example, input data may be located at an I/O device 2532 or in processor memory, and the processors 2548a-2548s can move the input from the I/O device 2532 or processor memory into an accelerator or into DRAM 2530. As another example, program code for the accelerators 2502a-2502n may be located on an I/O device 2532 or in processor memory.

The example acceleration engine 2500 further includes DMA engines 2546a-2546d that can move data between the accelerators 2502a-2502n, DRAM controllers 2542a-2542k, and I/O controllers 2544a-2544p. In the illustrated example, the acceleration engine 2500 includes D DMA engines 2546a-2546d. In some implementations, the DMA engines 2546a-2546d can be assigned to specific tasks, such as moving data from the DRAM controllers 2542a-2542d to the accelerators 2502a-2502n, or moving data between the I/O controllers 2544a-2544p and the accelerators 2502a-2502n. These tasks can be assigned, for example, by enqueueing descriptors with the DMA engines 2546a-2546d, where a descriptor identifies an address for a block of data and an operation (e.g., a read or a write) to perform. A descriptor, for example, can direct a DMA engine to instruct a DMA controller to read a block of data from DRAM 2530. A descriptor can, as a further example, instruct the DMA engine to write data, read by the DMA controller, to an accelerator. Further descriptors can be used to move data from an accelerator to DRAM 2530.

In various examples, each of the processors 2548a-2548s can be responsible for managing the data movement for a different accelerator. In some examples, a processor may manage the data movement for more than one accelerator. Similarly, in various examples, each of the processors 2548a-2548s can be assigned to one or more DMA engines 2546a-2546d. In these and other examples, associations between processors 2548a-2548s, accelerators 2502a-2502n, and DMA engines 2546a-2546d are determined by program code being executed by each respective processor.

In the example acceleration engine 2500, the various components can communicate over a chip interconnect 2520. The chip interconnect 2520 primarily includes wiring for routing data between the components of the acceleration engine 2500. In some cases, the chip interconnect 2520 can include a minimal amount of logic, such as multiplexors to control the direction of data, flip-flops for handling clock domain crossings, and timing logic.

Figure 26:
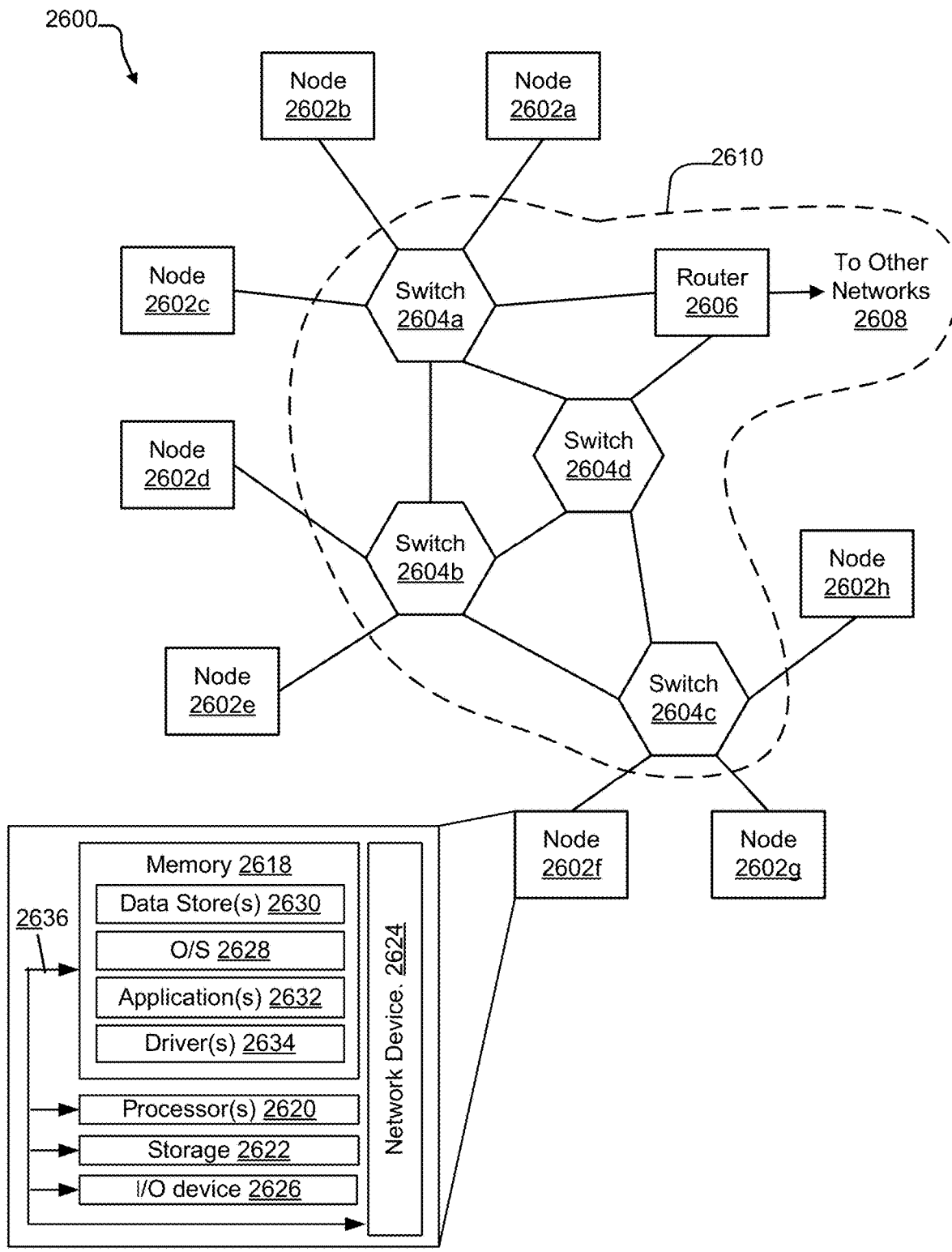
FIG. 26 includes a diagram of an example of a network.

FIG. 26 includes a diagram of an example network 2600, which can include one or more host systems, such as the host system illustrated in FIG. 24. For example, the example network 2600 of FIG. 26 includes multiple nodes 2602a-2602h, one or more of which can be a host system such as is illustrated in FIG. 24. Others of the nodes 2602a-2602h can be other computing devices, each of which include at least a memory for storing program instructions, a processor for executing the instructions, and a network interface for connecting to the network 2600.

In various examples, the network 2600 can be used to process data. For example, input data can be received at one of the nodes 2602a-2602h or from other networks 2608 with which the network 2600 can communicate. In this example, the input data can be directed to a node in the network 2600 that includes an acceleration engine, for the acceleration engine to operate on and produce a result. The result can then be transferred to the node or other network from which the input data was received. In various examples, input data can be accumulated from various sources, including one or more of the nodes 2602a-2602h and/or computing devices located in the other networks 2608, and the accumulated input data can be directed to one or more host systems in the network 2600. Results from the host systems can then be distributed back to the sources from which the input data was gathered.

In various examples, one or more of the nodes 2602a-2602h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 26, the nodes 2602a-2602h are connected to one another using a switched architecture with point-to point links. The switched architecture includes multiple switches 2604a-2604d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 2604a-2604d of FIG. 26 may be connected to the nodes 2602a-2602h and provide multiple paths between any two nodes.

The network 2600 may also include one or more network devices for connection with other networks 2608, such as a router 2606. Routers use headers and forwarding tables to determine the best path for forwarding the packets, and use protocols such as internet control message protocol (ICMP) to communicate with each other and configure the best route between any two devices. The router 2606 of FIG. 26 can be used to connect to other networks 2608 such as subnets, LANs, wide area networks (WANs), and/or the Internet.

In some examples, network 2600 may include anyone or a combination of many different types of networks, such as cable networks, the Internet, wireless networks, cellular networks and other private and/or public networks. The interconnected switches 2604a-2604d and the router 2606, if present, may be referred to as a switch fabric 2610, a fabric, a network fabric, or simply a network. In the context of a computer network, terms "fabric" and "network" may be used interchangeably herein.

The nodes 2602a-2602h may be any combination of host systems, processor nodes, storage subsystems, and I/O chassis that represent user devices, service provider computers or third party computers.

User devices may include computing devices to access an application 2632 (e.g., a web browser or mobile device application). In some aspects, the application 2632 may be hosted, managed, and/or provided by a computing resources service or service provider. The application 2632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 2608. Additionally, the user device(s) may be part of the distributed system managed by, controlled by, or otherwise part of the service provider computer(s) (e.g., a console device integrated with the service provider computers).

The node(s) of FIG. 26 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 2632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 2602a-2602h may include at least one memory 2618 and one or more processing units (or processor(s) 2620). The processor(s) 2620 may be implemented in hardware, computer-executable instructions, firmware, or combinations thereof. Computer-executable instruction or firmware implementations of the processor(s) 2620 may include computer-executable or machine-executable instructions written in any suitable programming language to perform the various functions described.

In some instances, the hardware processor(s) 2620 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 2618 may store program instructions that are loadable and executable on the processor(s) 2620, as well as data generated during the execution of these programs. Depending on the configuration and type of the node(s) 2602a-2602h, the memory 2618 may be volatile (such as RAM) and/or non-volatile (such as ROM, flash memory, etc.). The memory 2618 may include an operating system 2628, one or more data stores 2630, one or more applications 2632, one or more drivers 2634, and/or services for implementing the features disclosed herein.

The operating system 2628 may support nodes 2602a-2602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 2628 may also be a proprietary operating system.

The data stores 2630 may include permanent or transitory data used and/or operated on by the operating system 2628, applications 2632, or drivers 2634. Examples of such data include web pages, video data, audio data, images, user data, and so on. The information in the data stores 2630 may, in some implementations, be provided over the network(s) 2608 to user devices. In some cases, the data stores 2630 may additionally or alternatively include stored application programs and/or drivers. Alternatively or additionally, the data stores 2630 may store standard and/or proprietary software libraries, and/or standard and/or proprietary application user interface (API) libraries. Information stored in the data stores 2630 may be machine-readable object code, source code, interpreted code, or intermediate code.

The drivers 2634 include programs that may provide communication between components in a node. For example, some drivers 2634 may provide communication between the operating system 2628 and additional storage 2622, network device 2624, and/or I/O device 2626. Alternatively or additionally, some drivers 2634 may provide communication between applications 2632 and the operating system 2628, and/or applications 2632 and peripheral devices accessible to the service provider computer. In many cases, the drivers 2634 may include drivers that provide well-understood functionality (e.g., printer drivers, display drivers, hard disk drivers, Solid State Device drivers). In other cases, the drivers 2634 may provide proprietary or specialized functionality.

The service provider computer(s) or servers may also include additional storage 2622, which may include removable storage and/or non-removable storage. The additional storage 2622 may include magnetic storage, optical disks, solid state disks, flash memory, and/or tape storage. The additional storage 2622 may be housed in the same chassis as the node(s) 2602a-2602h or may be in an external enclosure. The memory 2618 and/or additional storage 2622 and their associated computer-readable media may provide non-volatile storage of computer-readable instructions, data structures, program modules, and other data for the computing devices. In some implementations, the memory 2618 may include multiple different types of memory, such as SRAM, DRAM, or ROM.

The memory 2618 and the additional storage 2622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 2618 and the additional storage 2622 are examples of computer storage media. Additional types of computer storage media that may be present in the node(s) 2602a-2602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 2602a-2602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 2602a-2602h may also include I/O device(s) 2626, such as a keyboard, a mouse, a pen, a voice input device, a touch input device, a display, speakers, a printer, and the like. The node(s) 2602a-2602h may also include one or more communication channels 2636. A communication channel 2636 may provide a medium over which the various components of the node(s) 2602a-2602h can communicate. The communication channel or channels 2636 may take the form of a bus, a ring, a switching fabric, or a network.

The node(s) 2602a-2602h may also contain network device(s) 2624 that allow the node(s) 2602a-2602h to communicate with a stored database, another computing device or server, user terminals and/or other devices on the network(s) 2600.

In some implementations, the network device 2624 is a peripheral device, such as a PCI-based device. In these implementations, the network device 2624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 2624 may be connected to a computing system using a PCIe interface.

A PCI-based device may include one or more functions. A "function" describes operations that may be provided by the network device 2624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 2624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for implementing a neural network using two or more computing engines, the method comprising:
   receiving a neural network model that includes a convolution operation for generating a set of output feature maps using a set of input feature maps and a set of filters;
   dividing the convolution operation into two or more sub-operations that have no data dependency between each other, wherein each of the two or more sub-operations generates a portion of the set of output feature maps;
   assigning a first sub-operation in the two or more sub-operations to a first computing engine in the two or more computing engines, wherein the first sub-operation generates a first portion of a final output of the convolution operation;
   assigning a second sub-operation in the two or more sub-operations to a second computing engine in the two or more computing engines, wherein the second sub-operation generates a second portion of the final output of the convolution operation;
   generating instructions for performing, in parallel, the first sub-operation by the first computing engine and the second sub-operation by the second computing engine; and
   generating instructions for making an inference based on a result of the first sub-operation, a result of the second sub-operation, or both.

2. The computer-implemented method of claim 1, wherein:
   the set of input feature maps includes C input feature maps for each of N input datasets;
   the set of filters includes M filters each including C filter matrices; and
   the set of output feature maps includes M output feature maps for each of the N input datasets, wherein each of the M output feature maps for an input dataset is a result of a convolution between the C input feature maps of the input dataset and the C filter matrices in a filter of the M filters.

3. The computer-implemented method of claim 1, wherein the portion of the set of output feature maps includes:
   a first fraction of a total number of output feature maps in the set of output feature maps;
   a first portion of each output feature map in a subset of the set of output feature maps; or
   a second portion of each output feature map in a second fraction of the total number of output feature maps in the set of output feature maps.

4. The computer-implemented method of claim 3, wherein the first sub-operation generates the portion of the set of output feature maps using:
   the set of input feature maps and a first fraction of a total number of filters in the set of filters;
   the set of filters and a first portion of each input feature map in a first subset of the set of input feature maps; or
   a second fraction of the total number of filters in the set of filters and a second portion of each input feature map in a second subset of the set of input feature maps.

5. A computer-implemented method, comprising:
   receiving a neural network model that includes a first tensor operation;
   dividing the first tensor operation into sub-operations of the first tensor operation, the sub-operations including two sub-operations that have no data dependency between the two sub-operations;
   assigning a first sub-operation in the two sub-operations to a first computing engine, wherein the first sub-operation generates a first portion of a final output of the first tensor operation;
   assigning a second sub-operation in the two sub-operations to a second computing engine, wherein the second sub-operation generates a second portion of the final output of the first tensor operation; and
   generating instructions for performing, in parallel, the first sub-operation by the first computing engine and the second sub-operation by the second computing engine.

6. The computer-implemented method of claim 5, wherein the first tensor operation includes a multi-layer perceptron operation.

7. The computer-implemented method of claim 5, wherein the first tensor operation generates, using a set of input feature maps and a set of filters, an output tensor including a set of output feature maps.

8. The computer-implemented method of claim 7, wherein:
   the set of input feature maps includes C input feature maps for each of N input datasets;
   the set of filters includes M filters each including C filter matrices; and
   the set of output feature maps includes M output feature maps for each of the N input datasets, wherein each of the M output feature maps for an input dataset is a result of a convolution between the C input feature maps of the input dataset and the C filter matrices in a filter of the M filters.

9. The computer-implemented method of claim 8, wherein the first computing engine includes a two-dimensional processing element array characterized by:
   a total number of columns of the two-dimensional processing element array less than M; or
   a total number of rows of the two-dimensional processing element array less than C.

10. The computer-implemented method of claim 7, wherein the first sub-operation generates a portion of the set of output feature maps.

11. The computer-implemented method of claim 10, wherein the portion of the set of output feature maps includes a fraction of a total number of output feature maps in the set of output feature maps.

12. The computer-implemented method of claim 11, wherein the first sub-operation generates the portion of the set of output feature maps using:
   the set of input feature maps; and
   a fraction of a total number of filters in the set of filters.

13. The computer-implemented method of claim 10, wherein the portion of the set of output feature maps includes a portion of each output feature map in a subset of the set of output feature maps.

14. The computer-implemented method of claim 13, wherein the first sub-operation generates the portion of the set of output feature maps using:
- the set of filters; and
- a portion of each input feature map in a subset of the set of input feature maps.

15. The computer-implemented method of claim 10, wherein the portion of the set of output feature maps includes a portion of each output feature map in a fraction of a total number of output feature maps in the set of output feature maps.

16. The computer-implemented method of claim 15, wherein the first sub-operation generates the portion of the set of output feature maps using:
- a fraction of a total number of filters in the set of filters; and
- a portion of each input feature map in a subset of the set of input feature maps.

17. The computer-implemented method of claim 5, further comprising:
- generating instructions for making an inference based on a result of the first sub-operation, a result of the second sub-operation, or both.

18. The computer-implemented method of claim 5, further comprising:
- identifying a second tensor operation in the neural network model, the second tensor operation and the first tensor operation having no data dependency;
- dividing the second tensor operation into sub-operations of the second tensor operation, the sub-operations of the second tensor operation having no data dependency;
- assigning a first sub-operation in the sub-operations of the second tensor operation to a third computing engine;
- assigning a second sub-operation in the sub-operations of the second tensor operation to a fourth computing engine; and
- generating instructions for performing, in parallel with the first sub-operation for the first tensor operation and the second sub-operation for the first tensor operation, the first sub-operation in the sub-operations of the second tensor operation by the third computing engine and the second sub-operation in the sub-operations of the second tensor operation by the fourth computing engine.

19. A non-transitory computer-readable medium having instructions stored therein, wherein the instructions, when executed by one or more processors, cause the one or more processors to perform operations including:
- receiving a neural network model that includes a tensor operation;
- dividing the tensor operation into sub-operations, the sub-operations including two sub-operations that have no data dependency between the two sub-operations;
- assigning a first sub-operation in the two sub-operations to a first computing engine, wherein the first sub-operation generates a first portion of a final output of the tensor operation;
- assigning a second sub-operation in the two sub-operations to a second computing engine, wherein the second sub-operation generates a second portion of the final output of the tensor operation; and
- generating instructions for performing, in parallel, the first sub-operation by the first computing engine and the second sub-operation by the second computing engine.

20. The non-transitory computer-readable medium of claim 19, wherein the instructions further cause the one or more processors to perform operations including:
- generating instructions for making an inference based on a result of the first sub-operation, a result of the second sub-operation, or both,
- wherein the first computing engine and the second computing engine are in a same integrated circuit device or in two different integrated circuit devices.

* * * * *